(12) United States Patent
Balapour et al.

(10) Patent No.: US 11,345,634 B2
(45) Date of Patent: May 31, 2022

(54) METHOD OF LIGHTWEIGHT AGGREGATES PRODUCTION FROM WASTE-COAL COMBUSTION ASH

(71) Applicant: Drexel University, Philadelphia, PA (US)

(72) Inventors: Mohammad Balapour, Philadelphia, PA (US); Yaghoob Farnam, Philadelphia, PA (US); Yick Grace Hsuan, Ardmore, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 17/469,945

(22) Filed: Sep. 9, 2021

(65) Prior Publication Data

US 2021/0403378 A1   Dec. 30, 2021

Related U.S. Application Data

(63) Continuation of application No. PCT/US2020/056976, filed on Oct. 23, 2020.

(60) Provisional application No. 63/004,032, filed on Apr. 2, 2020.

(51) Int. Cl.
*C04B 18/02* (2006.01)

(52) U.S. Cl.
CPC .................. *C04B 18/027* (2013.01)

(58) Field of Classification Search
CPC ..... C04B 18/027; C04B 18/08; C04B 18/026; C04B 18/06; C04B 18/065; C04B 20/04; B09B 2101/30; Y02W 30/91
See application file for complete search history.

(56) References Cited

U.S. PATENT DOCUMENTS

| | | | |
|---|---|---|---|
| 2,987,411 A | 6/1961 | Minnick | |
| 4,772,330 A | 9/1988 | Kobayashi et al. | |
| 5,584,895 A | 12/1996 | Seike et al. | |
| 5,737,896 A | 4/1998 | Rodgers | |
| 6,755,905 B2 | 6/2004 | Ostes et al. | |
| 7,704,317 B2 | 4/2010 | Bethani | |

FOREIGN PATENT DOCUMENTS

| | | |
|---|---|---|
| CN | 108834390 | 11/2018 |
| FR | 1466703 | 1/1967 |
| GB | 837382 | 6/1960 |
| JP | 4599802 | 12/2010 |
| JP | 2019095401 | 6/2019 |
| KR | 100392933 | 7/2003 |
| WO | WO2019/012074 | 1/2019 |

OTHER PUBLICATIONS

Aineto, Monica et al., "Production of Lightweight Aggregates from Coal Gasification Fly Ash and Slag", World of Coal Ash, Apr. 2005.
Arioz, O. et al., "Lightweight Expanded Aggregate Production from Bottom Ash", Proceedings 10th ECerS Conf., 2007.
Billen, Pieter et al., "Melt Ceramics from Coal Ash: Constitutive product design using thermal and flow properties", Resources, Conservation & Recycling., 2018.
PCT/US2020/056976. International Search Report, dated Jan. 19, 2021.
PCT/US2020/056976. Written Opinion, dated Jan. 19, 2021.
Balapour, Mohammad et al., "Potential use of lightweight aggregate (LWA) produced from bottom coal ash for internal curing of concrete systems", Cement and Concrete Composites. Jan. 2020.

*Primary Examiner* — Anthony J Green
(74) *Attorney, Agent, or Firm* — Joseph E. Maenner; Maenner & Associates, LLC

(57) ABSTRACT

Manufacturing lightweight aggregate (LWA) by a sintering technique requires a delicate balance among three conditions: forming sufficient amount of molten liquid phase during sintering; reaching an appropriate viscosity for solid-liquid suspension; and emitting sufficient amount of gas that can be entrapped by the liquid phase to form pores. LWAs were made from low-calcium and high-calcium Waste Coal Combustion Ash (W-CCA) including fly ash and bottom ash. A mass fraction of at least 40% liquid phase for fly ash and 50% for bottom ash is required for a successful entrapment of emitted gaseous phases during sintering. Larger pores were observed in the microstructure of LWA samples made using high-calcium W-CCA in comparison to low-calcium W-CCA. This result was mainly attributed to the high-calcium samples forming liquid phases with lower viscosity values and emitting higher amounts of gaseous phase during sintering than did the low-calcium samples. The gaseous phase was generated by hematite reduction and anhydrite decomposition.

12 Claims, 40 Drawing Sheets

METHOD OF LIGHTWEIGHT AGGREGATES PRODUCTION FROM WASTE-COAL COMBUSTION ASH

CROSS-REFERENCE TO RELATED APPLICATION

The present application claims the benefit of U.S. Provisional Patent Application Ser. No. 63/004,032, filed on Apr. 2, 2020, which is incorporated herein by reference in its entirety.

STATEMENT OF GOVERNMENT INTEREST

This invention was made with government support under Contract No. 1918838 awarded by the National Science Foundation. The government has certain rights in the invention.

BACKGROUND OF THE INVENTION

Field of the Invention

The invention relates to a method of producing lightweight aggregates from Waste-Coal Combustion Ash (W-CCA)

Description of the Related Art

Some of the industrial applications of lightweight aggregate (LWA) are internal curing of concrete, lightweight concrete, lightweight fill for geotechnical applications, wastewater treatment, and green roofs. At the current state, most of the available LWA in the US market are expanded shale, clay, and slate based, which are only available at certain locations/states of the US such as North Carolina, Upstate New York, Texas, Kansas, Colorado, California, and Indiana. This matter has directly impacted the accessibility and consequently the final price of LWA due to the cost of transportation. In recent years, there have been many efforts to explore the production of LWA from urban and industrial solid wastes to not only increase availability/accessibility of LWA, but also to address the growing concerns over sustainability.

W-CCA including fly ash (FA), bottom ash (BA), boiler slag, etc. are of the industrial waste materials that need to be landfilled. In 2018 over 100 million tons of W-CCA were produced, of which about 60 million tons (i.e., 60%) were beneficially recycled and the rest has been disposed to the landfills. Over the course of time, this gap in recycling has left the US with a huge stock of waste W-CCA in the landfills, which are imposing negative impacts to the environment (e.g., polluting surface and groundwater) and human health. Having said that, converting the waste W-CCA available in the landfills to LWA is a viable solution that not only promotes landfill diversion, but also can increase the accessibility of LWA. Sintering is one of the techniques that can be employed in order to produce LWA from W-CCA. However, successful production of LWA from W-CCA requires an advanced understanding of sintering mechanisms during the production process.

It would be beneficial to provide an efficient and cost-effective method for producing LWA.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a method of manufacturing lightweight aggregate through sintering process comprising the steps of forming at least a 40% by mass molten liquid phase for the lightweight aggregate (LWA) using W-CCA; reaching a viscosity of between 100 Pa·s and $10^7$ Pa·s for solid-liquid suspension; and emitting a minimum gas amount of 0.24% by weight of the LWA to form pores in the liquid phase during the sintering.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
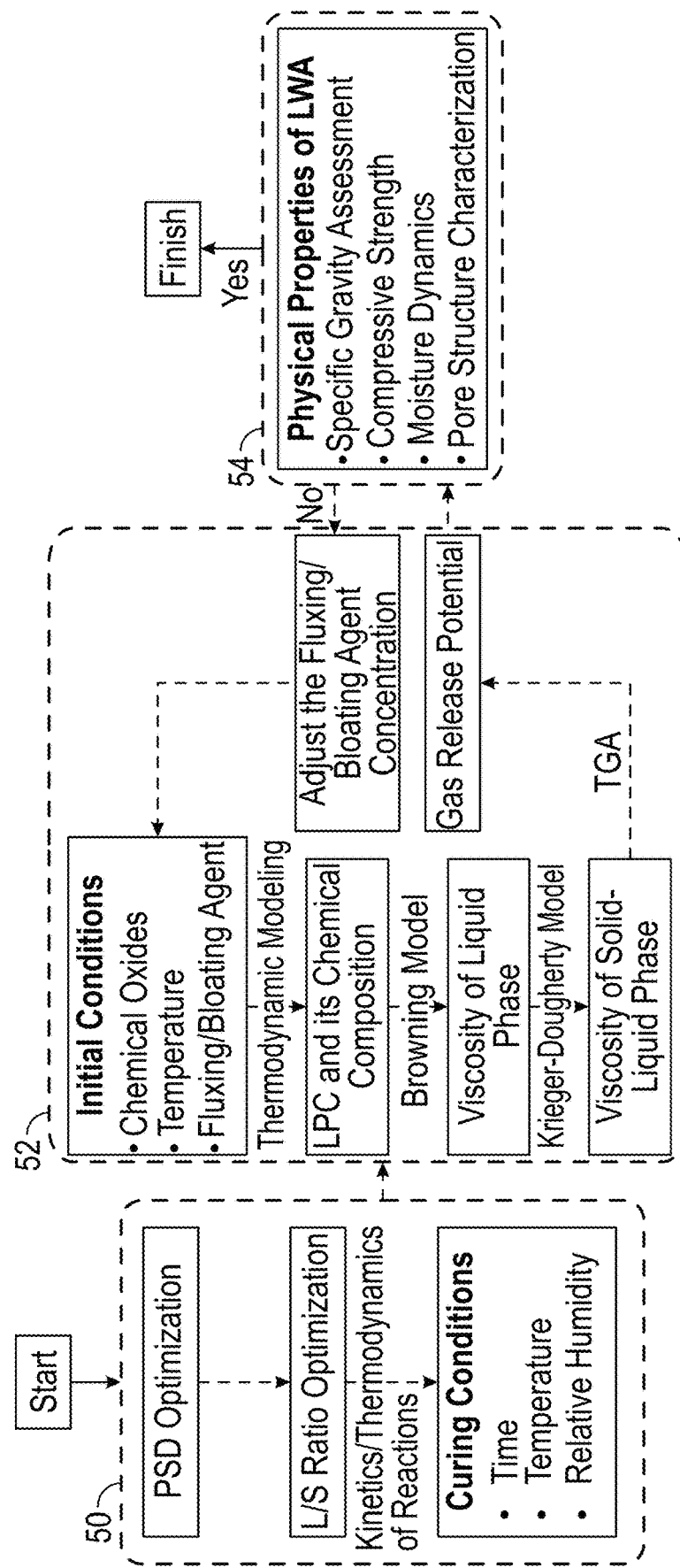
FIG. 1 is a flowchart showing an exemplary thermodynamic-based framework for the production of LWA independent of source materials.
Figure 2A:
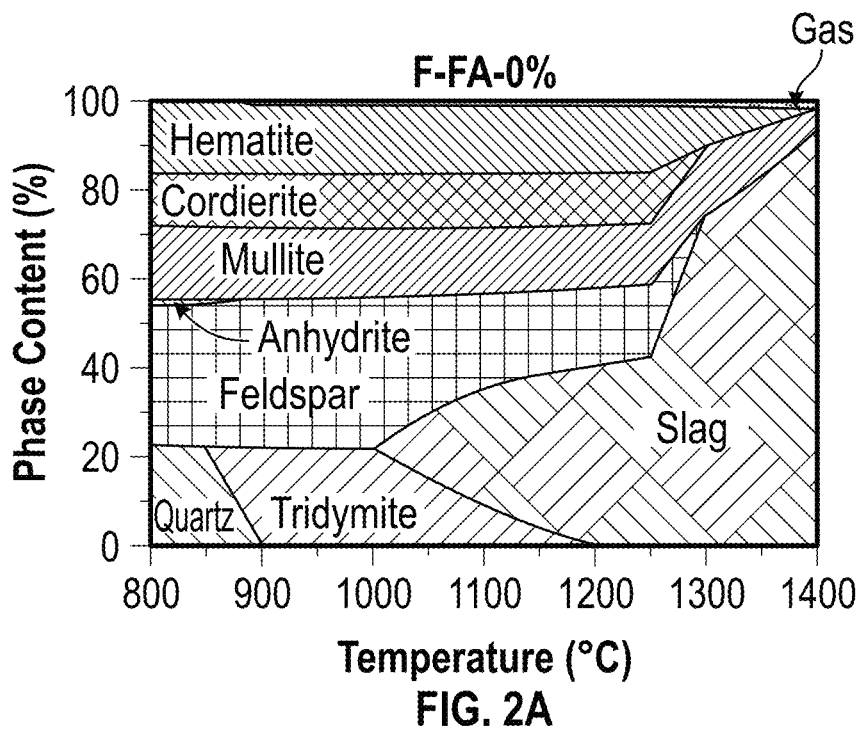
FIG. 2A is a phase diagram for waste low calcium (class F) fly ash (F-FA) with 0% NaOH.
Figure 2B:
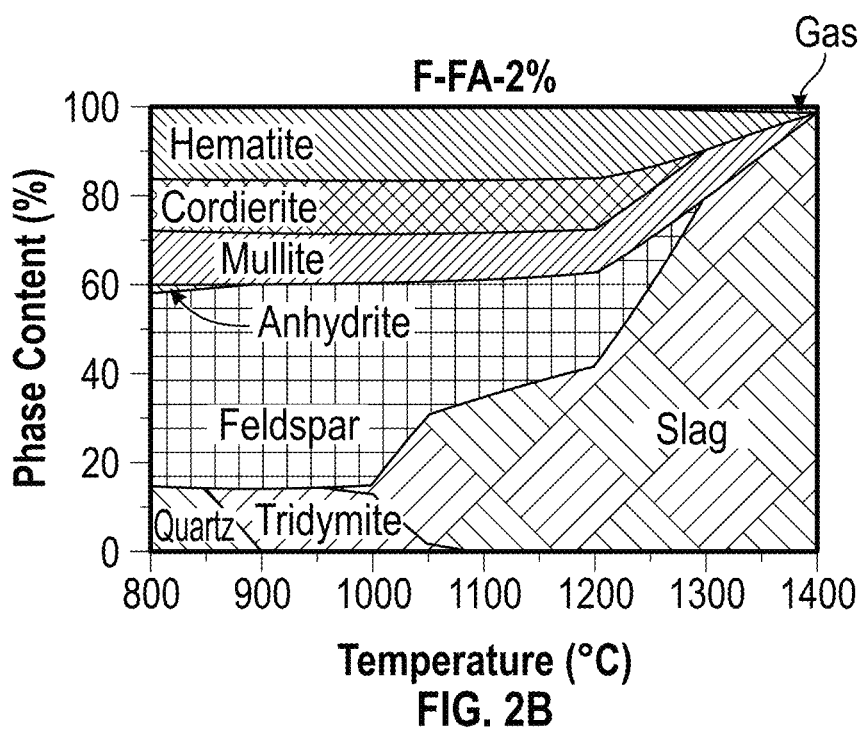
FIG. 2B is a phase diagram for F-FA with 2% NaOH.
Figure 2C:
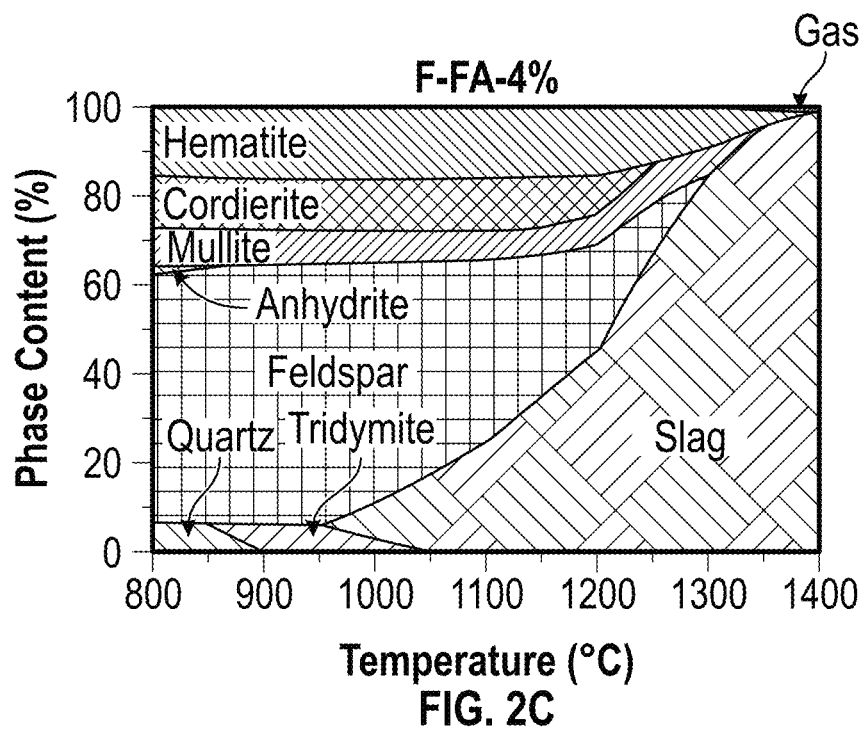
FIG. 2C is a phase diagram for F-FA with 4% NaOH.
Figure 2D:
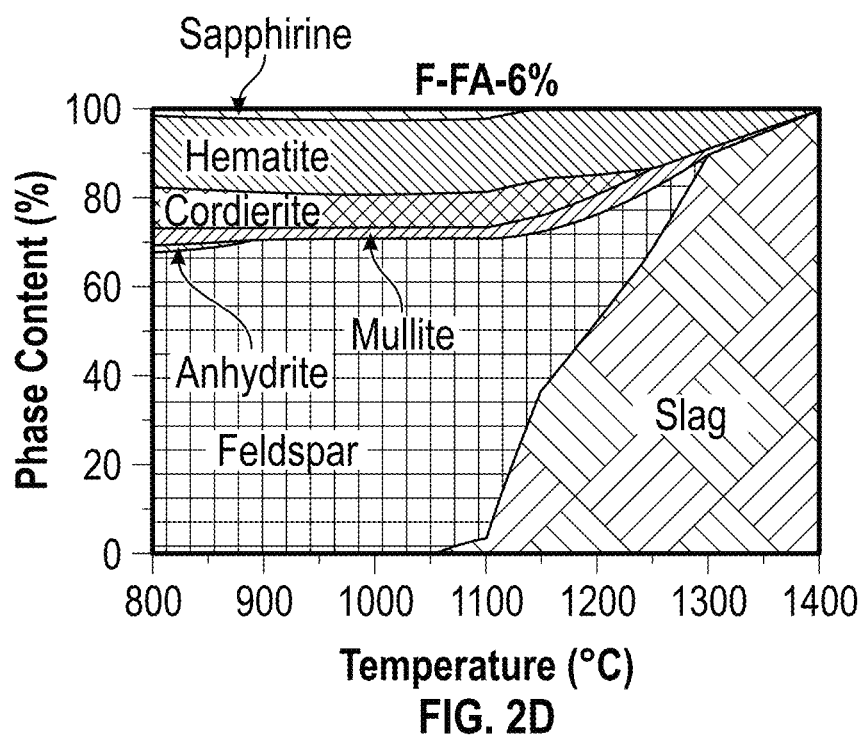
FIG. 2D is a phase diagram for F-FA with 6% NaOH.
Figure 2E:
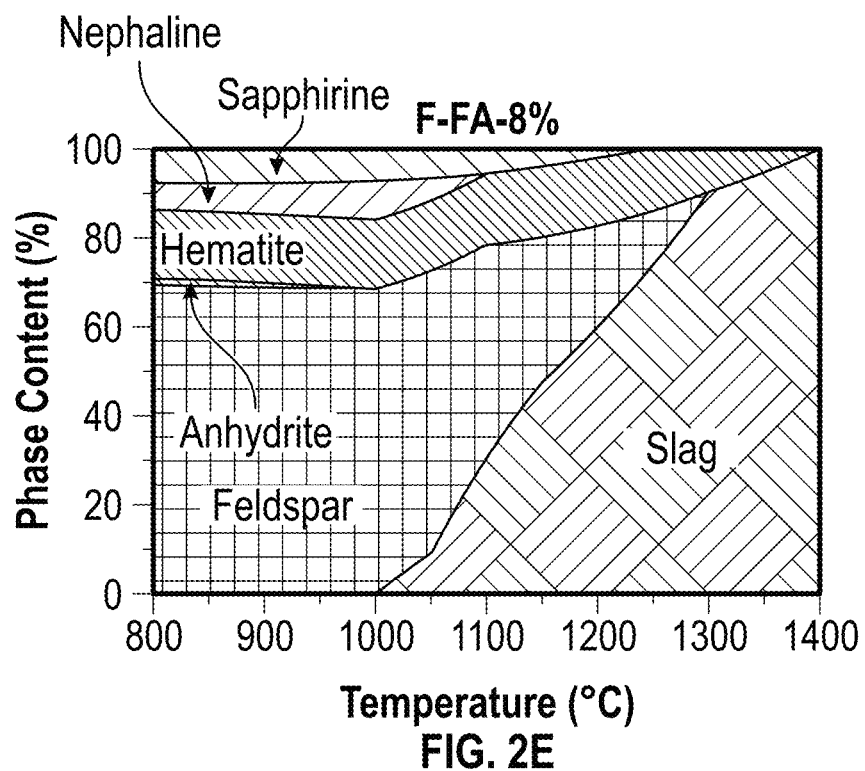
FIG. 2E is a phase diagram for F-FA with 8% NaOH.
Figure 2F:
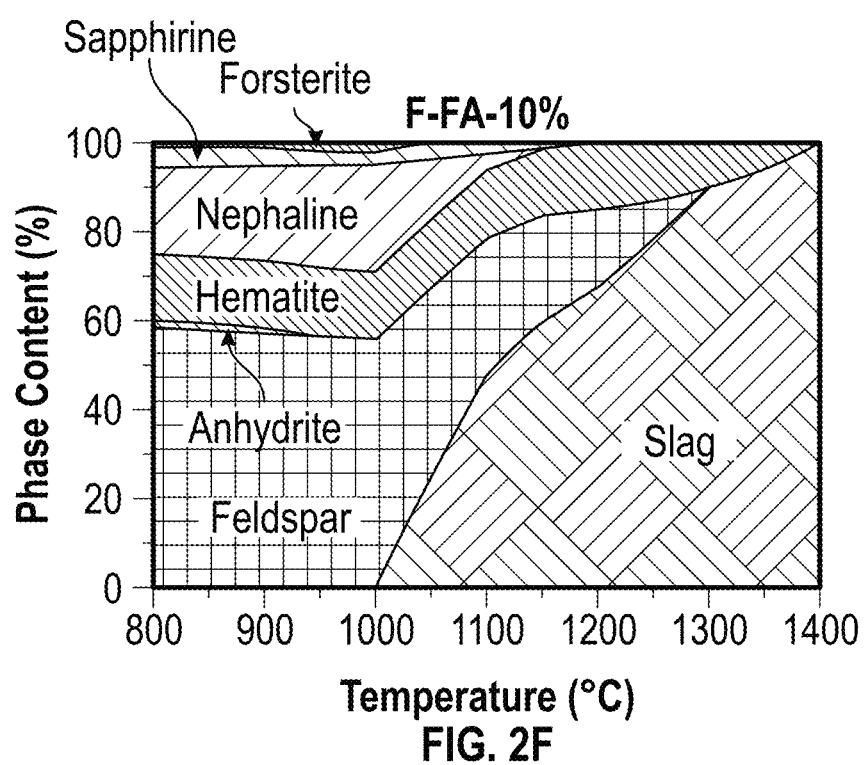
FIG. 2F is a phase diagram for F-FA with 10% NaOH.
Figure 3A:
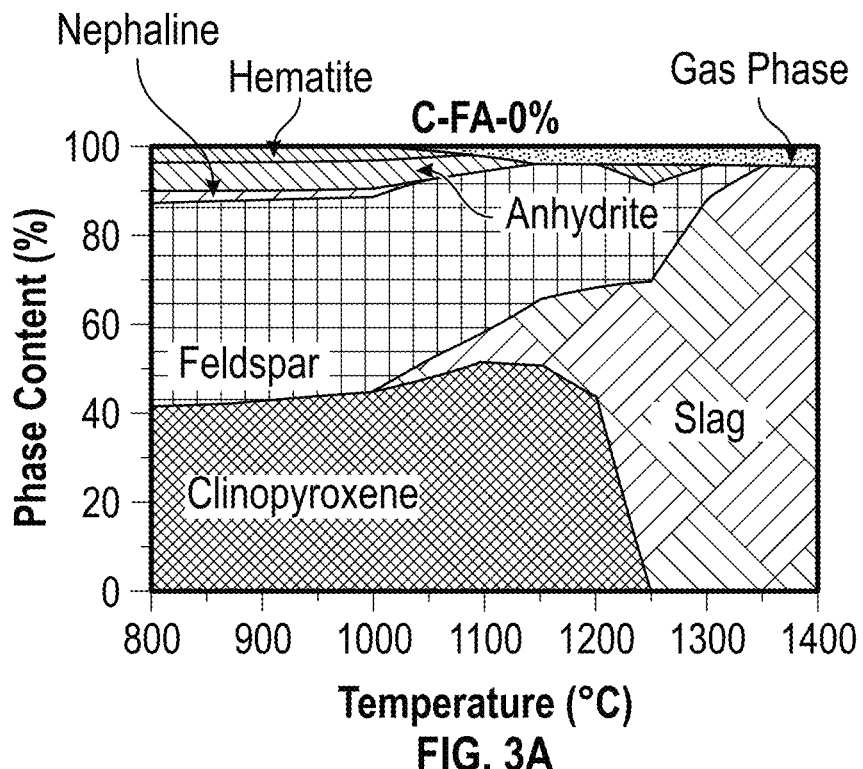
FIG. 3A is a phase diagram for waste high calcium (class C) fly ash (C-FA) with 0% NaOH.
Figure 3B:
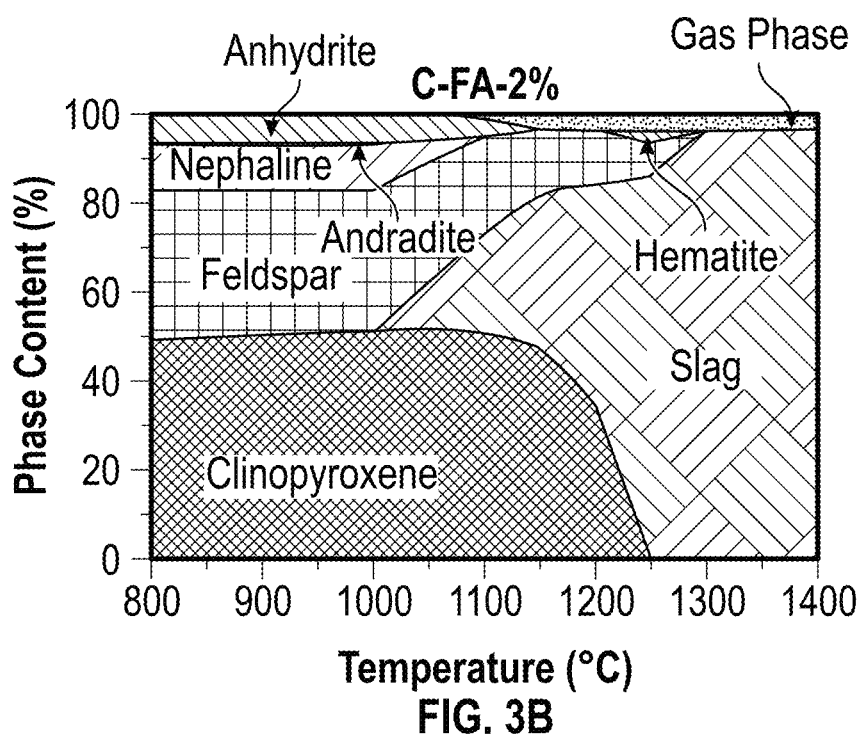
FIG. 3B is a phase diagram for C-FA with 2% NaOH.
Figure 3C:
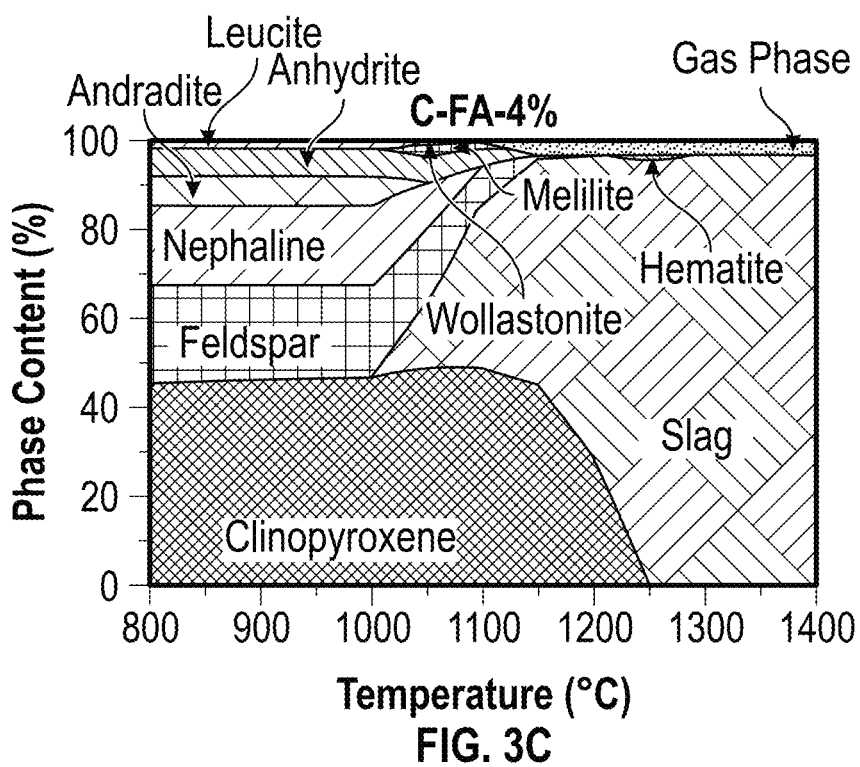
FIG. 3C is a phase diagram for C-FA with 4% NaOH.
Figure 3D:
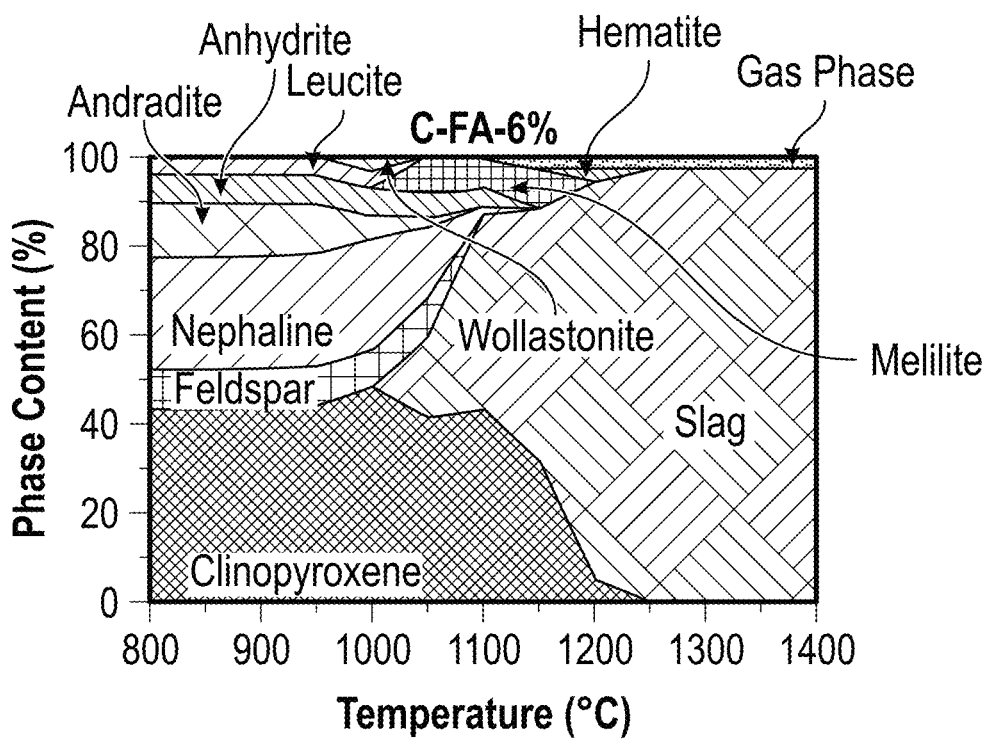
FIG. 3D is a phase diagram for C-FA with 6% NaOH.
Figure 3E:
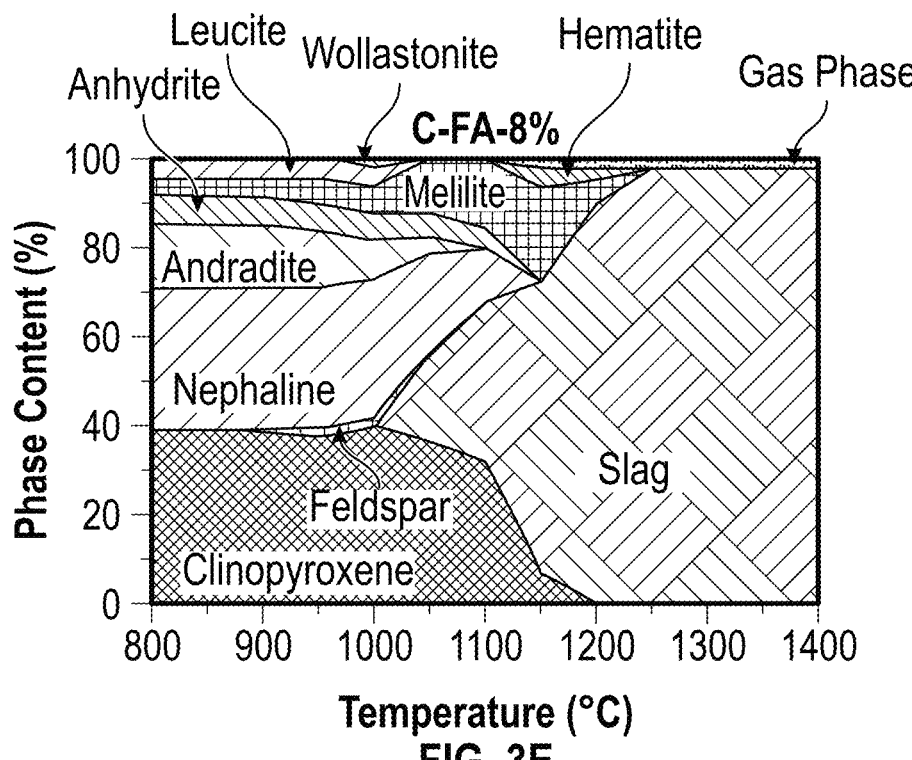
FIG. 3E is a phase diagram for C-FA with 8% NaOH.
Figure 3F:
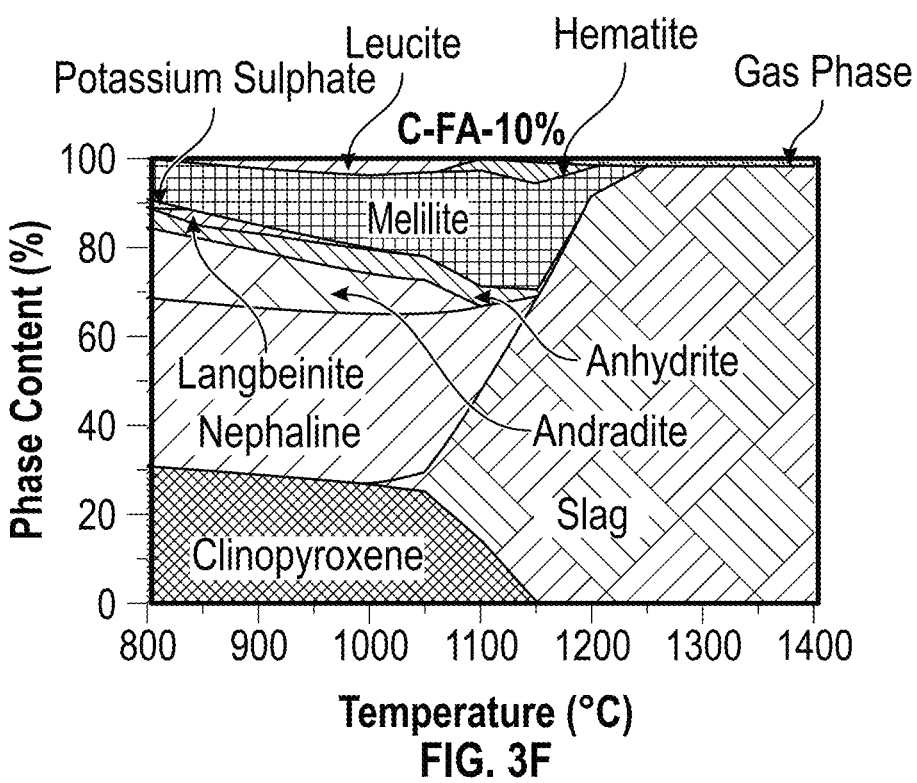
FIG. 3F is a phase diagram for C-FA with 10% NaOH.

In the drawings, like numerals indicate like elements throughout. Certain terminology is used herein for convenience only and is not to be taken as a limitation on the present invention. The terminology includes the words specifically mentioned, derivatives thereof and words of similar import. As used herein, the term "low calcium" for waste ash refers to ash that the summation of $SiO_2$, $Al_2O_3$, and $Fe_2O_3$ is greater than 50% and the CaO content is less than 18%. As used herein, the term "high calcium" for waste ash refers to ash that the summation of $SiO_2$, $Al_2O_3$, and $Fe_2O_3$ is greater than 50% and the CaO content is greater than 18%.

The following abbreviations are used throughout:
Waste Coal Combustion Ash: W-CCA
Fly Ash: FA
Bottom Ash: BA
Low-Calcium: LC
High-Calcium: HC
Class C: C
Class F: F The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The present invention provides inventive sintering mechanisms by quantitatively evaluating the three crucial sintering conditions required for successful production of LWA using a waste coal combustion ash: a correct amount of the formed liquid phase, a correct viscosity of the liquid-solid suspension, and a correct amount of the emitted gas for pore formation. In a first exemplary embodiment, the W-CCA can be fly ash. In an alternative exemplary embodiment, the W-CCA can be bottom ash.

First, the liquid phase of the multi-component system of W-CCA and fluxing agent are quantified using thermodynamic modeling. Second, the viscosity of the liquid-solid phase is quantified using the output of thermodynamic modelling as inputs into the Browning and Krieger-Dougherty equations. Third, TGA is performed to understand the thermal behavior of geopolymerized (i.e., underwent the chemical reaction between the dissolved species of aluminates and silicates in highly alkaline environment to form a three-dimensional aluminosilicate network) pellets during sintering. Finally, the interior physical features and the LWA pore structure is visualized using 3D x-ray computed tomography (X-CT) to confirm the desired structure.

FIG. 1 demonstrates the extended thermodynamics-based framework that can be used for the production of LWA from various W-CCA. As shown, the figure considers three major steps for the successful production of LWA. Box 50 is associated with the production of spherical fresh pellets. This procedure starts with particle size optimization of the source materials as a physical property which can affect the engineering properties of the final product i.e., LWA. Afterward, an optimum liquid to the solid ratio for the technological aspects of spherical pellets should be chosen. It should be noted that the liquid here is the mixture of water and a specific concentration of the fluxing agent. Next, the fresh pellets will be kept in a controlled condition for a certain time to dry and be used for the sintering procedure.

The next step, identified as box 52 in FIG. 1, is associated with the optimization of the sintering process for the production of porous LWA. First, the chemical composition of raw material, the temperature of interest, and the dosage of fluxing/bloating agents are used as the inputs of thermodynamic modeling. Next, the outputs of thermodynamic modeling are used to quantify the formation of different phases and more importantly the liquid phase and its chemical composition that has formed during sintering. Afterward, the liquid phase quantity and its chemical composition are used as the inputs for the Browning et al. model to estimate the viscosity of the liquid phase in the LWA during sintering. The estimated viscosity of the liquid phase and quantity of solid phase are used as the inputs for the Krieger-Dougherty viscosity model to estimate the viscosity of the solid-liquid phase. Next, Thermogravimetric Analyses (TGA) are performed on the fresh pellets to quantify the gas release potential of materials that is essential for the production of porous LWA.

In the third and final step, shown in box 54 FIG. 1, the physical properties of the produced LWA including specific gravity, compressive strength, moisture dynamics, and pore structure are assessed. If those physical properties are satisfied, the LWA design is finalized. Otherwise, the fluxing/bloating agent can be modified by returning to box 52 to go through the loop again to ensure appropriate physical properties are achieved for the LWA.

Example 1—Waste Fly Ash

Materials and Sample Preparation Using Fly Ash

Based on ASTM C618 fly ash is categorized as class F (referred to as low-calcium) fly ash when summation of $SiO_2$, $Al_2O_3$, and $Fe_2O_3$ is greater than 50% and the CaO content is less than 18%. For class C (referred to as high-calcium) fly ash the summation of $SiO_2$, $Al_2O_3$, and $Fe_2O_3$ has to be greater than 50%, and the CaO content must be greater than 18%. Two types of waste fly ashes were used in this study which are based on ASTM C618 and their chemical composition are (i) waste class F (low calcium) fly ash designated by F-FA, and waste class C (high calcium) fly ash designated by C-FA. Additionally, waste fly ash refers to the waste fly ash that does not pass at least one of the requirements proposed by ASTM C618 or AASHTO M 295; therefore, cannot be directly used in concrete. One of the most important requirements of ASTM C618 for fly ash is a Loss on Ignition (LOI) less than 6%. In addition, based on AASHTO M 295, the LOI limit for fly ash in more than thirty-nine states shall be less than 5%. Accordingly fly ashes used in this experiment can be classified as waste fly ash owing to a high LOI content (see Table 1). Table 1 shows the chemical oxide of the waste fly ashes obtained through x-ray fluorescence (XRF).

TABLE 1

Chemical oxides of waste fly ash

| Chemical Composition | Sample Name | |
|---|---|---|
| (% by mass) | F-FA | C-FA |
| $SiO_2$ | 49.5 | 38.19 |
| $Al_2O_3$ | 23.8 | 18.76 |
| $Fe_2O_3$ | 15.45 | 10.88 |
| $SO_3$ | 0.75 | 3.59 |
| CaO | 3.2 | 18.8 |
| $Na_2O$ | 0.42 | 1.12 |
| MgO | 1.6 | 3.6 |
| $K_2O$ | 2.3 | 0.98 |
| $P_2O_5$ | — | 0.7 |
| $TiO_2$ | — | 1.31 |
| Total | 97.02 | 97.93 |
| LOI | 5.3 | 8.47 |
| Unburnt Carbon | 2.33 | 7.0 |
| Initial moisture content | 0.4 | 1.21 |

Quantitative x-ray diffraction (QXRD) analysis was performed using the Rigaku Smartlab instrument using 0.02° steps in the range of 5° to 80° on the fly ashes (F-FA and C-FA) to quantify their amorphous content and crystalline phases. 20% rutile ($TiO_2$) was used as an internal standard for the purpose of quantification. Table 2 shows the crystalline phases and amorphous content of the ashes, which indicates that a great portion of the ashes is composed of an amorphous phase.

TABLE 2

The crystalline phases content of raw waste fly ashes

| | Sample Name | |
|---|---|---|
| Phase name | F-FA | C-FA |
| Quartz | 7.0 | 5.9 |
| Mullite | 10.7 | 3.5 |
| Hematite | 4.5 | 1.0 |
| Anhydrite | 1.9 | 3 |
| Calcium alumioferrite | 0 | 1.6 |
| Amorphous | 75.9 | 84.9 |

The manufacturing of FA LWA includes four main steps: drying, palletization, curing, and sintering. In the first step, the ashes were dried in an oven at 110° C.±5° C. for 24 hours to remove their moisture. In the second step i.e., palletization the dried ash was mixed with NaOH aqueous solution with molarities of 0 mol/L (i.e., pure deionized water), 2.5 M, 5 M, 7.5 M, 10 M, and 12.5 M with a liquid to solid (L/S) ratio of 0.2. It should be noted that other chemical agents could be used instead of NaOH as long as these other agents yield the three required conditions for successful production of LWA. These concentrations led to mass concentrations (i.e., mass of solid NaOH per mass of solid FA) of 0%, 2%, 4%, 6%, 8%, and 10%. The ash and aqueous NaOH (or deionized water) were mixed thoroughly to achieve a mixture of uniform consistency. ABS plastic mold of 16 mm diameter was used to pelletize the mixed ashes. In step three, the pallet was placed in the environmental chamber of 40° C. and 30% RH for 24 hours. In the final step, the fresh aggregates were sintered at 1160° C. for 4 min to produce FA LWA Samples are designated as XX-YY %, where XX shows the type of materials (i.e., either F-FA or C-FA), while YY represents the NaOH concentration.

Research Methodology

To quantitatively investigate the three required conditions for successful production of LWA from waste FA, analytical modeling and experimental program were employed. The analytical modeling was consisted of thermodynamic modeling to quantify the formation of the liquid phase and employing viscosity models to calculate the viscosity of solid-liquid suspension in the LWA. The experimental program was consisted of thermogravimetric analysis (TGA) and X-ray computed tomography (X-CT) to measure the extent of gas release during the sintering and to investigate the pore structure of LWA, respectively.

Analytical Modeling

Thermodynamic Modeling

Factsage v7.2, a thermodynamic modeling software that operates based on Gibbs free energy minimization, coupled with FToxide database was used in order to predict the phase equilibria of the ash+NaOH system as the temperature varied from 800° C. to 1400° C. with the steps of 50° C. The modeling was performed under 0.101 MPa (1 atm) pressure and ordinary air which was consisted of 0.21 mol fraction oxygen and 0.79 mol nitrogen. The chemical oxides that were considered in modeling included $SiO_2$, $Al_2O_3$, $Fe_2O_3$, $SO_3$, $CaO$, $Na_2O$, $MgO$, and $K_2O$, which were obtained through XRF. Those skilled in the art will recognize that other thermodynamic modeling software can be used.

Viscosity Calculations

The viscosity of the liquid phase (slag) in LWA was quantified by employing the empirical viscosity model developed by Browning et al. This model has been shown to be more appropriate to calculate the viscosity of coal ash slag compared to other empirical models. The Browning model assumes that the viscosity of the slag falls into a Newtonian region and correlates viscosity with temperature (T) using a temperature shift (Ts) (Equation 1). Ts, as presented in Equation 2, is a function of a composition parameter, i.e., "A." "A" is defined as the weighted molar ratio of network formers (numerator of Equation 3) to network modifiers (denominator of Equation 3) elements as presented in Equation 3, where the quantity of each component is in mole fraction and their summation must add up to unity (Equation 4).

$$\log_{10}\left(\frac{\eta_L}{T-T_s}\right) = \frac{14788}{T-T_s} - 10.931 \quad \text{Equation 1}$$

$$T_s = 306.63 \cdot \ln(A) - 574.31 \quad \text{Equation 2}$$

$$A = \frac{3.19Si^{4+} + 0.855Al^{3+} + 1.6K^+}{0.93Ca^{2+} + 1.50Fe^{n+} + 1.21Mg^{2+} + 0.69Na^+ + 1.35Mn^{n+} + 1.47Ti^{4+} + 1.91S^{2-}} \quad \text{Equation 3}$$

$$Si^{4+} + Al^{3+} + Ca^{2+} + Fe^{n+} + Mg^{2+} + Na^+ + K^+ + Mn^{n+} + Ti^{4+} + S^{2-} = 1 \quad \text{Equation 4}$$

The composition of the liquid phase (slag) at different temperatures for each LWA was obtained using Factsage with varying fluxing agent concentrations and was used to estimate the viscosity of the liquid phase. It should be noted that during sintering at some temperatures, the LWA system is composed of liquid and solid phase concurrently; therefore, the suspension's (solid-liquid phase) viscosity becomes highly dependent on the volume fraction of solid phase. Thus, to estimate the viscosity of the solid-liquid suspension, the Krieger and Dougherty model was used (Equation 5).

$$\eta_s = \eta_L \left(1 - \frac{\phi}{\phi_m}\right)^{-[\eta]\phi_m} \quad \text{Equation 5}$$

where $\eta_s$ is the viscosity of the liquid-solid suspension, $\eta_L$ is the liquid phase (slag) viscosity, $\varphi$ is the volume fraction of solids (assumed to be equal to the mass fraction), $\varphi_m$ is the maximum particle packing fraction, and $[\eta]$ is the intrinsic viscosity. This equation is applicable in the range of $0<\varphi<\varphi_m$. In this study, it was assumed that particles are spheres leading to $[\eta]=2.5$, and $\varphi_m$ was calculated according to Stovall et al. model and was estimated to be 0.74.

Experimental Investigation

Thermogravimetric Analysis (TGA)

TGA was performed using a TA Instrument Q5000 IR model to (i) measure the unburnt carbon content of FA (which directly can affect the gas release potential of LWAs close to sintering temperature) and (ii) to evaluate the gas release potential of LWAs necessary for lightening mechanism. Those skilled in the art will recognize that other measuring instruments can be used.

In order to measure the unburnt carbon content of raw FA, a 2-atmosphere TGA (2A-TGA) performed under air and nitrogen was defined. The 2A-TGA steps were as follows: (1) the temperature was kept constant at 100° C. for 5 min, (2) with a 20° C./min incremental ramp, under nitrogen atmosphere, the temperature was increased to 750° C., (3) still under nitrogen gas the temperature was decreased to 100° C. with a 20° C./min ramp, (4) the atmosphere was changed to air and the temperature was kept at 100° C./min for another 5 min, and (5) finally, the temperature was increased to 1000° C. with a 20° C./min ramp. An approximate sample mass of 30 mg of raw FA was used for testing.

To simulate the sintering process and monitor the weight change (corresponding to gas release) of LWA, the TGA was performed on the geopolymerized pellets under air atmosphere, where the temperature was increased to 1160° C. with a ramp of 10° C./min and was held at that temperature for 4 min. To prepare the sample for this test, after 24 hours of curing the geopolymerized pellet was crushed using a mortar and pestle and then was sieved through a #200 sieve. ≈30 mg of collected powder was placed in a crucible pan, which was covered with fine refractory ceramic to prevent molten LWA (formed closed to sintering temperature) adhering to the pan.

X-Ray Computed Tomography (X-CT)

A Ziess Versa XRM 500 was used to perform X-CT and evaluate the pore structure of produced LWA. The x-ray tube was set for a voltage of 120 kV and a current of 83 µA while the scanning resolution was set for ≈19 µm. The exposure time per step for a rotation of 360° was ≈0.45 s. 2D projections of the LWA were collected and using the software supplied with the Ziess Versa XRM 500, tomographic reconstruction was performed to obtain approximately 1000 2D cross-sectional slice of the LWA. The visualization and calculations presented in this paper were performed using Dragonfly Software. Those skilled in the art will recognize that other measuring instruments and software can be used.

Phase Equilibria Predictions and Quantification of Liquid Phase Content

FIGS. 2A-2F show the phase diagrams for the F-FA with 0%, 2%, 4%, 6%, 8%, and 10% NaOH system, respectively, as a function of temperature. In F-FA+NaOH system, increasing the NaOH concentration transformed mullite and cordierite toward formation of a higher amount of Feldspar. Feldspar phase was composed of Anorthite ($CaAl_2Si_2O_8$), Albite ($NaAlSi_3O_8$), and k-feldspar ($KAlSi_3O_8$), which at lower temperature it was mainly composed of albite, while as the temperature increased the main composition transformed toward pure Anorthite. This is due to the fact that albite and k-feldspar have melting points of ≈1100° C. and ≈1200° C., respectively, while Anorthite's melting temperature is 1555° C. Increasing the NaOH concentration up to 6% promoted transformation of mullite and cordierite toward formation of feldspar and did not help with the formation of liquid phase. At 8% and 10% NaOH concentration the feldspar stability shifted toward formation of nepheline, which by increasing the temperature led to the formation of a greater quantity of liquid phase.

FIGS. 3A-3F demonstrate the predicted phase diagrams for C-FA with 0%, 2%, 4%, 6%, 8%, and 10% of NaOH, respectively, as the temperature changes from 800° C. to 1400° C. The initial melting temperature for all the NaOH concentrations was estimated to be at 1000° C. Incorporation of higher percentage of NaOH influences the stability of Feldspar, which is mainly a calcium bearing phase toward formation of Nepheline ($NaAlSiO_4$). Feldspar (Anorthite) has a melting point of 1555° C. while the melting point for Nepheline can lie between 1100° C. to 1256° C. This behavior can promote formation of higher amount of slag phase as can be seen from the phase diagrams.

Figure 4:
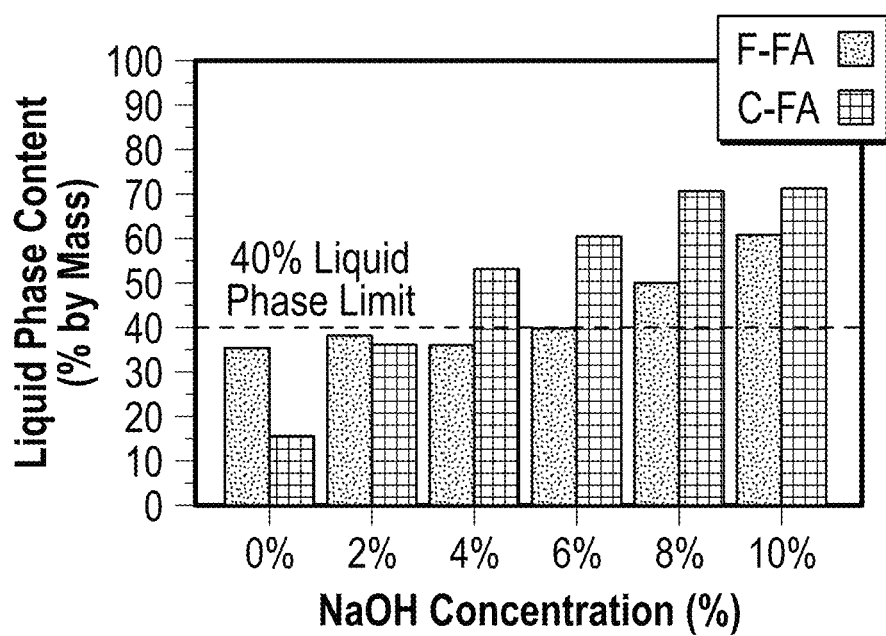
FIG. 4 is a graph showing liquid phase content of F-FA and C-FA at 1160° C. as a function of NaOH concentrations.

FIG. 4 shows the liquid phase content at 1160° C. for F-FA and C-FA as a function of NaOH concentration. For F-FA, the liquid phase content with NaOH concentrations of 0% to 6% was almost the same (i.e., ≈40%) and stayed below 40% limit, while with 8% and 10% NaOH concentration the liquid phase content passed this limit. On the other hand, for C-FA the liquid phase content gradually increased with incorporation of higher NaOH Concentration and at 4% NaOH concentration passed the 40% liquid phase content limit. This behavior is directly related to higher CaO content in C-FA. In the system of $Na_2O$—$Al_2O_3$—$SiO_2$ addition of CaO can promote the melting behavior of the system.

Figure 5A:
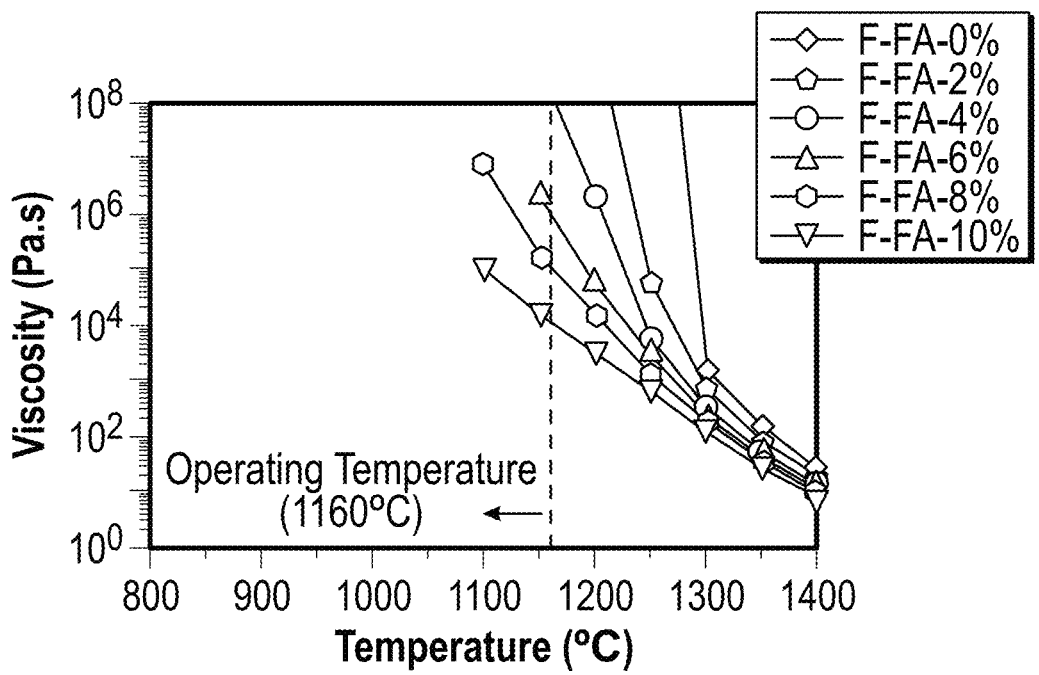
FIG. 5A is a graph of viscosity calculations for a solid-liquid suspension of LWA with various NaOH concentrations for F-FA.

FIG. 5A shows the viscosity of solid-liquid suspension in LWA made from F-FA. As can be seen by increasing the NaOH concentration the viscosity of solid-liquid decreased. It should be noted that although the F-FA 0% to 6% almost had the same liquid phase content (≈40%), however, increase in the NaOH concentration led to higher molar fraction of Na+, which has a fluxing role, in the liquid phase composition and reduced the liquid phase viscosity and consequently total viscosity.

Figure 5B:
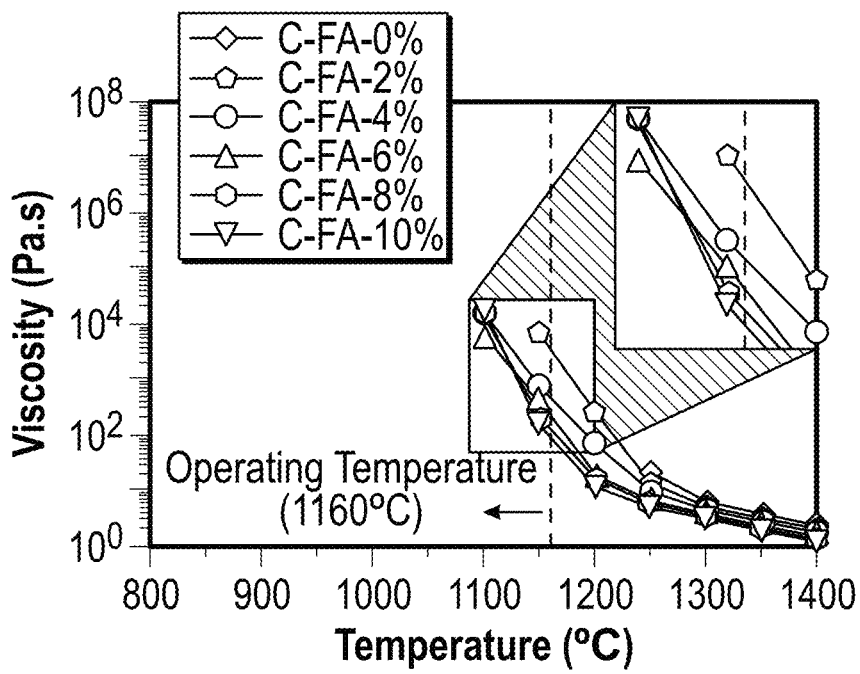
FIG. 5B is a graph of viscosity calculations for a solid-liquid suspension of LWA with various NaOH concentrations for C-FA.

FIG. 5B shows the solid-liquid suspension viscosity for the LWA made from C-FA. Incorporation of higher concentration of NaOH gradually reduced the viscosity by (i) promoting the formation of higher liquid phase content and (ii) the intensifying the fluxing role of $Na^+$. Generally, the lower viscosity values for C-FA in comparison with F-FA was due to the fact that C-FA had higher content of CaO, which has a notable fluxing role and can reduce the viscosity of liquid phase substantially.

Figure 6A:
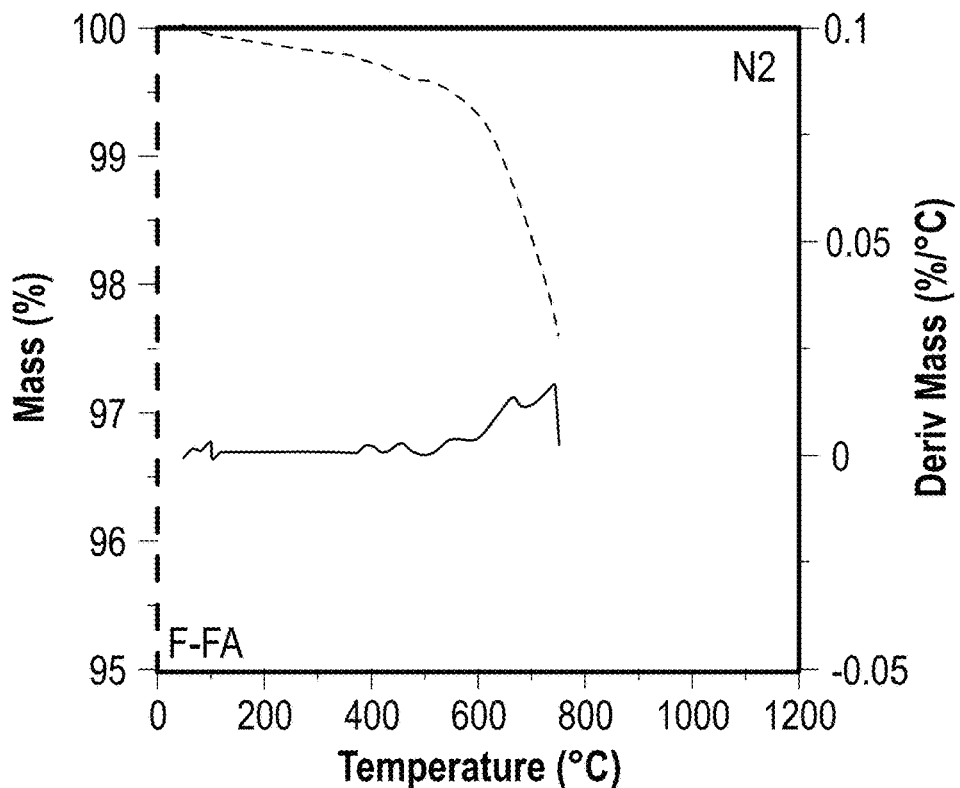
FIG. 6A is a graph of 2-atmosphere Thermogravimetric Analysis (TGA) performed on raw F-FA to determine unburnt carbon under a nitrogen atmosphere.
Figure 6B:
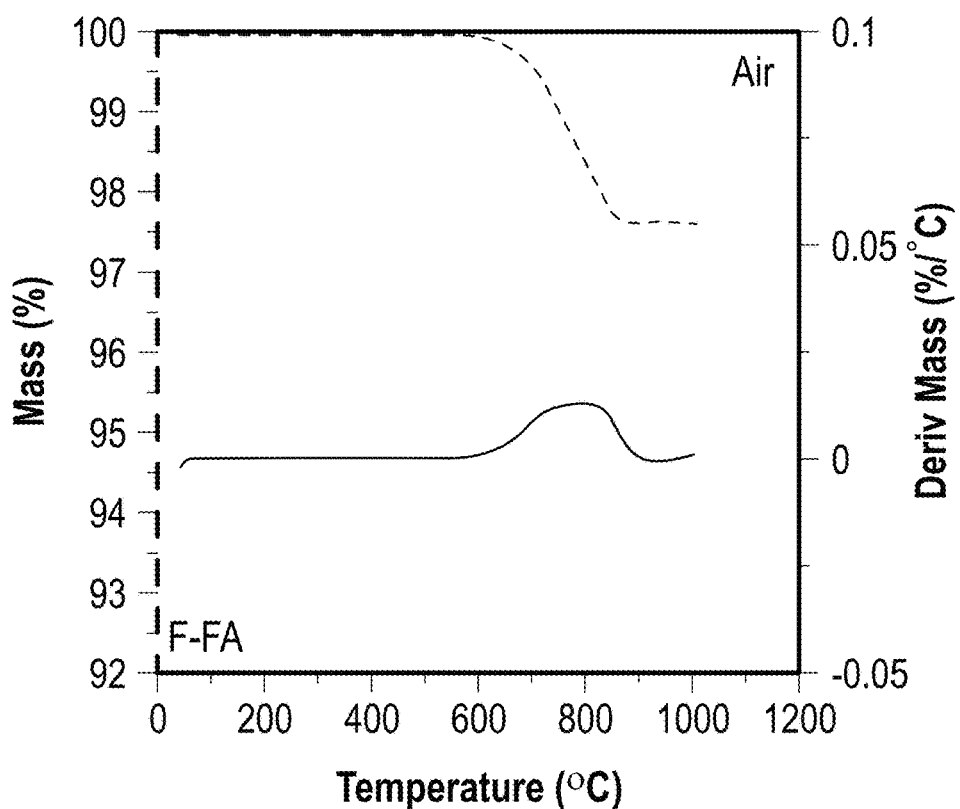
FIG. 6B is a graph of 2-atmosphere TGA performed on raw F-FA to determine unburnt carbon under an air atmosphere.
Figure 7A:
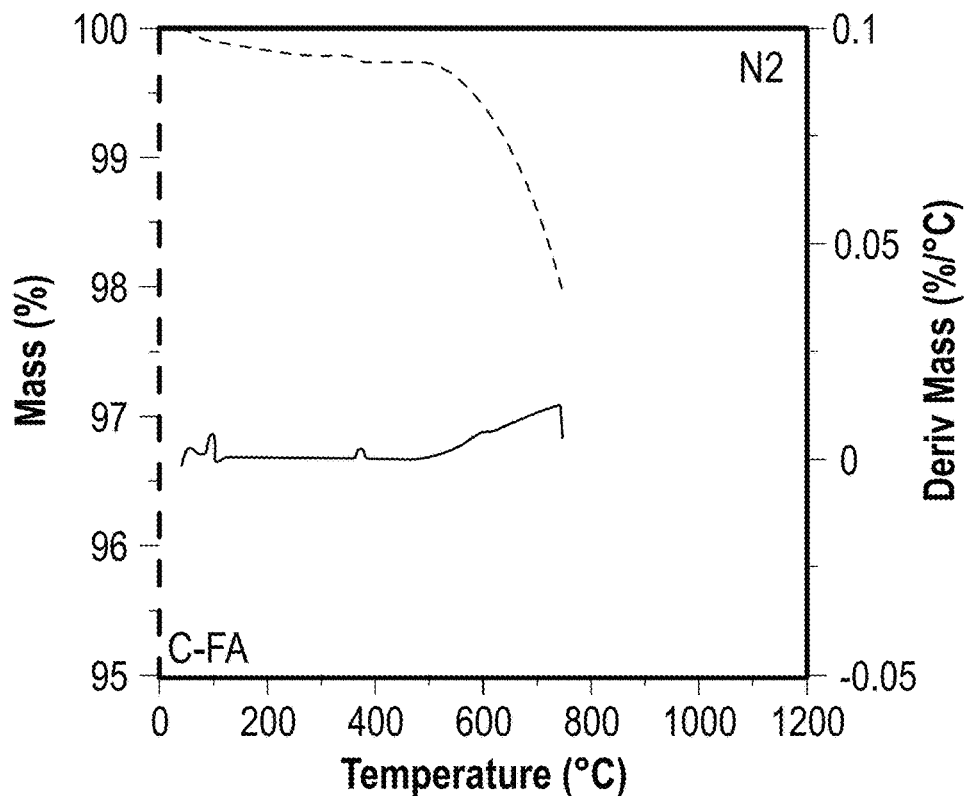
FIG. 7A is a graph of 2-atmosphere TGA performed on raw C-FA to determine unburnt carbon under a nitrogen atmosphere.
Figure 7B:
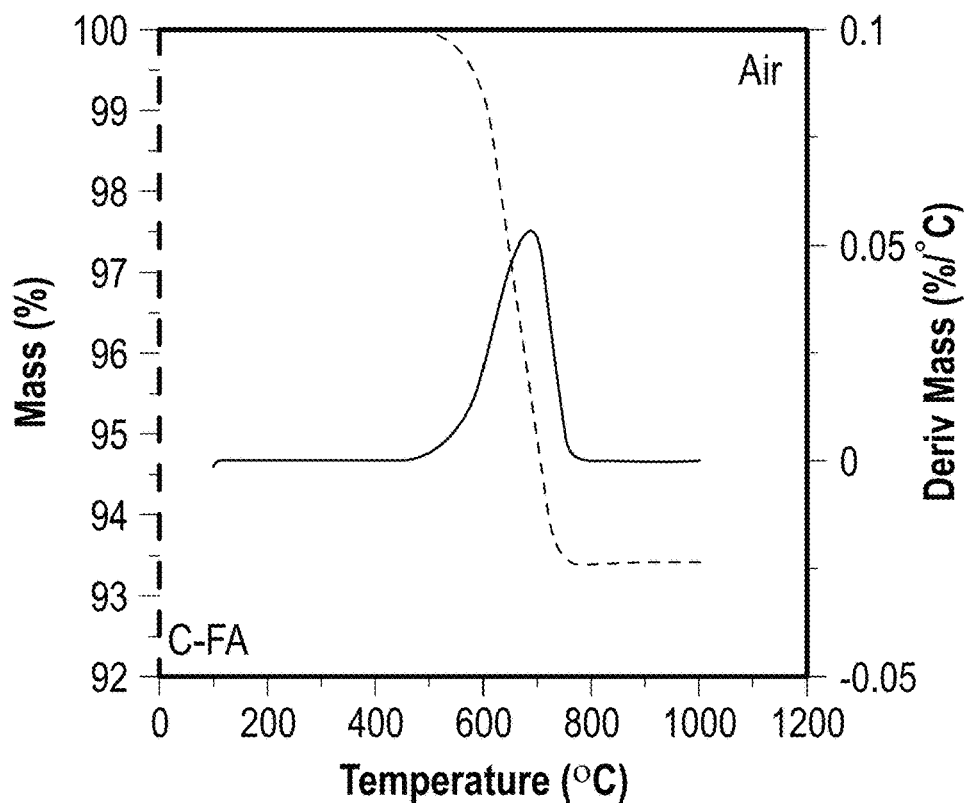
FIG. 7B is a graph of 2-atmosphere TGA performed on raw C-FA to determine unburnt carbon under an air atmosphere.
Figure 8A:
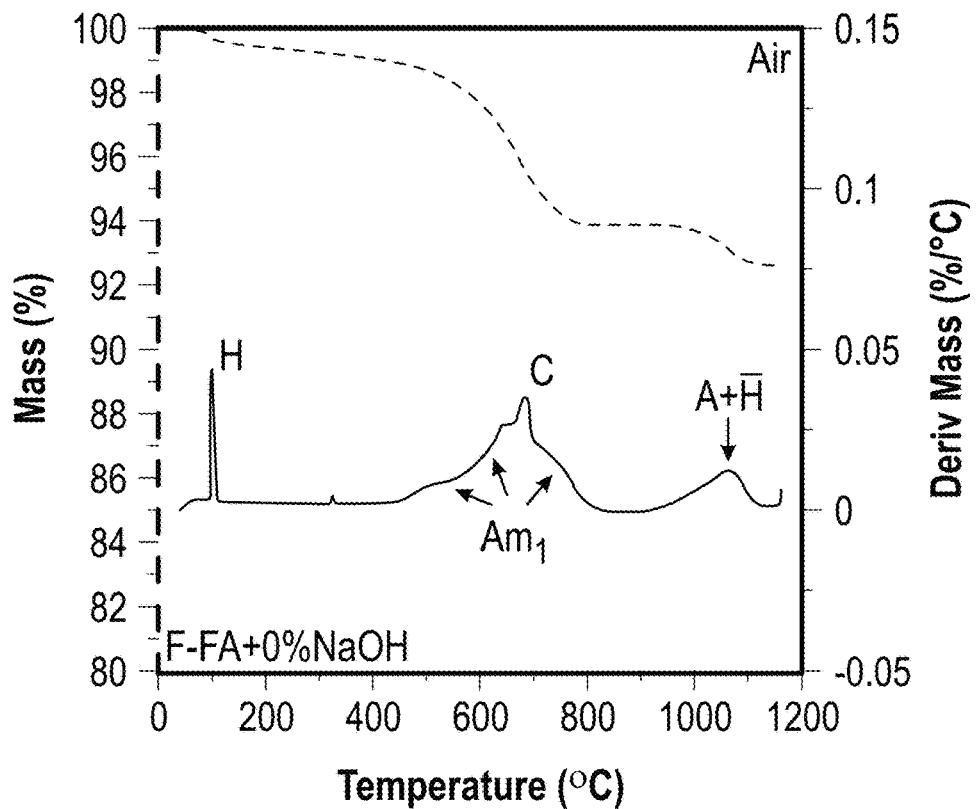
FIG. 8A is a graph showing Thermogravimetric Analysis/Derivative Thermogravimetry (TGA/DTG) curves for F-FA with 0% NaOH.
Figure 8B:
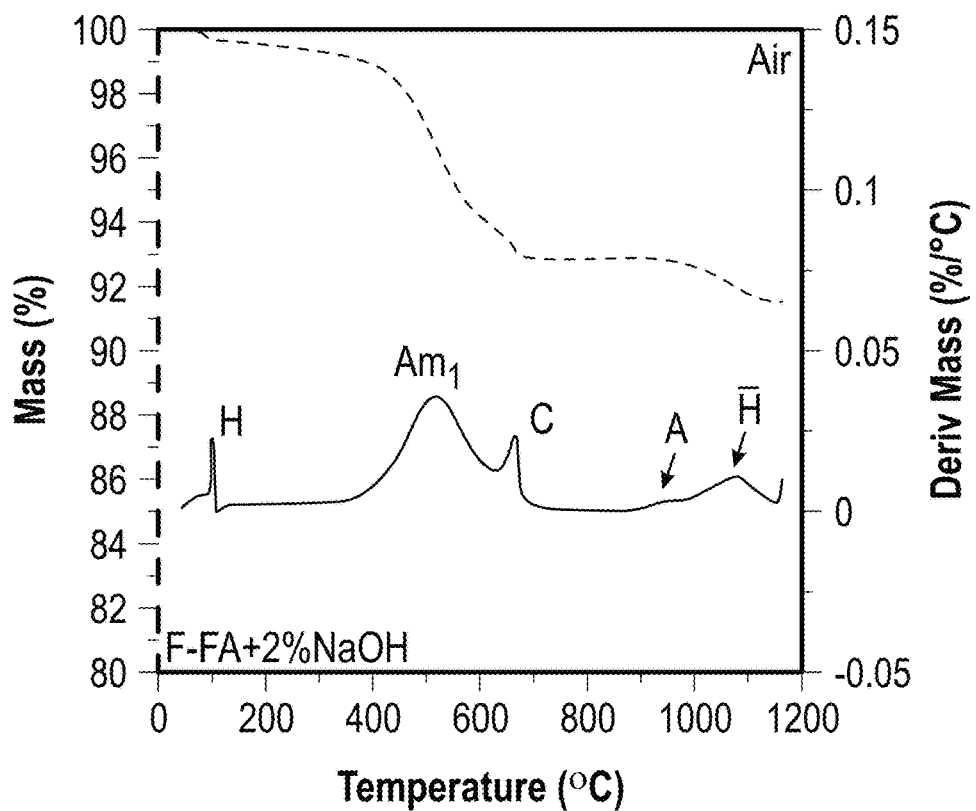
FIG. 8B is a graph showing TGA/DTG curves for F-FA with 2% NaOH.
Figure 8C:
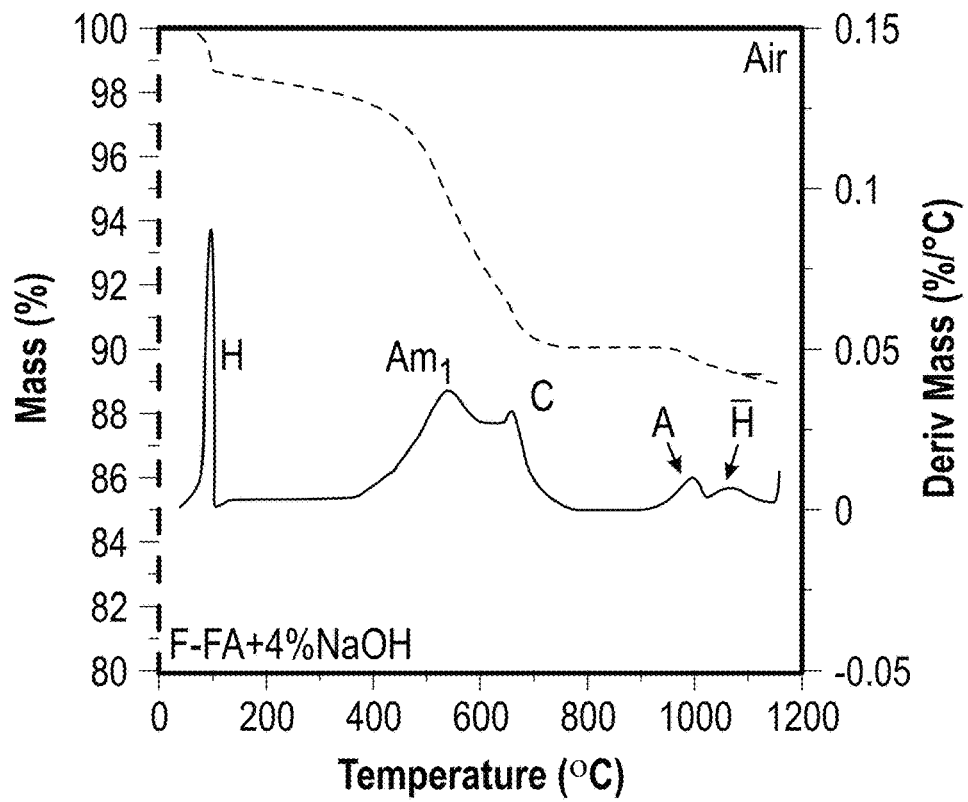
FIG. 8C is a graph showing TGA/DTG curves for F-FA with 4% NaOH.
Figure 8D:
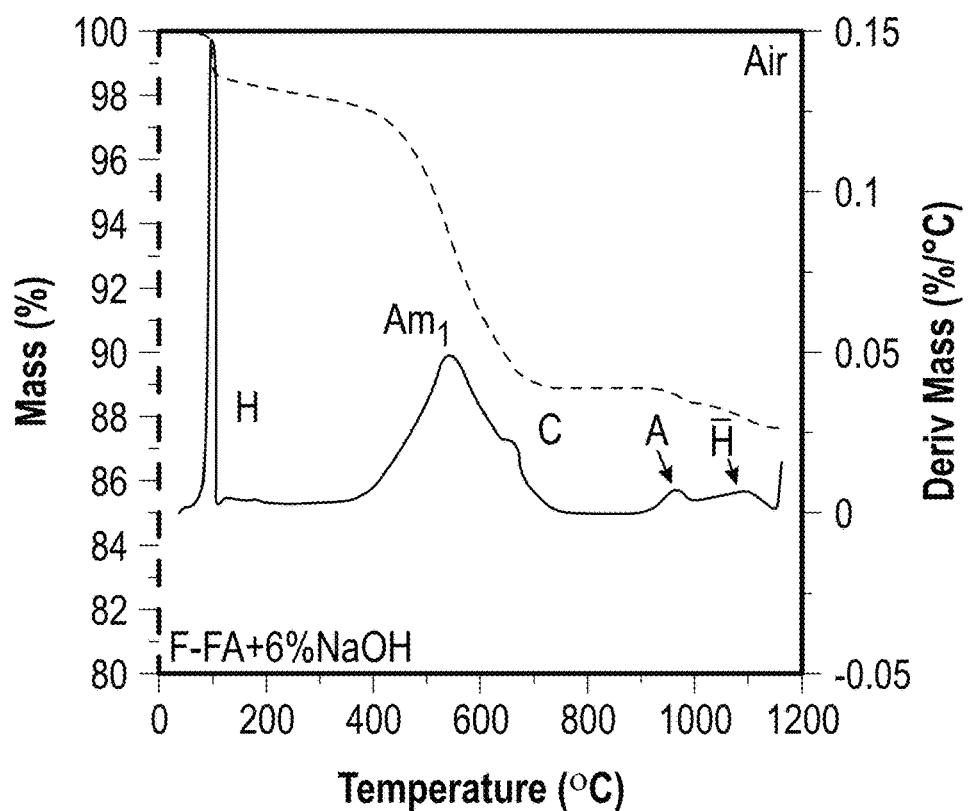
FIG. 8D is a graph showing TGA/DTG curves for F-FA with 6% NaOH.
Figure 8E:
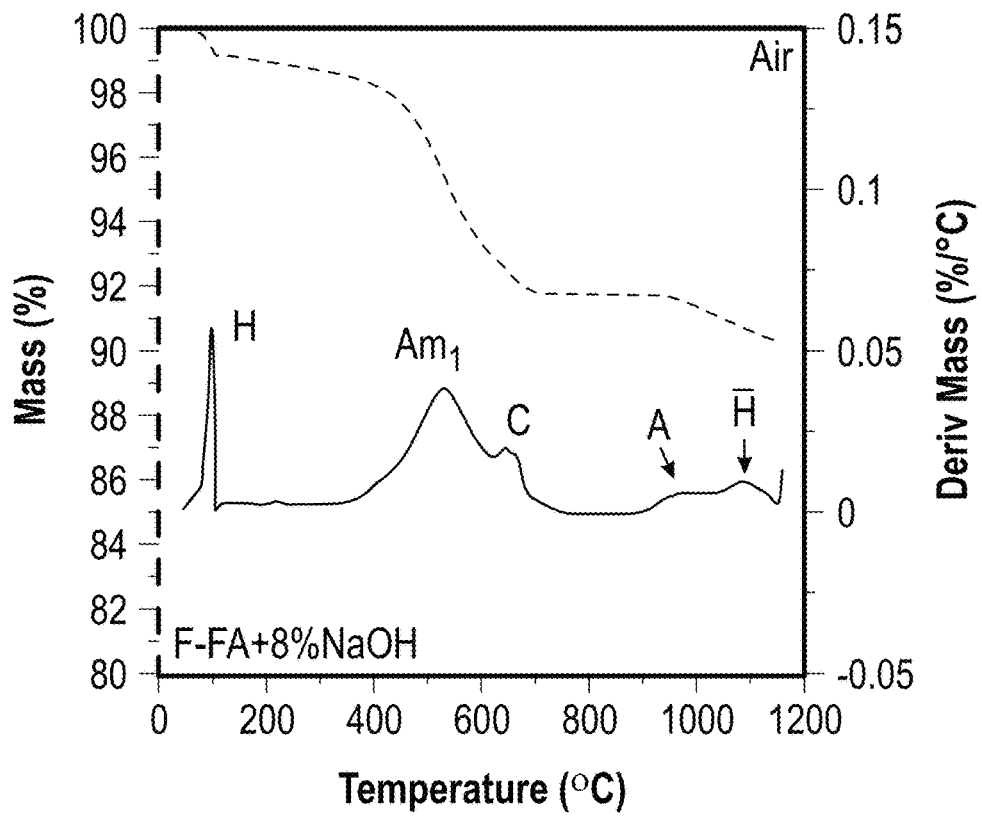
FIG. 8E is a graph showing TGA/DTG curves for F-FA with 8% NaOH.
Figure 8F:
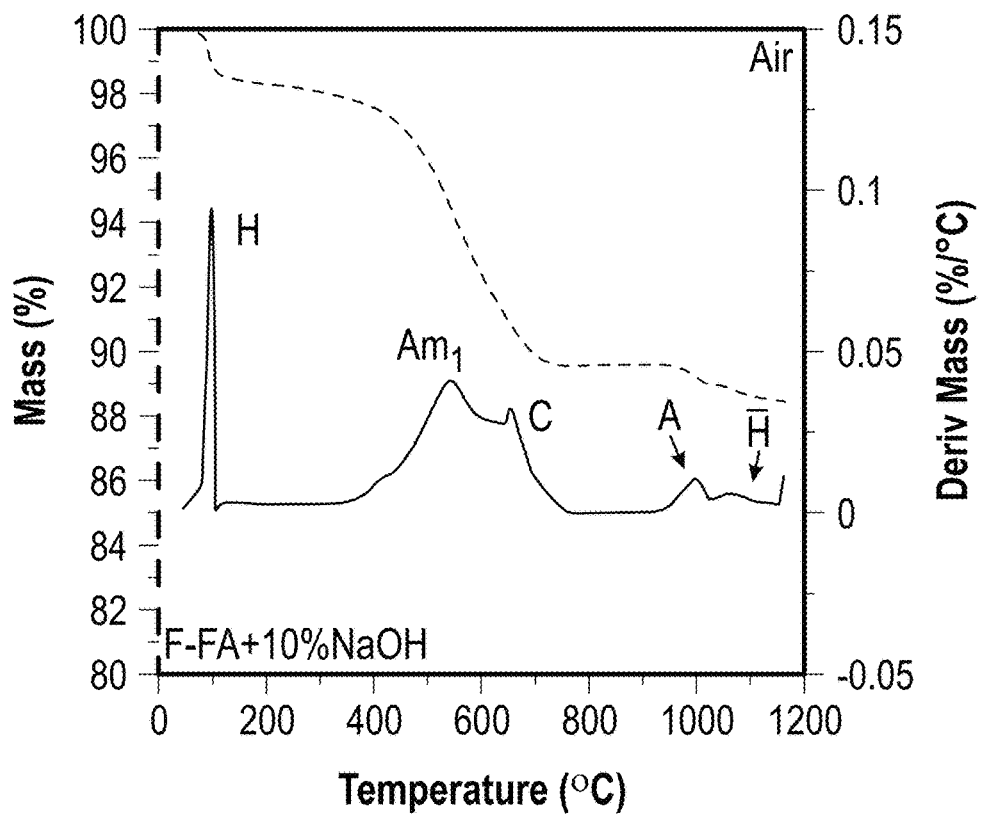
FIG. 8F is a graph showing TGA/DTG curves for F-FA with 10% NaOH.
Figure 9A:
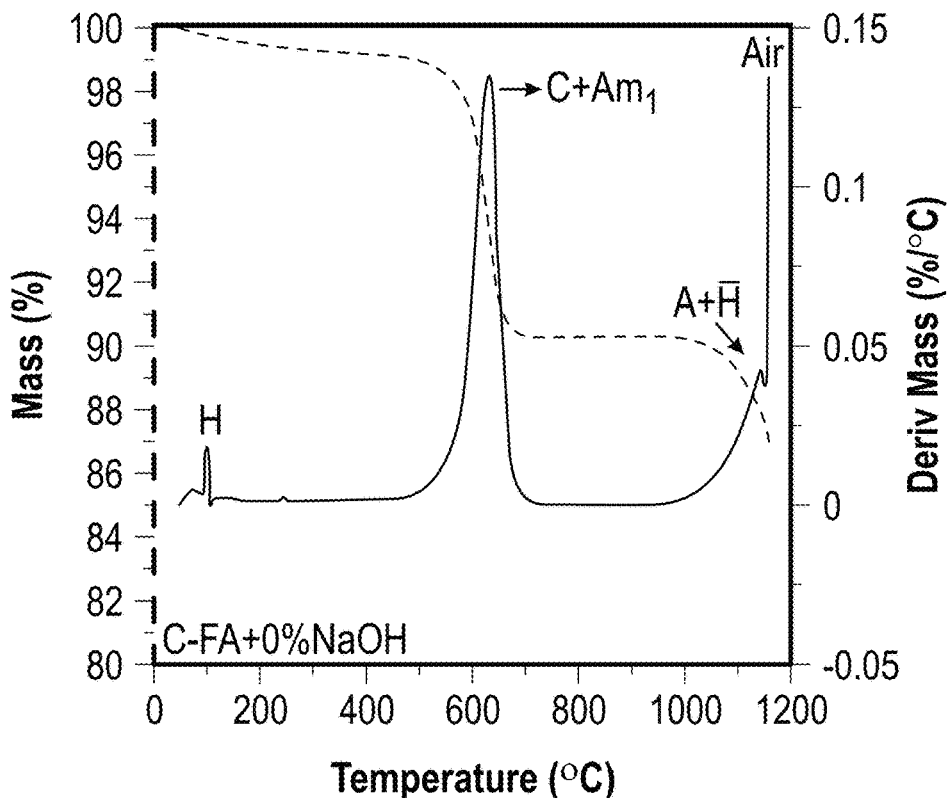
FIG. 9A is a graph showing TGA/DTG curves for C-FA with 0% NaOH.
Figure 9B:
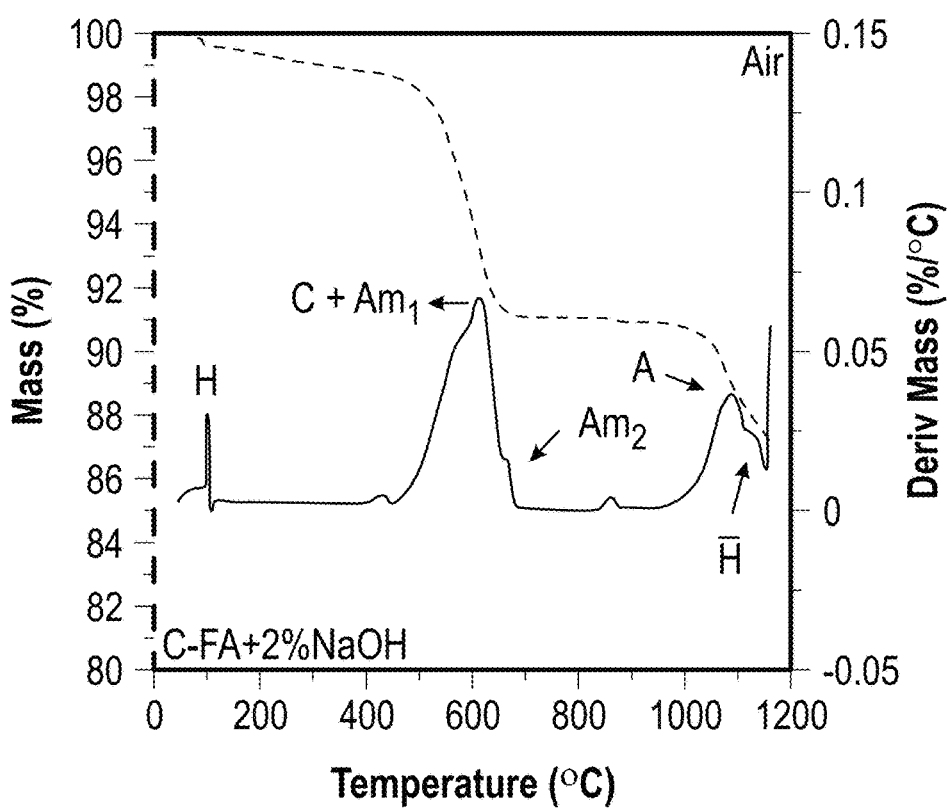
FIG. 9B is a graph showing TGA/DTG curves for C-FA with 2% NaOH.
Figure 9C:
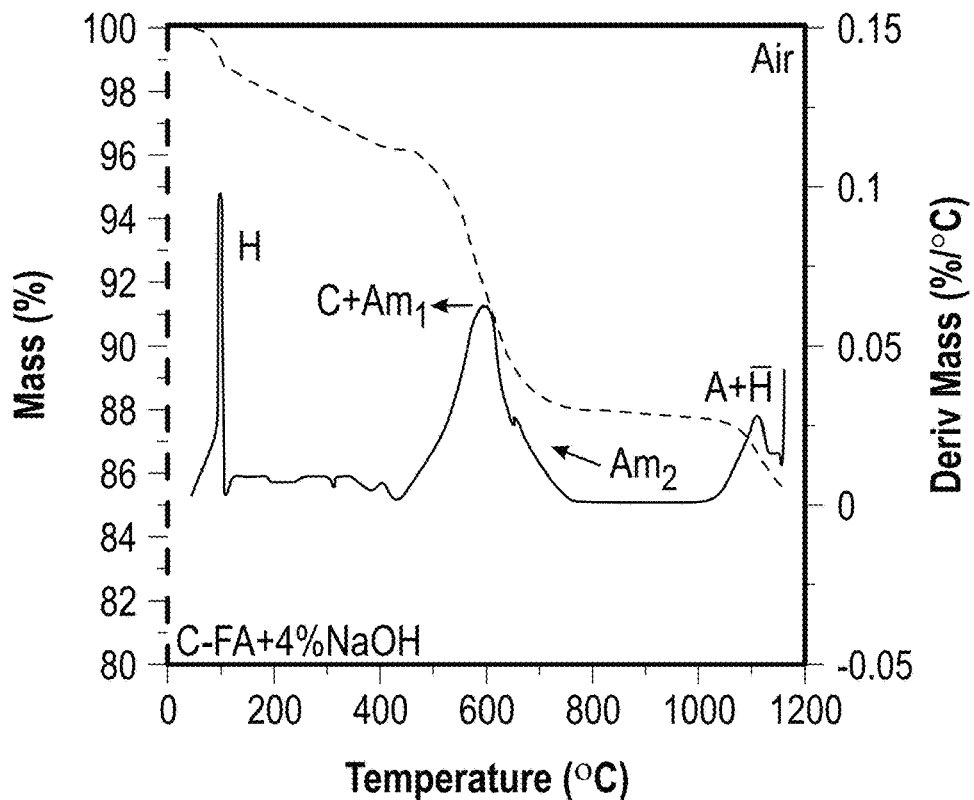
FIG. 9C is a graph showing TGA/DTG curves for C-FA with 4% NaOH.
Figure 9D:
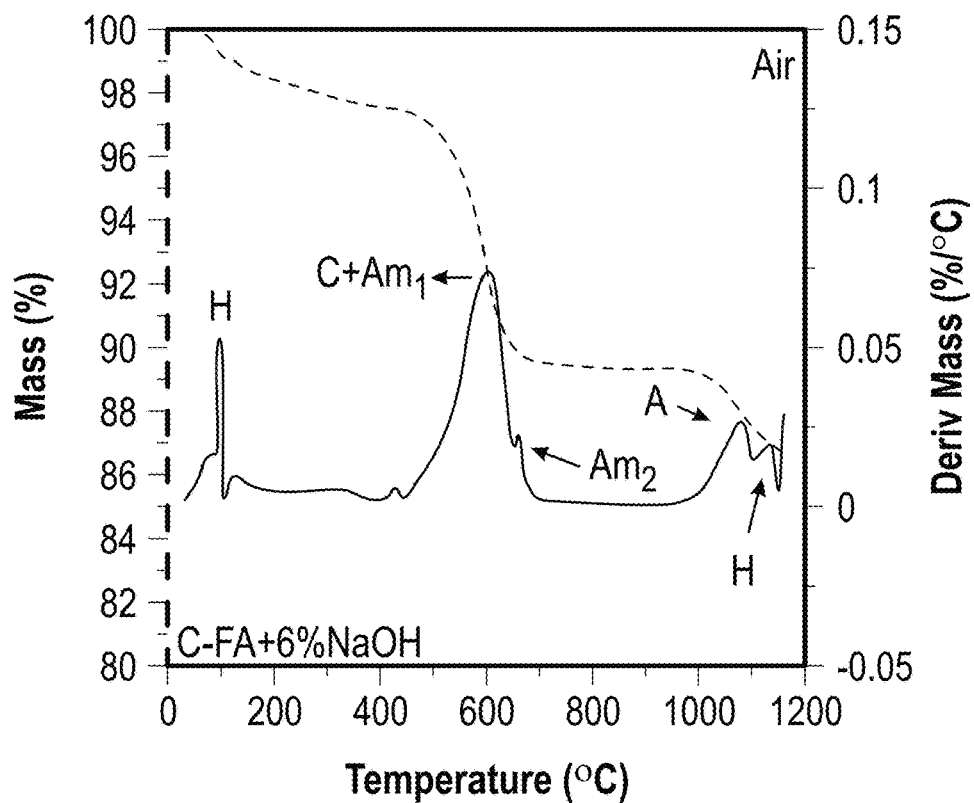
FIG. 9D is a graph showing TGA/DTG curves for C-FA with 6% NaOH.
Figure 9E:
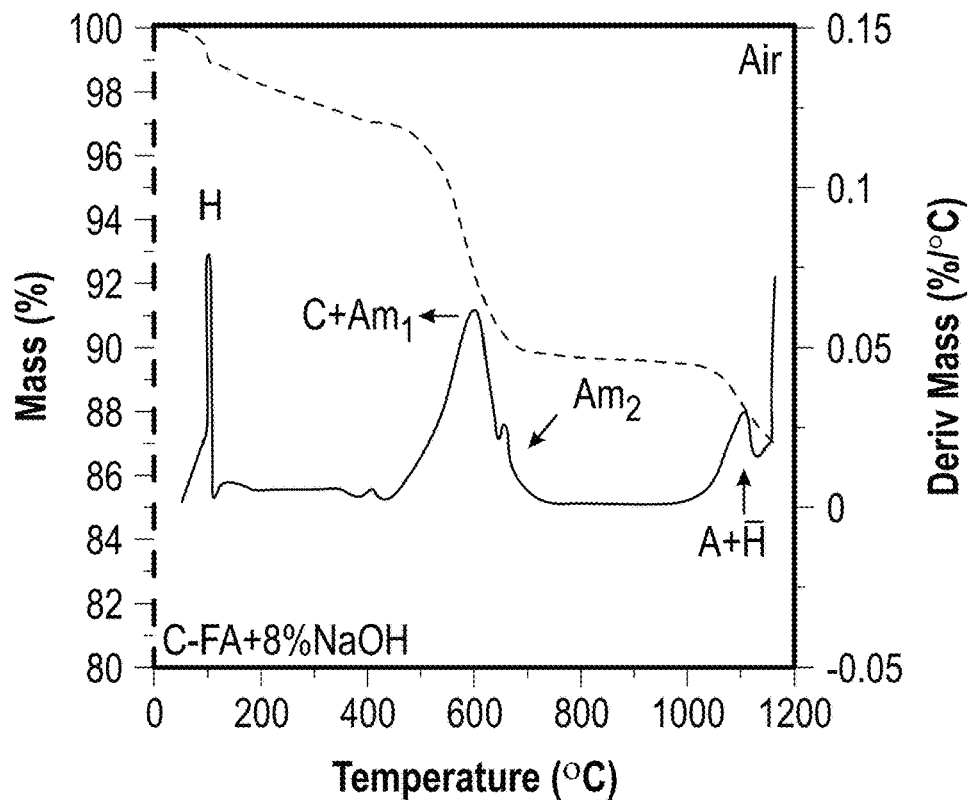
FIG. 9E is a graph showing TGA/DTG curves for C-FA with 8% NaOH.
Figure 9F:
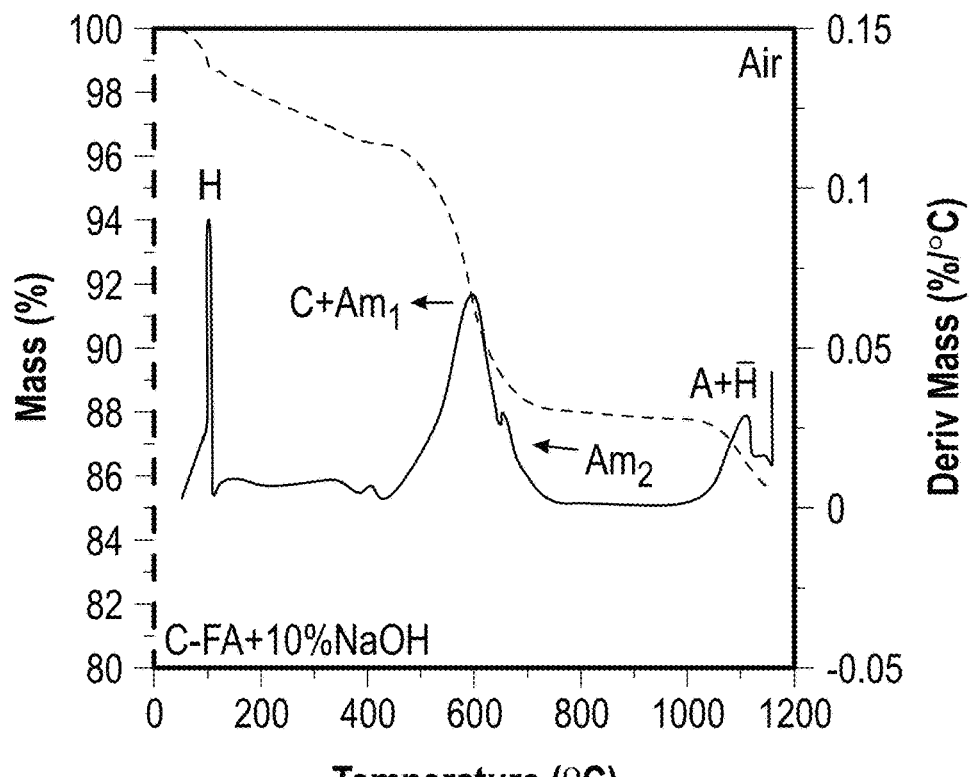
FIG. 9F is a graph showing TGA/DTG curves for C-FA with 10% NaOH.
Figure 10A:
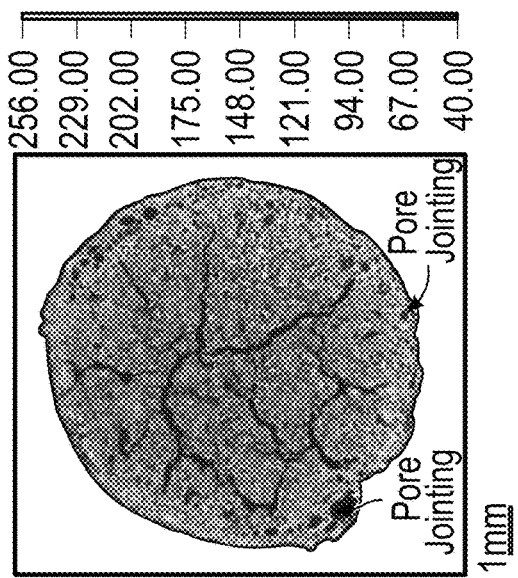
FIG. 10A is an X-ray Computed Tomography (X-CT) slice of 0% NaOH F-FA sintered LWA manufactured according to an exemplary method of the present invention.
Figure 10B:
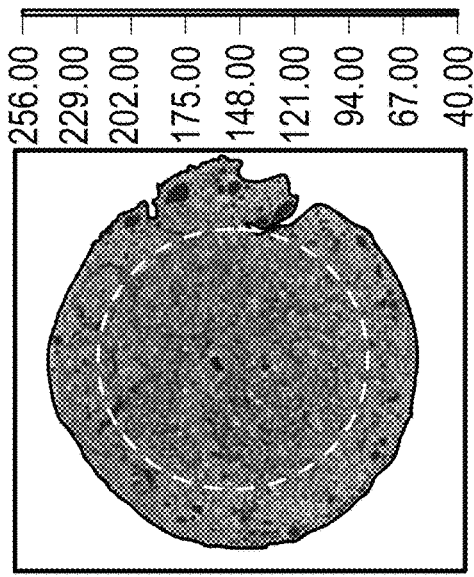
FIG. 10B is an X-CT slice of 2% NaOH F-FA sintered LWA manufactured according to an exemplary method of the present invention.
Figure 10C:
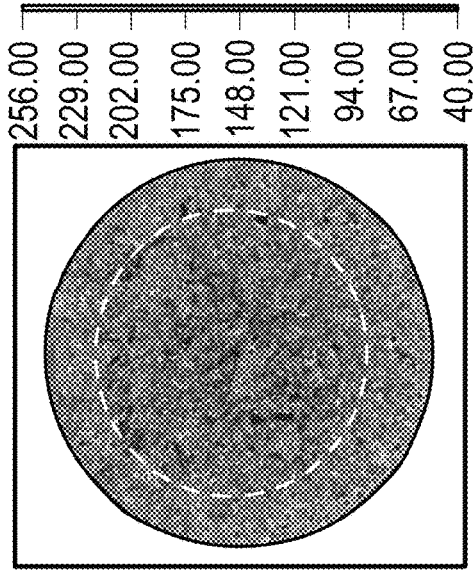
FIG. 10C is an X-CT slice of 4% NaOH F-FA sintered LWA manufactured according to an exemplary method of the present invention.
Figure 10D:
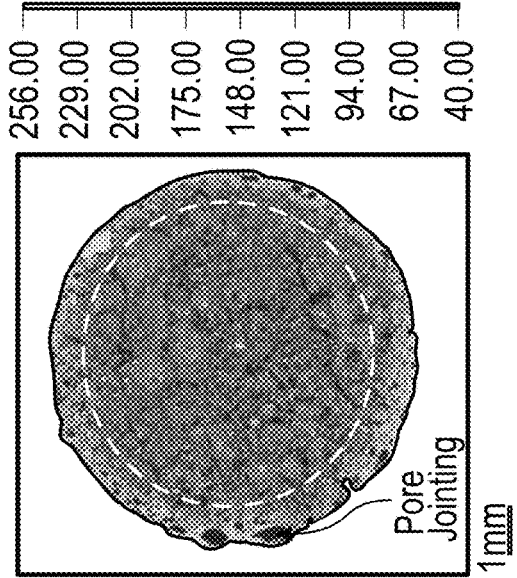
FIG. 10D is an X-CT slice of 6% NaOH F-FA sintered LWA manufactured according to an exemplary method of the present invention.
Figure 10E:
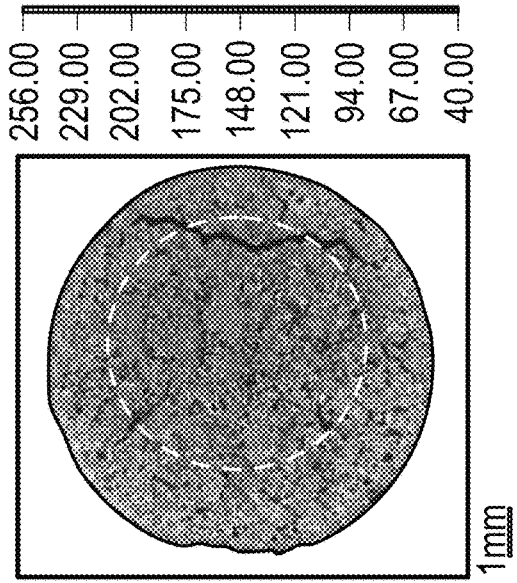
FIG. 10E is an X-CT slice of 8% NaOH F-FA sintered LWA manufactured according to an exemplary method of the present invention.
Figure 10F:
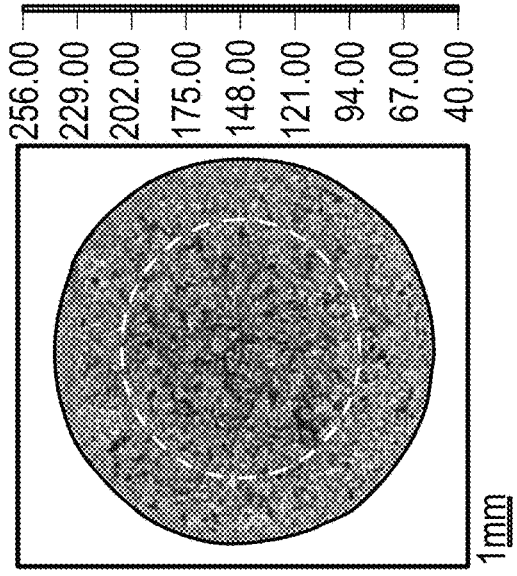
FIG. 10F is an X-CT slice of 10% NaOH F-FA sintered LWA manufactured according to an exemplary method of the present invention.
Figure 11A:
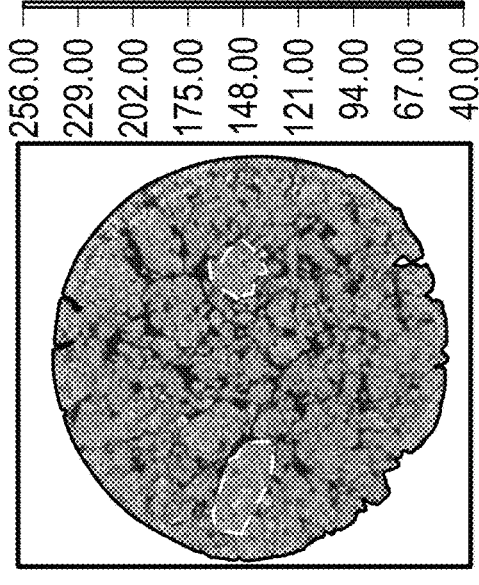
FIG. 11A is an X-CT slice of 0% NaOH C-FA sintered LWA manufactured according to an exemplary method of the present invention.
Figure 11B:
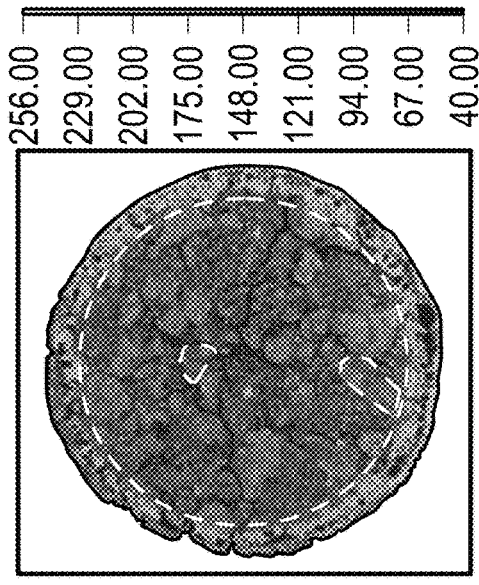
FIG. 11B is an X-CT slice of 2% NaOH C-FA sintered LWA manufactured according to an exemplary method of the present invention.
Figure 11C:
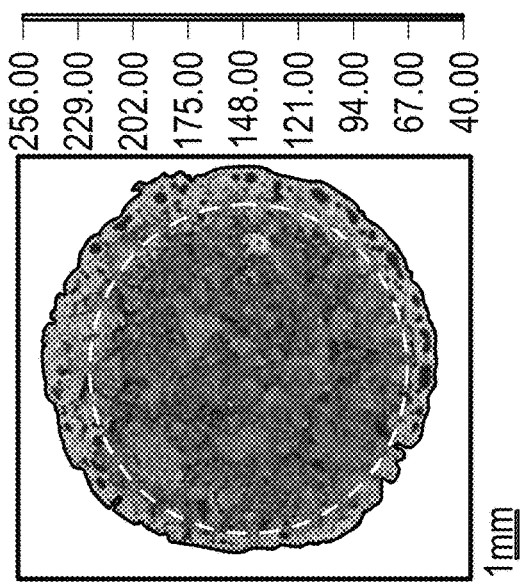
FIG. 11C is an X-CT slice of 4% NaOH C-FA sintered LWA manufactured according to an exemplary method of the present invention.
Figure 11D:
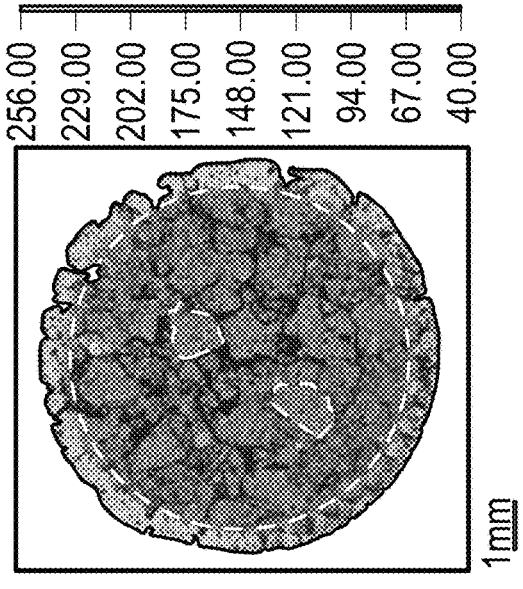
FIG. 11D is an X-CT slice of 6% NaOH C-FA sintered LWA manufactured according to an exemplary method of the present invention.
Figure 11E:
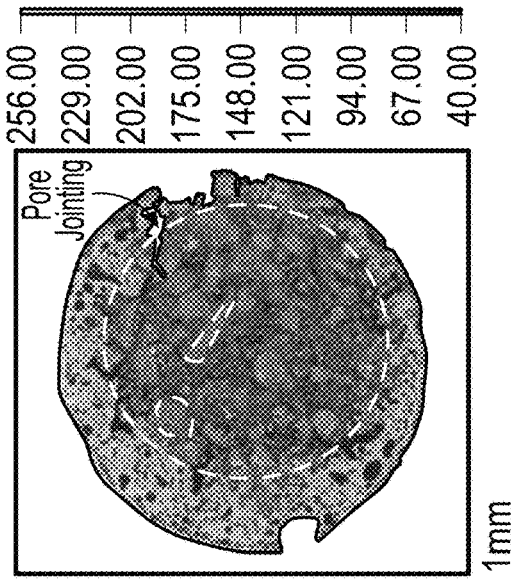
FIG. 11E is an X-CT slice of 8% NaOH C-FA sintered LWA manufactured according to an exemplary method of the present invention.
Figure 11F:
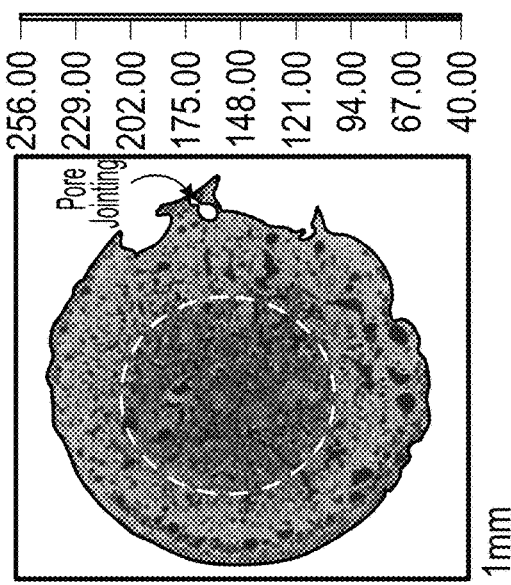
FIG. 11F is an X-CT slice of 10% NaOH C-FA sintered LWA manufactured according to an exemplary method of the present invention.

The unburnt carbon content available in the system can influence the extent of gas release close to sintering temperature; therefore, it is crucial to determine the unburnt carbon content of the fly ash. FIGS. 6A-B and 7A-B show the 2A-TGA performed on F-FA and C-FA respectively. For F-FA, as shown in FIG. 6A under $N_2$ atmosphere, the weight loss up to 500° C. could be related to evaporation of moisture and from 500° C. to 750° C. could be attributed to decomposition of amorphous phase available in the ash (see Table 2). In the second step, as shown in FIG. 6B and, under air atmosphere, the weight loss could be related to oxidation of unburnt carbon. It should be noted that the decomposition in the second step started at 600° C., which shows an overlap with the decomposition of amorphous phase in the first step i.e., under $N_2$ gas; therefore, it could be inferred that amorphous phase and carbon oxidation have overlapping in their decomposition. In the case of C-FA, as can be seen in FIG. 7A, the weight loss before 500° C. could be related to gradual evaporation of water, while after this temperature the decomposition can be related to amorphous phase. Similarly, the weight loss under air atmosphere demonstrated in FIG. 7B, which started at 500° C. was related to oxidation of unburnt carbon. The unburnt carbon content for F-FA and C-FA was determined to be 2.3% and 7%, respectively.

TGA was performed on geopolymerized pellets to simulate the sintering process and evaluate the gas release potential of LWA that leads to bloating mechanism. FIGS. 8A-8F show the TGA/DTG curves for the F-FA with incremental concentration of NaOH from 0% to 10%, respectively. As the temperature increased from room temperature to 1160° C., a few weight losses were observed which were corresponding to the decomposition of phases and accordingly gas release. H Peak is related to the release of free water from the structure of material. As the NaOH concentration increased a peak indicated as $Am_1$ was intensified in the range of ~400° C. to 650° C., which was corresponded to the formation of N-A-S—H gel in the material. The other peak designated by C occurring at 650° C. was most probably related to burning the free carbon content. However, it should be kept in mind, the decomposition of amorphous phase and carbon could overlap with each other. It should be noted that from 2A-TGA it was understood that burning the free carbon occurred between 600° C. and 900° C., with a peak at 800° C. However, in the case of geopolymerized pellets it appears that free carbon burning peaked at ~650° C. Two more decompositions occurred at temperatures greater than approximately 950° C., which were merged at 0% NaOH concentration and started to separate as the NaOH concentration increased. These two decompositions were seemingly related to anhydrite (showed with A) and hematite (showed with H⁻). Hematite reduction could be facilitated by the presence of unburnt carbon in the ash. Therefore, it is speculated the reason for observing the gas release by reduction of hematite is partially related to the presence of 2.3% unburnt carbon.

FIGS. 9A-9F show the TGA performed on C-FA with NaOH concentration varying from 0% to 10%. The peak occurred at constant temperature of 100° C. indicated by H was related to free moisture release. The sharp peak designated by $C+Am_1$ was related to co-occurrence of amorphous phase decomposition and oxidation of free carbon from the material occurring at the range of 500° C. to 700° C. By increasing the NaOH concentration from 0% to 10% a peak located at the shoulder of peak $C+Am_1$ was appeared, designated by $Am_2$, which most probably was related to the formation of amorphous C—(N)-A-S—H gel. Finally, two peaks were identifiable in the range of 950° C. to 1160° C., which was corresponded to decomposition of anhydrite and release of oxygen from hematite. These two peaks are indicated by A and H denoting anhydrite and hematite, respectively. C-FA LWA releases gaseous phase almost as three times as that of F-FA LWA close to the final sintering temperature. It could be related to the fact that C-FA had 2 times and 3 times more anhydrite and unburnt carbon, respectively, compared to F-FA. Greater unburnt carbon could be a potential source to facilitate reduction of hematite.

Evaluation of LWA Pore Structure Using X-CT

FIGS. 10A-10F and 11A-11F show the 2D slice of F-FA (FIGS. 10A-10F) and C-FA (FIGS. 11A-11F) with incremental NaOH concentration. As can be seen for F-FA LWA, a "core-shell" morphology could be identified for the LWA. These two regions are separated by the circular/elliptical white dashed line on the 2D slices. The "shell" refers to the outer part of white dashed circle/ellipse, where spherical type pores were located. While the pores formed in the shell of F-FA-0% were in the size of 100 μm, the general trend implied that upon incremental NaOH addition, the pore located in the shell of LWA became larger. On the other hand, the middle part of the LWA (inner part of the white dashed line circle/ellipse), which is surrounded by shell is referred to as "core". In this region, seemingly pores are more interconnected and elongated. One of the reasons for formation of this morphology is related to the heat barrier created by the shell which delays the heat transfer to the middle part of the LWA. This phenomenon most probably resulted in the observation that the shell of LWA tends to have a higher gray scale value (GSV) compared to the core, which corresponds to higher density (this observation is more pronounced in the case of C-FA LWA). Interestingly, some major cracks were observed in the core of F-FA-4% LWA, and to a lesser extent for F-FA-8% and F-FA-10%. Two possible explanation could be considered for this observation: (i) occurrence of thermal cracking due to shrinkage during rapid sintering and (ii) displacement of the core of LWA by the release gas from the material.

As can be seen for C-FA-0%, a severe cracking occurred in the LWA, which could possibly be related to the two aforementioned reasons. Upon adding NaOH to the LWA, the core-shell morphology occurred for C-FA LWA as well. The shell embedded spherical type pores, which indicated the fluxing role of NaOH and formation of the liquid phase in the LWA. By passing 6% NaOH concentration the shell's thickness increased noticeably and the core of the LWA became smaller. As it can be seen, even in the presence of NaOH some cracks were formed in the core of the LWA. The cracks in the core of the LWA caused formation of island-type solid phase demonstrated by the white dashed line. Presence of the cracks in the core could potentially affect the structural integrity of the LWA. On the other hand, it is plausible that cracks could help with moisture transport and dynamics in the LWA pores. As it was mentioned the shell appears to have higher GSV and density, which is related to the fact that shell has experienced higher temperature compared to the core and more densification has occurred in that part.

The three required conditions for successful production of LWA through sintering (i.e., (i) sufficient amount of liquid phase; (ii) appropriate viscosity for the solid-liquid suspension; and (iii) adequate amount of effective gas release) are now discussed.

Formation of Liquid Phase During Sintering

Formation of the liquid phase in the LWA is a crucial factor to provide a medium for pore expansion and consequently the lightening mechanism. It is known that formation of 50% liquid phase in the LWA made from bottom ash could ensure presence of sufficient amount of liquid phase that can lead to lightening mechanism (bloating). However, presently, the raw material is FA with a considerably smaller particle size distribution (or higher surface area) compared with bottom ash is expected to have a different liquid phase content limit that can ensure pore expansion in the LWA. This was mainly due to the fact that higher surface area can supposedly promote the liquid phase formation. Presently, a 40% liquid phase content limit was defined (see FIG. 4). Correlating this limit with the XCT observations revealed that for F-FA LWA, starting with F-FA 0% (having 35.4% liquid phase content) the small spherical type pores (in the range of 100 microns) were formed in the shell of the LWA. As the NaOH concentration gradually increased the liquid phase content got closer to 40% limit and finally passed it, which was consistent with the XCT observations, where showed formation of bigger spherical/round type pores (in the range of 500 microns) in the shell of the LWA. F-FA LWA passed the 40% limit at 6% NaOH concertation, which by looking at XCT observations formation of larger pores was notable.

In the case of C-FA LWA the liquid phase content for C-FA 0% was 15.7%, which was far below 40% limit. Correlating that with XCT observation (see FIGS. 10A-10F) it can be seen that no spherical type pores were formed in the shell of LWA. While as soon as in C-FA 2% the liquid phase content got close to 40% limit, some round pores started to form in the shell of LWA. In addition, as the NaOH concentration gradually increased the fluxing role of NaOH promoted formation of more liquid phase content (see FIG. 4), which provided a greater medium for pore expansion in the LWA. One of the reasons that C-FA LWA formed bigger pores compared with F-FA LWA, is due to higher liquid phase content for the former at each NaOH concertation (except 0% NaOH concertation) (see FIG. 4).

Viscosity of Solid-Liquid Phase During Sintering

Appropriate viscosity plays two major roles in the successful production of LWA through sintering; (i) allowing for the pores created by diffusion of gaseous phase into the liquid phase to expand and contribute to the bloating of LWA (the lesser viscosity the easier pore expansion occurs); and (ii) preventing excessive deformation for the LWA under gravitational force or the force created by pore expansion. For F-FA LWA as it was observed (see FIG. 5A) increasing the NaOH concentration decreased the viscosity of solid-liquid phase. Correlating this observation with that of XCT, it was observed that by increasing the NaOH concentration the pores became larger and some pore jointing occurred. This was directly related to the decreasing trend of viscosity for solid-liquid phase which allowed easier expansion and movement of pores in the liquid phase. Almost the same trend was observed for the C-FA LWA, i.e., as the NaOH concentration increased the viscosity of solid-liquid phase decreased, which allowed for easier expansion and jointing of the pores. A comparison between the pore structure of C-FA LWA and F-FA LWA implies formation of larger pores in the former. One of the reasons related to this difference is the lesser viscosity for the solid-liquid phase in C-FA LWA compared to F-FA LWA (see FIGS. 5A and 5B). C-FA possessed a higher content of CaO, which has a notable fluxing role and reduced the viscosity considerably.

Gaseous Phase Formation During Sintering

Figure 12:
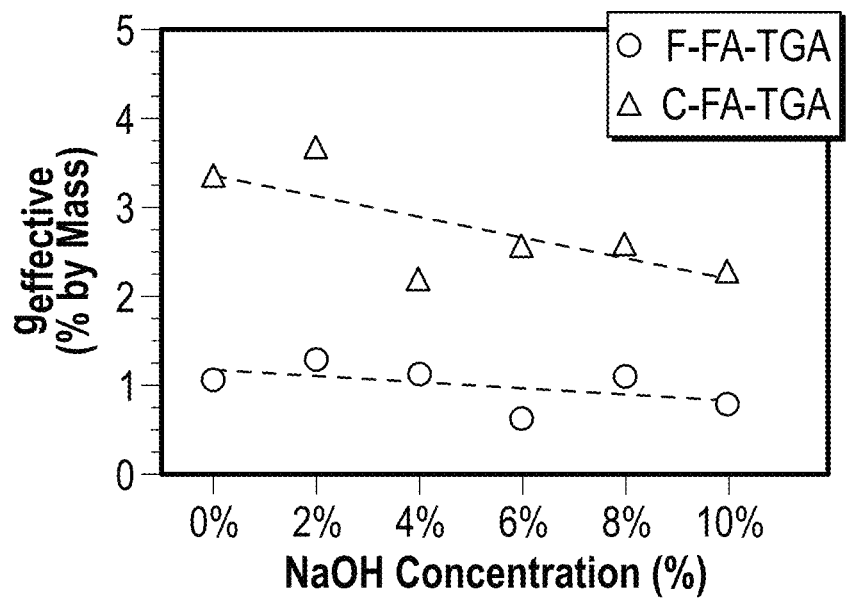
FIG. 12 is a graph showing effective gas release measured using TGA for F-FA and C-FA with varying NaOH concentration.

Formation of gaseous phase close to the sintering temperature that can be captured by the liquid phase would ensure pore creation and consequently occurrence of bloating in the LWA. In this study, the effective gas release ($g_{effective}$), which can contribute to the bloating of LWA was defined as the amount of released gas between the initial melting temperature (obtained from the phase diagrams) and ultimate sintering temperature i.e., 1160° C. FIG. 12 shows the $g_{effective}$ for F-FA and C-FA with varying NaOH concentration based on TGA results. As can be seen, TGA results indicated a considerable amount of gas release for both types of materials. When conditions (i) and (ii) are both satisfied with even 0.24% of $g_{effective}$, formation of gas filled pores is ensured in the LWAs made from bottom ash. The minimum $g_{effective}$ measured using TGA was that of F-FA 6% LWA equal to 0.64%, which by looking at XCT observation spherical type pore formation could be confirmed. It should be noted that, another possible reason for larger pores formed in C-FA LWA compared with F-FA LWA could be related to the higher $g_{effective}$ by former LWA.

Based on FIG. 12, TGA results indicated a trend for $g_{effective}$, where a slight reduction was observed for both FAs as the NaOH concentration increased. The thermodynamic modelling indicated that at low NaOH concentration the gas release was a mixture of $O_2$, $SO_2$, and $SO_3$. However, as the NaOH concentration increased the $O_2$ portion of the gas mixture decreased. This could be related to oxidation reactions occurring at high temperature which resulted in oxygen absorption. Higher $g_{effective}$ for C-FA in comparison with F-FA was related to both higher $SO_2+SO_3$ and $O_2$ gaseous phase released by this material. This could be partly justified by higher content of $SO_3$ in the chemical composition of C-FA (see Table 1).

Figure 13:
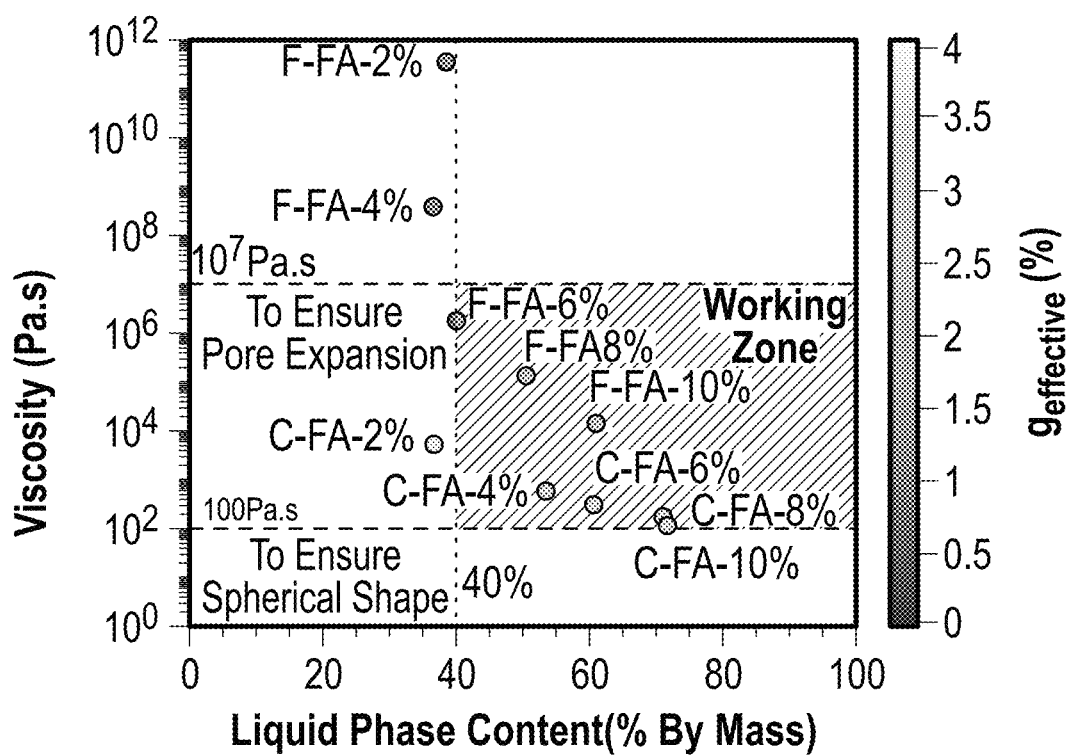
FIG. 13 is a plot showing a working zone satisfying the three necessary conditions for LWA production using fly ash.

To put the three required conditions (liquid phase content, viscosity of solid-liquid phase, and effective gas release amount) into perspective, a diagram was developed based on these quantified conditions, which is presented in FIG. 13. The location of each circle, associated with the produced LWA, is based on its liquid phase content and viscosity, and the color is associated with the $g_{effective}$ of that LWA from TGA results. As shown in FIG. 13, no LWA exceeds 80% liquid phase content.

If an LWA cannot be observed on this diagram that is due to the high viscosity for the solid-liquid phase. As it was discussed, 40% liquid phase content was necessary to provide a medium for expansion of the pores. The vertical dashed line shows the limit associated with the liquid phase content. For the LWA produced from bottom ash, a minimum 100 Pa·S viscosity was required to prevent deformation under gravitational force and retain the spherical shape. Correlating the XCT observation with that of viscosity it was found that distinguishable pore expansion started to occur in F-FA 6% LWA. This observation was translated to an upper limit of $10^7$ Pa·S, which below that the pore expansion could be expected in the LWA. Based on the proposed limitations F-FA 6%, F-FA 8%, F-FA 10%, C-FA 4%, C-FA 6%, C-FA 8%, and C-FA 10% were placed in this working zone. In this working zone the minimum $g_{effective}$ was that of F-FA 6%, which was 0.64%. Based on this work and the previous work it appears that even a minimum of 0.24% $g_{effective}$ could effectively contribute to pore creation in the LWA. Based on the proposed working zone and "C-FA LWA" it is expected that more than 80% liquid phase content could decrease the viscosity to less than 100 Pa·S for C-FA LWA, which deviates the spherical shape of the LWA. Therefore, a maximum of 80% liquid phase content was selected for the upper bound of C-FA LWA.

Therefore, the three necessary conditions for the production of LWA from low and high calcium waste FA through sintering process include: (i) formation of an adequate liquid phase content for the LWA; (ii) appropriate viscosity for the solid-liquid phase in the LWA; and (iii) release of sufficient amount of gaseous phase. The following primary conclusions can be drawn from this method:

Formation of at least 40% liquid phase content is necessary for the LWA prepared with both types of FA to ensure gas-filled pore creation in the LWA. For the LWAs with liquid phase content less than this limitation gas filled pores rarely could be observed.

The viscosity of solid-liquid phase can control the size of formed pores in the pore structure of the LWA. Larger pores were observed in C-FA LWA compared with F-FA LWA due to lesser viscosity for the former. A lower bound of 100 Pa·S was confirmed to prevent the deformation of LWA during sintering (affected by gravitational force). In addition, $10^7$ Pa·S was found to be the upper limit for LWA prepared with FA, below which the pore expansion could occur in the LWA. $g_{effective}$ was found to be necessary for pore creation in the LWA considering the requirements mentioned in (i) and (ii) were satisfied. A considerable amount of $g_{effective}$ was observed for all the LWA developed in this study, where C-FA LWA had almost three times greater $g_{effective}$ compared with F-FA LWA. The higher $g_{effective}$ could be one possible reason for the formation of larger pores in C-FA LWA. The gas release was related to presence of hematite and anhydrite in the raw FA. In addition, it was found that presence of higher unburnt carbon content and anhydrite in C-FA could be the possible reason for higher $g_{effective}$ of LWA prepared with this material.

Based on the predictive diagram developed in this study it was found that a minimum of 6% and 4% NaOH concentration could produce a successful LWA from F-FA and C-FA, respectively. These minimum concentrations could be beneficial from a cost and environmental impact point of view. However, at the same time, the functionality (i.e., engineering properties such as, specific gravity, compressive strength, water absorption, and water desorption) of these LWA needs to be assessed to determine an optimal NaOH concentration as well; this is due to the fact that different NaOH concentrations could influence the performance of LWA.

FA-LWA can be used for different applications such as lightweight concrete production, internal curing of concrete, green roofs, and embarkment, where each application may require a specific engineering properties for the LWA.

While the above method is described to manufacture LWA according to an exemplary embodiment of the present invention using fly ash, those skilled in the art will recognize that bottom ash can also be used. Below is an exemplary method of manufacturing LWA using bottom ash, using similar methods to the method using fly ash as described above.

Example 2—Waste Bottom Ash

Two types of bottom ash (BA), low-calcium(LC) and high-calcium(HC), were used for LWA production. The LWA manufacturing procedure started by drying the raw ash material, followed by sieving to the appropriate particle size distribution. Afterward, the prepared ash was mixed with various NaOH solutions (molarities of 2.5 M, 6.25 M, and 10 M) to reach mass concentrations (mass of solid NaOH per mass of bottom ash) of 4%, 10%, and 16%. NaOH solutions with a liquid to solid ratio of 0.4 were used for geopolymerization during the curing period as well as to serve as a fluxing agent to reduce the melting temperature of the mixture. The mixture was then pelletized into spherical shape and cured at 40° C. and 30% relative humidity (RH) for 24 h. Finally, the pellets were sintered at 1160° C. to produce LWA. Samples were labeled as XX-BA-YY %, where XX represents the BA type (LC or HC), while YY % indicates the concentration of NaOH.

Research Methodology

The research methodology was divided into two parts, analytical modeling and experimental investigation, to examine the required conditions for LWA production. The analytical part employed thermodynamic modelling and viscosity calculations to quantify liquid phase formation as a function of temperature during sintering and to calculate viscosity values for the resulting solid-liquid suspension. Experiments were used to study the chemical compounds that can lead to gas emission during the sintering process and quantify the amount of the emitted gaseous phase that leads to LWA pore formation. The pore-solid structure of LWA was investigated using X-CT with respect to these three required for successful LWA production.

Analytical Modeling

Analytical modeling consisted of developing phase equilibria and quantification of liquid phase formation using the Factsage software as well as using the thermodynamic modeling outputs, including the chemical composition of the liquid phase content, to calculate the viscosity of solid-liquid system.

Factsage Simulation

The Factsage thermodynamic modelling software, along with the FToxide database, was used to predict the multi-phase equilibria based on Gibbs free energy minimization algorithm for the multi-component system during sintering. The simulation was performed at 1 atm under an ordinary air atmosphere, which was composed of 0.21 mole oxygen and 0.79 mole nitrogen, in accordance with the conditions of LWA sintering. The initial and final temperatures for the modeling were set to 800° C. and 1400° C., respectively, with 50° C. intervals. The major chemical oxides of the ashes, which were used as the input in the Factsage software, were determined using x-ray fluorescence (XRF). For LC-BA, the oxide content was 63.2% $SiO_2$, 20.1% $Al_2O_3$, 3.51% CaO, 6.66% $Fe_2O_3$, 0.97% MgO, and 1.43% $Na_2O$ by mass. For HC-BA, the oxide content was 43.1% $SiO_2$, 17.1% $Al_2O_3$, 20.1% CaO, 7.29% $Fe_2O_3$, 4.1% MgO, and 1.19% $Na_2O$ by mass. In addition, NaOH was used as the fluxing agent in the thermodynamic modelling.

Viscosity Calculations

Empirical models have been developed to predict coal ash liquid phase (slag) viscosity based on a simplified slag chemical composition. The empirical model developed by Browning et al. was found to be more applicable for the prediction of the liquid phase (slag) viscosity due to experimentally determined lower bias and higher accuracy compared with earlier developed models. The Browning model assumes that the viscosity of the slag falls into a Newtonian region and correlates viscosity with temperature (T) using a temperature shift (Ts) (Equation 1). Ts, as presented in Equation 2 is a function of the composition parameter, i.e., "A." "A" is defined as the weighted molar ratio of network former (numerator of Equation 3) to network modifier (denominator of Equation 3) elements as presented in Equation 3, where the quantity of each component is in mole fraction and their summation must add up to unity (Equation 4).

The composition of the liquid phase (slag) at different temperatures for each LWA was obtained using Factsage with varying fluxing agent concentrations and was used to estimate the viscosity of liquid phase. It should be noted that during sintering at some temperatures the LWA system is composed of liquid and solid phase concurrently; therefore, the suspension's (solid-liquid phase) viscosity falls into non-Newtonian region, and becomes highly dependent on the volume fraction of solid phase. Thus, to estimate the viscosity of solid-liquid suspension, the Krieger and Dougherty model was used (Equation 5).

Experiments consisted of four parts: (1) characterizing the properties of as-received raw materials, (2) characterizing the mineral phases of the geopolymerized pellets before sintering, (3) understanding the sintering process of the pellets at elevated temperature, and (4) characterizing the pore structure of the final LWA product. Table 3 summarizes the techniques used to study each part.

TABLE 3

Experimental program

| Part | Test | Purpose |
|---|---|---|
| (I): Raw Material Acquisition | XRF | To assess the chemical composition of ashes (discussed in Section Error! Reference source not found. and conducted by the bottom ash provider) |
| | QXRD | To quantify the mineral phases of ashes |
| | TGA | To determine the free carbon content of ashes |
| (II): Geopolymerization | QXRD | To assess formation of new phases at different concentrations of NaOH in the geopolymerized pellets |
| (III): Sintering | TGA | To identify the candidate reactions and products that contribute to the formation of pores |
| (IV): Final product | X-CT | To assess internal morphological features and the LWA pore structure |

Quantitative X-Ray Powder Diffraction (QXRD)

X-ray diffraction analysis was performed using a Rigaku Smartlab instrument using steps of 0.02° in a 10° to 70θ 2θ range. A $Cu_{K\alpha}$ source operating at 40 Kv and 40 mA was used during the test. Phase identifications and Rietveld refinements were performed using the open source Profex software.

To perform QXRD on the raw materials, the following procedure was adopted: (1) raw LC- and HC-BA (with a particle size distribution described in [3]) were taken separately, (2) the powder was crushed using a mortar and pestle, (3) the obtained powder was sieved through an ASTM #200 sieve (75 μm mesh opening), (4) the portion of powder that was retained on the #200 sieve was re-crushed and sieved to make sure the entire powder passed through the #200 sieve, (5) 0.8 g±0.001 g of the prepared powder was blended with 0.2 g±0.001 g of Rutile ($TiO_2$), used as a reference powder with purity greater than 99% and mean particle size of 5 μm, and (5) the final blended powder was used in the QXRD test. The same sample preparation procedure was used to prepare QXRD samples of geopolymerized pellets after curing in an environmental chamber at 40° C. and 30% RH for 24 h.

TGA

Figure 14:
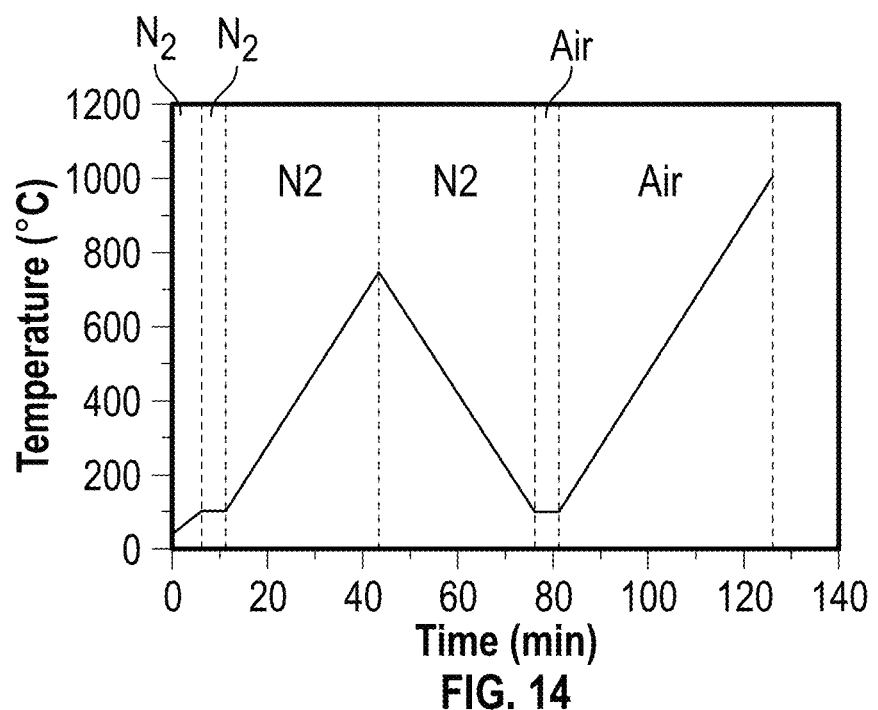
FIG. 14 is a graph showing time v. temperature of a 2-atmosphere TGA application for determination of unburnt carbon content of raw materials.
Figure 15A:
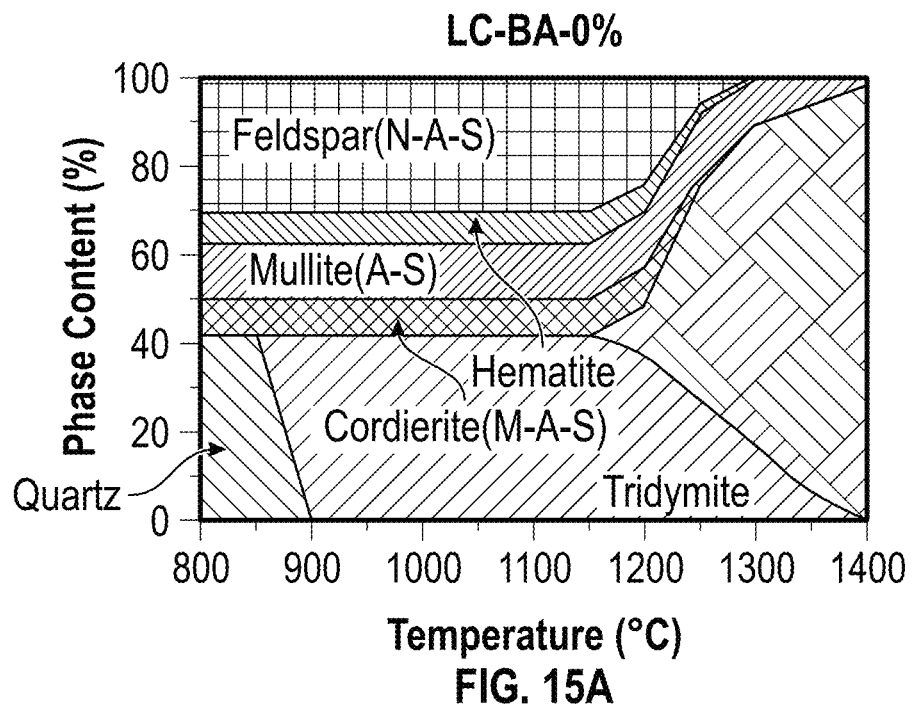
FIG. 15A is a phase diagram for low-calcium (LC) bottom ash (BA) with 0% NaOH.
Figure 15B:
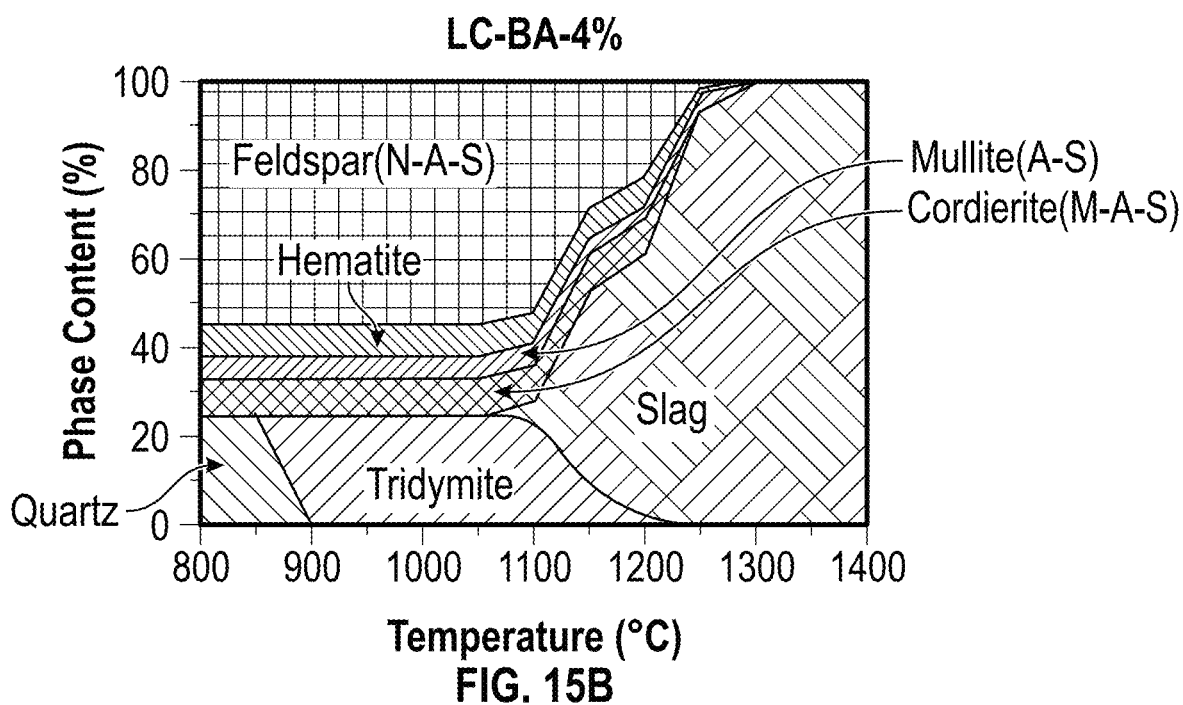
FIG. 15B is a phase diagram for LC-BA with 4% NaOH.
Figure 15C:
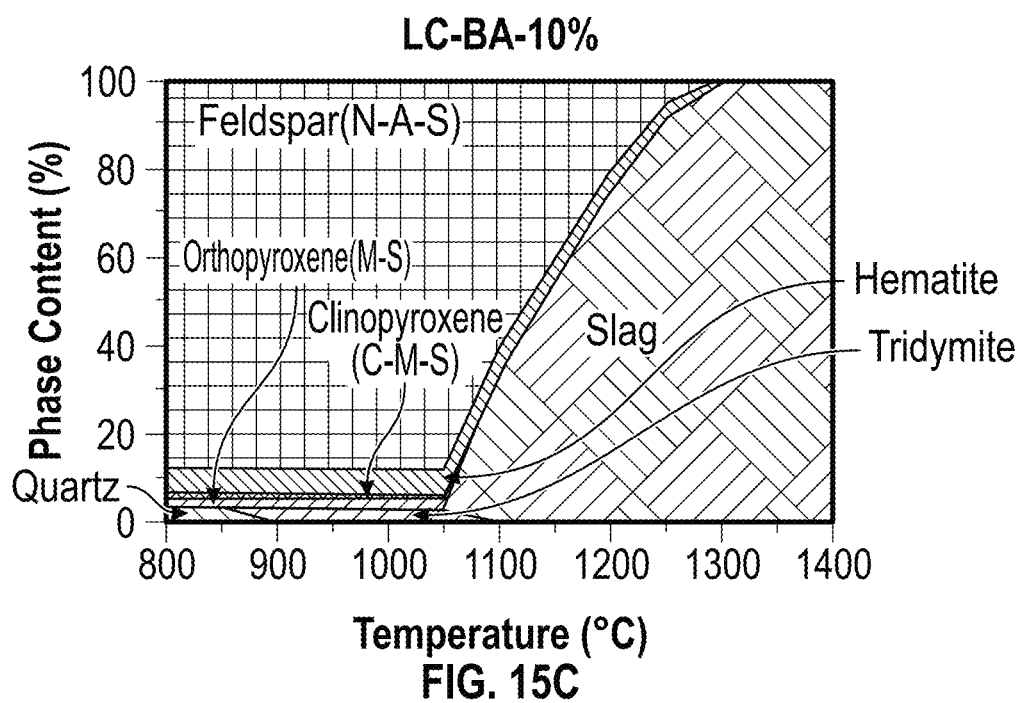
FIG. 15C is a phase diagram for LC-BA with 10% NaOH.
Figure 15D:
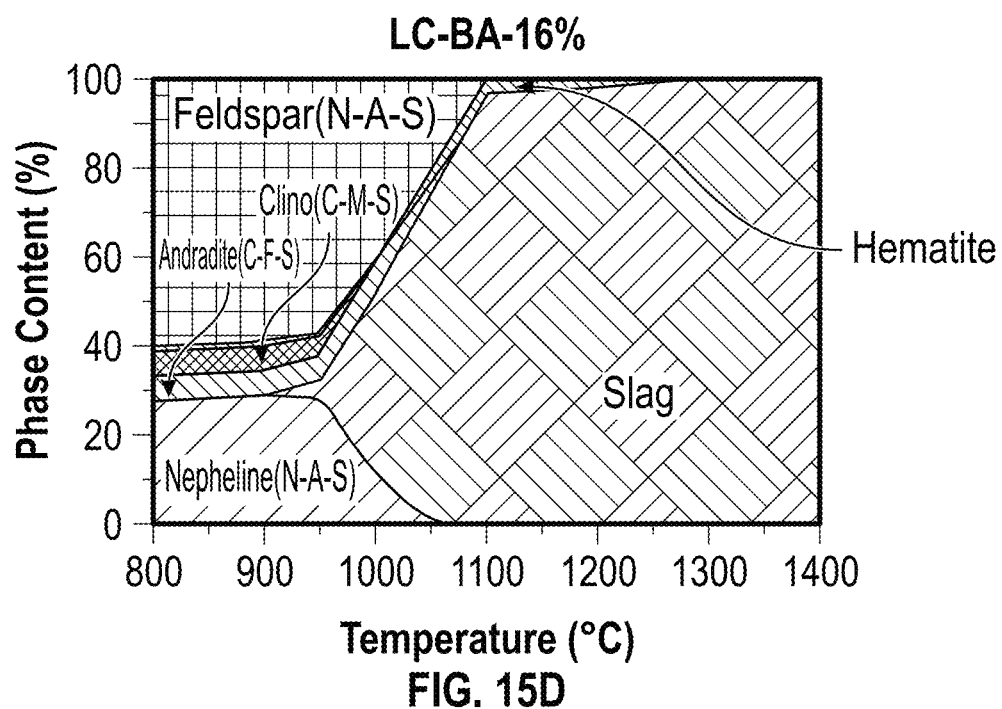
FIG. 15D is a phase diagram for LC-BA with 16% NaOH.
Figure 16A:
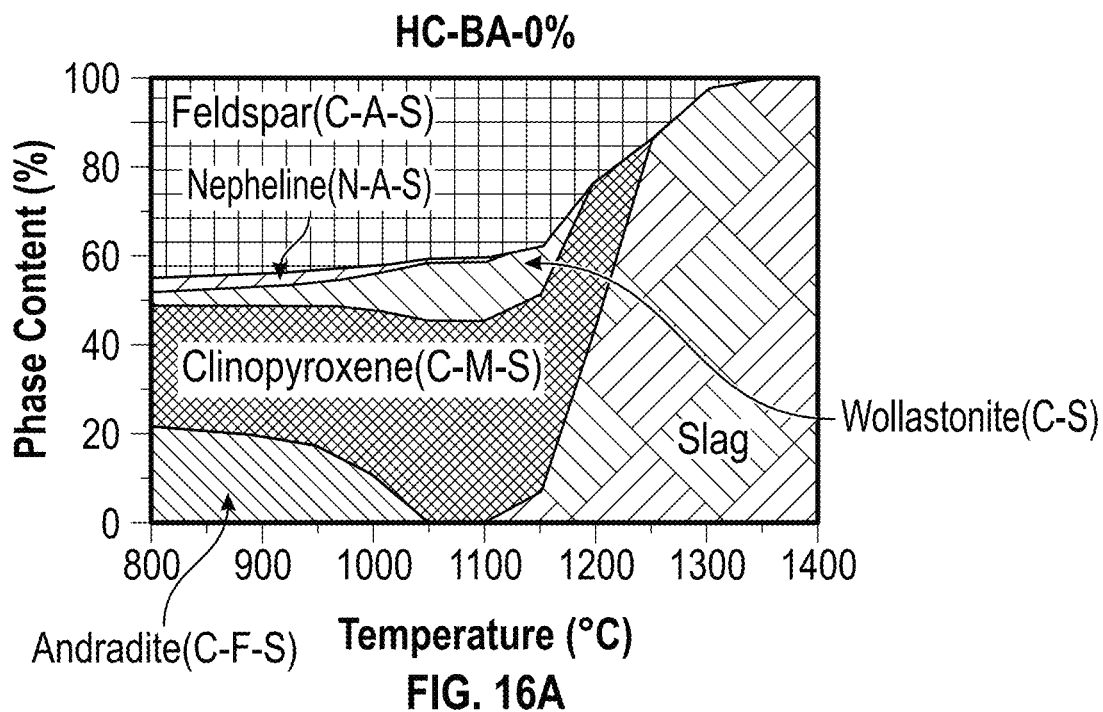
FIG. 16A is a phase diagram for HC-BA with 0% NaOH.
Figure 16B:
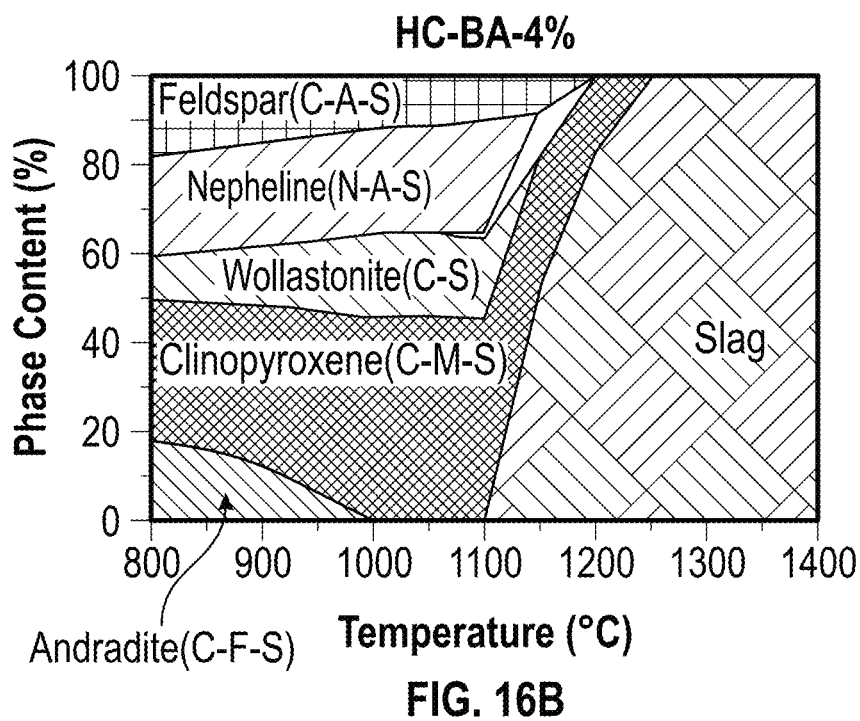
FIG. 16B is a phase diagram for HC-BA with 4% NaOH.
Figure 16C:
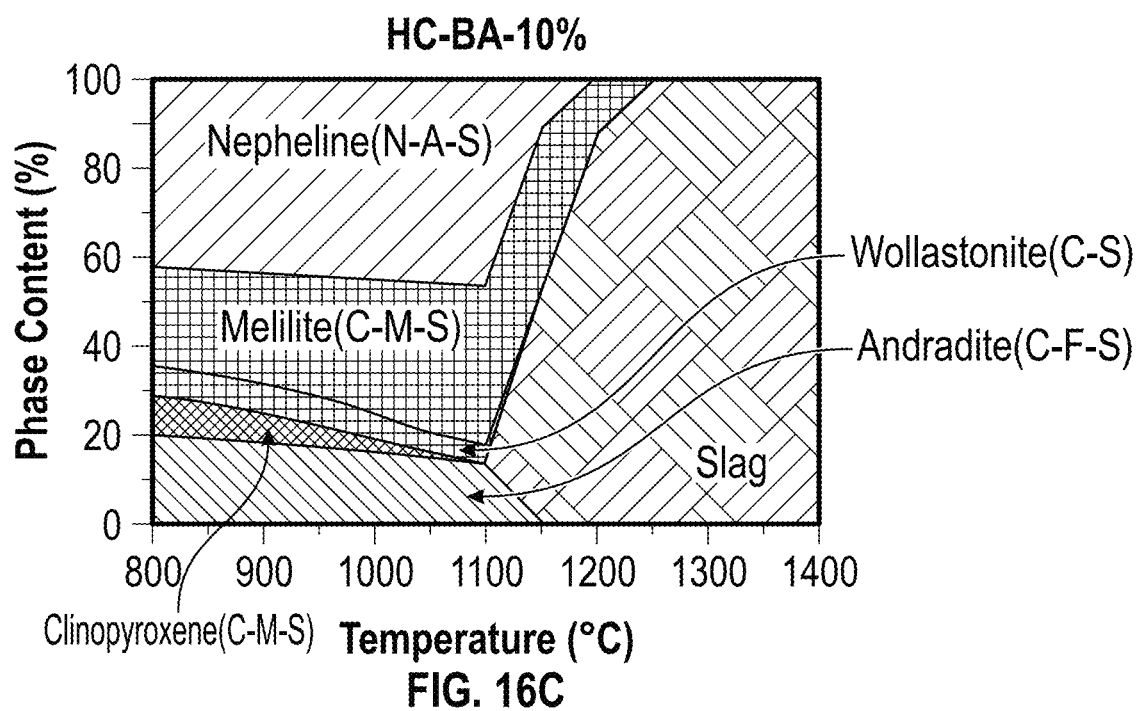
FIG. 16C is a phase diagram for HC-BA with 10% NaOH.
Figure 16D:
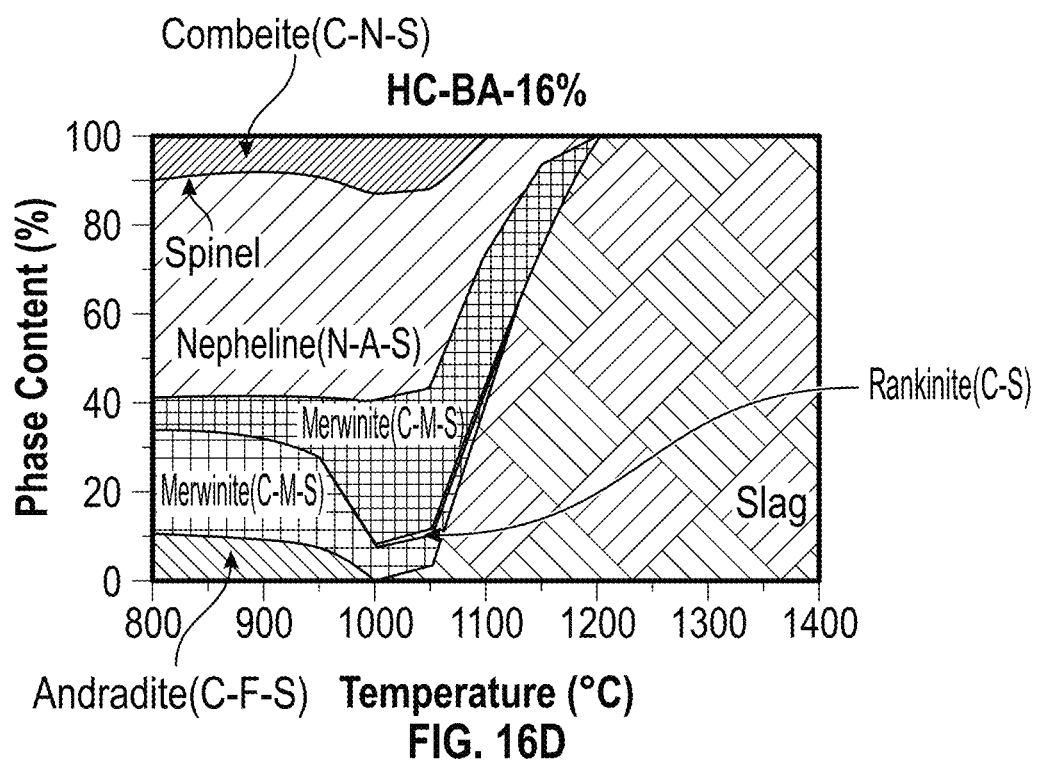
FIG. 16D is a phase diagram for HC-BA with 16% NaOH.

TGA was carried out using a TA Instrument Q5000 IR model. To determine the unburned carbon content of the raw material, a 2-atmosphere TGA (2A-TGA) procedure using nitrogen and air gases was performed according to FIG. 14. Those skilled in the art will recognize that other measuring instruments can be used.

This was mainly to separate the oxidization of carbon from other decomposition reactions occurring in the same range of temperatures. In this regard, temperature was increased to 100° C. and was kept there for 5 min under nitrogen atmosphere in order to evaporate the free water.

Next, still under nitrogen gas, temperature was increased to 750° C. with a ramp of 20° C./min. Afterwards, under nitrogen gas the temperature decreased back to 100° C. with a ramp of 20° C./min. In the next step, the gas was changed to air and temperature was kept at 100° C. for 5 min. Finally, under air gas, temperature was increased to 1000° C. with a ramp of 20° C./min. Raw materials were crushed using a mortar and pestle and were sieved through a #200 sieve. Crushing and sieving was repeated to ensure that the entire amount of the initial powder had a size smaller than 75 μm. Sample masses of 30 mg to 40 mg was used in the TGA tests. Considering the melting behavior of LWA at sintering temperature near 1160° C., a fine crucible refractory ceramic powder was used as a bed in the TGA pan to prevent any sintered material adhering to the crucible pan during melting.

For geopolymerized pellets, the same sample preparation procedure was adopted; however, TGA tests were performed under an air atmosphere only to simulate the actual sintering conditions in LWA production. Samples were heated at a rate of 10° C./min to 1160° C. (the sintering temperature) and then were held at this temperature for 4 min.

X-Ray Computed Tomography (X-CT)

X-CT was performed to non-destructively assess the LWA internal morphology. In this method, a series of projection images of the sample, which is mounted on a rotating stage, were collected. Using tomographic reconstruction, cross sectional 2D slices were then obtained. 3D sample reconstruction was obtained by vertically stacking the 2D slices. The X-CT was carried out using a Zeiss Versa XRM 500 system. The x-ray synchrotron was set for 80 kv and 87 mA. The exposure time per step for 180° rotation was ~0.6 sec. The images were taken with a voxel size of approximately 18 μm. For constructing 3d images, visualizing 2D slices, and videos, the Dragonfly software was used.

Results

The results of thermodynamic predictions to quantify the liquid phase and its viscosity formed during sintering are presented. The QXRD and the TGA/DTG results are also presented to assess the phase development before sintering and identify the potential compounds that could contribute to gas emission during sintering and consequently pore creation. Furthermore, the LWA pore structure was assessed using X-CT.

Thermodynamic Predictions of LWA Multi-Component System During Sintering

Phase Equilibria and Quantification of Liquid Phase Formation

FIGS. 15A-15D show the predicted phase diagrams for LC-BA with 0%, 4%, 10%, and 16% addition of NaOH, respectively, as the fluxing agent. NaOH has three main effects on the sintering process according to thermodynamic modeling: (1) reducing the LWA melting temperature (BA+NaOH), (2) reducing the liquid phase viscosity (since $Na^+$ is a network modifier), and (3) initiating geopolymerization for the LWA (BA+NaOH) system. Thermodynamic modeling calculates equilibrium conditions only and does not consider any kinetics governing the sintering process, which may influence the quantity and the type of formed phases. For example, formation of a viscous liquid phase near the LWA surface may hinder the penetration of the oxygen to the LWA inner core, which can result in a reduction in atmospheric pressure in outer area and alter the kinetics of phase formation phenomena.

A good quality LWA requires enough liquid phase (slag) to entrap emitted gas near the sintering temperature (1160° C.). The slag contents for LC-BA-0%, LC-BA-4%, LC-BA-10%, and LC-BA-16% at 1160° C. were estimated to be 2.6%, 47.2%, 59.5%, and 97.8%, respectively. FIGS. 16A-16D show the predicted phase diagrams for HC-BA with 0%, 4%, 10%, and 16% addition of NaOH. The slag content for HC-BA-0%, HC-BA-4%, HC-BA-10%, and HC-BA-16% at 1160° C. were estimated to be 10.3%, 58.3%, 65.3%, and 85.5%, respectively.

HC-BA-0% had a lower melting temperature (i.e., 1100° C.) compared with LC-BA-0% (i.e., 1150° C.). This can be justified by the fact that in a system without NaOH and major presence of $SiO_2$—$Al_2O_3$ compounds, increasing the amount of CaO lowers the melting temperature for the CaO—$SiO_2$—$Al_2O_3$ system due to the formation of compounds that have lower melting temperature than that of mullite ($3Al_2O_3.2SiO_2$) formed in a binary system of $Al_2O_3$ and $SiO_2$. For LC-BA, incorporation of a higher amount of NaOH led to the formation of higher Na-bearing Feldspar ($NaAlSi_3O_8$) content (as can be seen in the phase diagram), which has a melting temperature between 730° C. and 1100° C. Therefore, the melting temperature of LC-BA was reduced by increasing the NaOH concentration and higher liquid phase (slag) content was formed. The melting temperatures for LC-BA-4%, LC-BA-10%, and LC-BA-16% were 1050° C., 1050° C. and 900° C., respectively.

Addition of NaOH to HC-BA did not significantly change the melting temperature for the system (FIGS. 16A-16D). This can be explained by formation of several Ca-bearing phases at elevated temperature in the HC-BA geopolymerized pellets (NaOH added) that have high melting temperatures along with Nepheline ($NaAlSiO_4$), which has a melting temperature between 1100° C. to 1256° C. Accordingly, the melting temperature of the HC-BA-NaOH system remained higher compared to the LC-BA+NaOH system. The melting temperatures for HC-BA-4%, HC-BA-10%, and HC-BA-16% were predicted to be 1100° C., 1100° C., and 1000° C., respectively. It should be noted that formation of Na bearing phases such as Nepheline (with major quantity) in HC-BA-NaOH system helped to increase the liquid phase content.

Viscosity Predictions of Solid-Liquid System

Figure 18A:
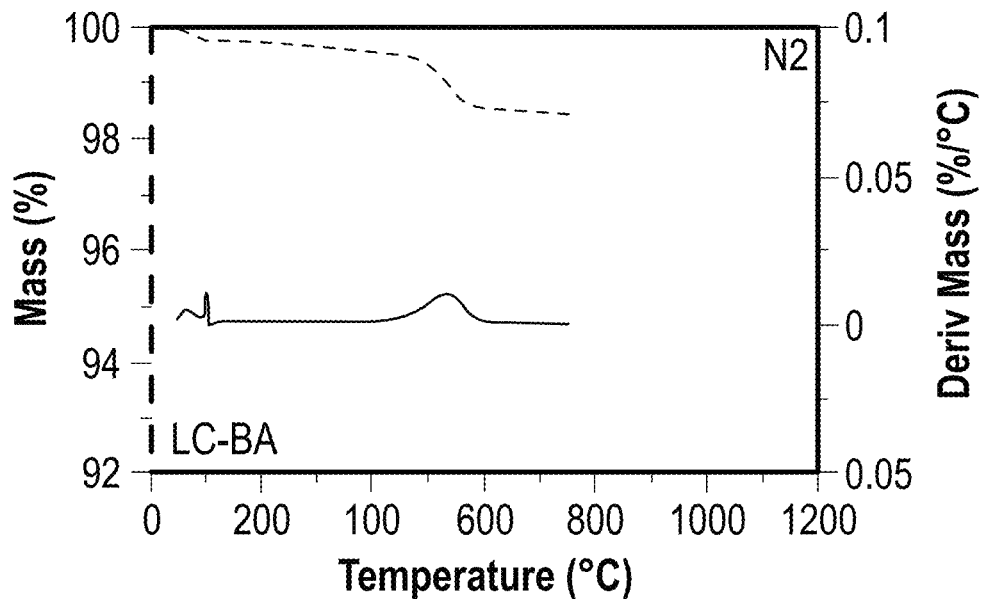
FIG. 18A is a graph of 2-atmosphere TGA performed on raw LC-BA to determine unburnt carbon under a nitrogen atmosphere.
Figure 18B:
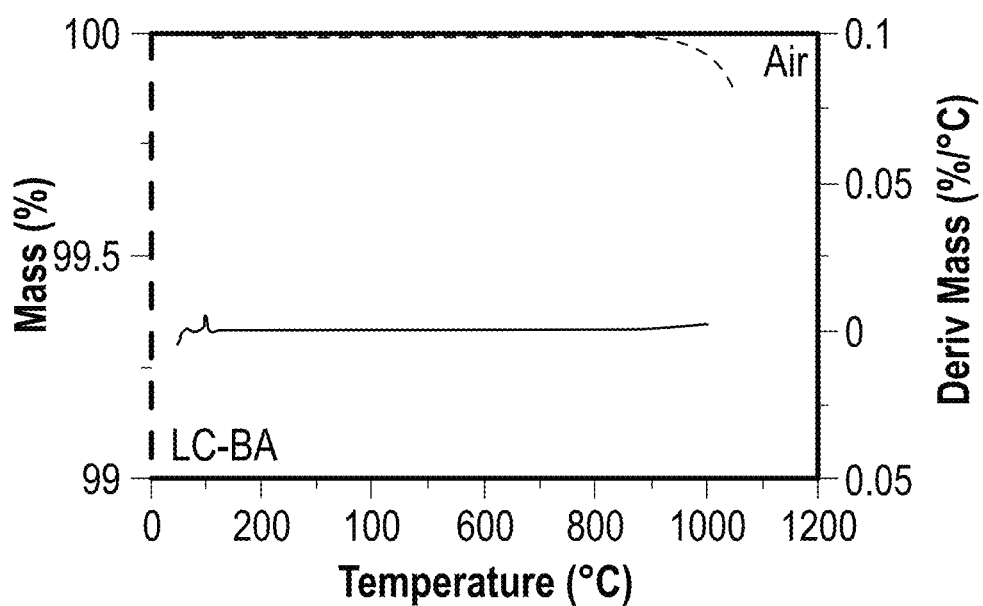
FIG. 18B is a graph of 2-atmosphere TGA performed on raw LC-BA to determine unburnt carbon under an air atmosphere.
Figure 19A:
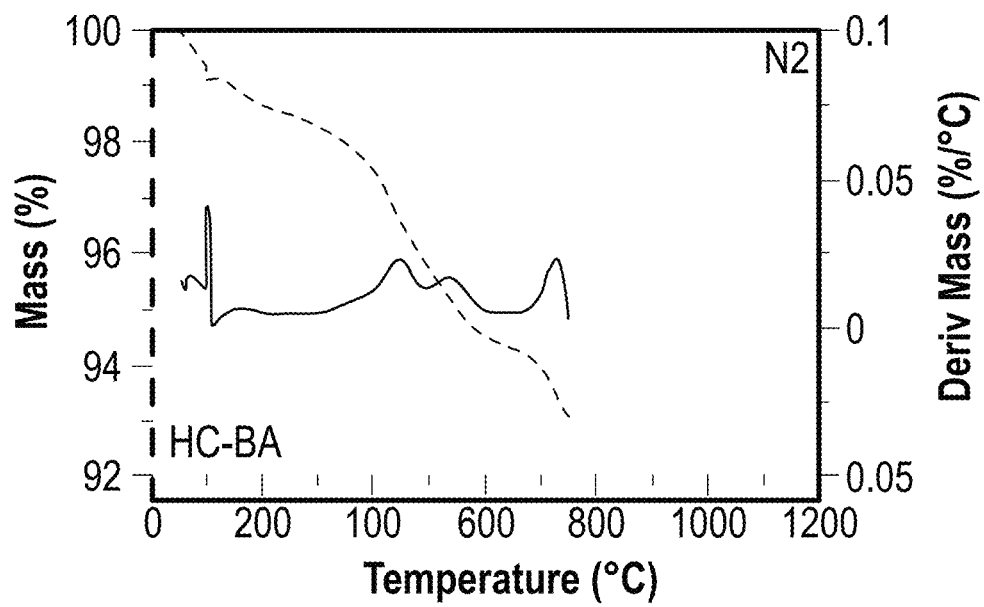
FIG. 19A is a graph of 2-atmosphere TGA performed on raw HC-BA to determine unburnt carbon under a nitrogen atmosphere.
Figure 19B:
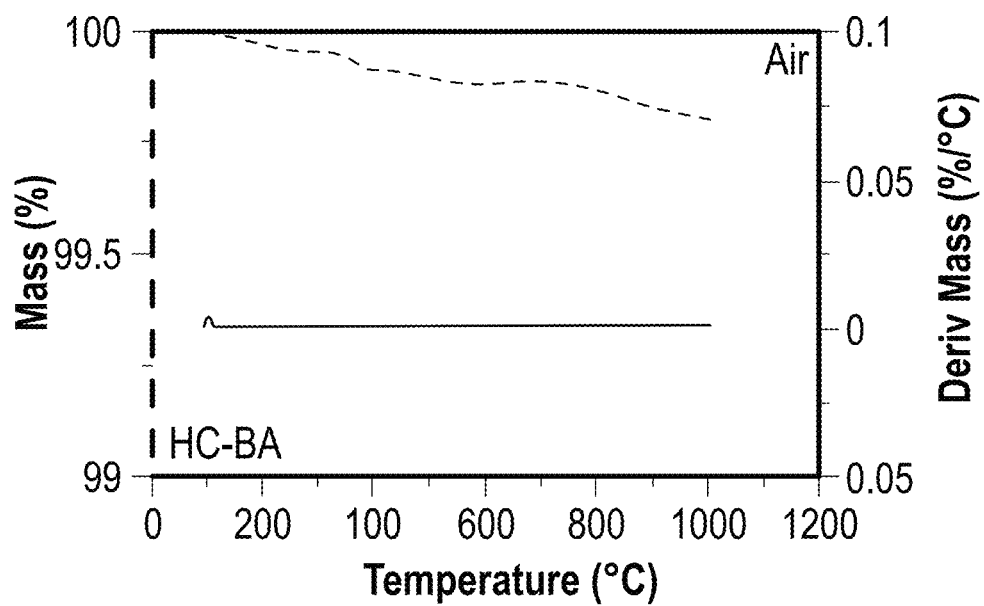
FIG. 19B is a graph of 2-atmosphere TGA performed on raw HC-BA to determine unburnt carbon under an air atmosphere.
Figure 20A:
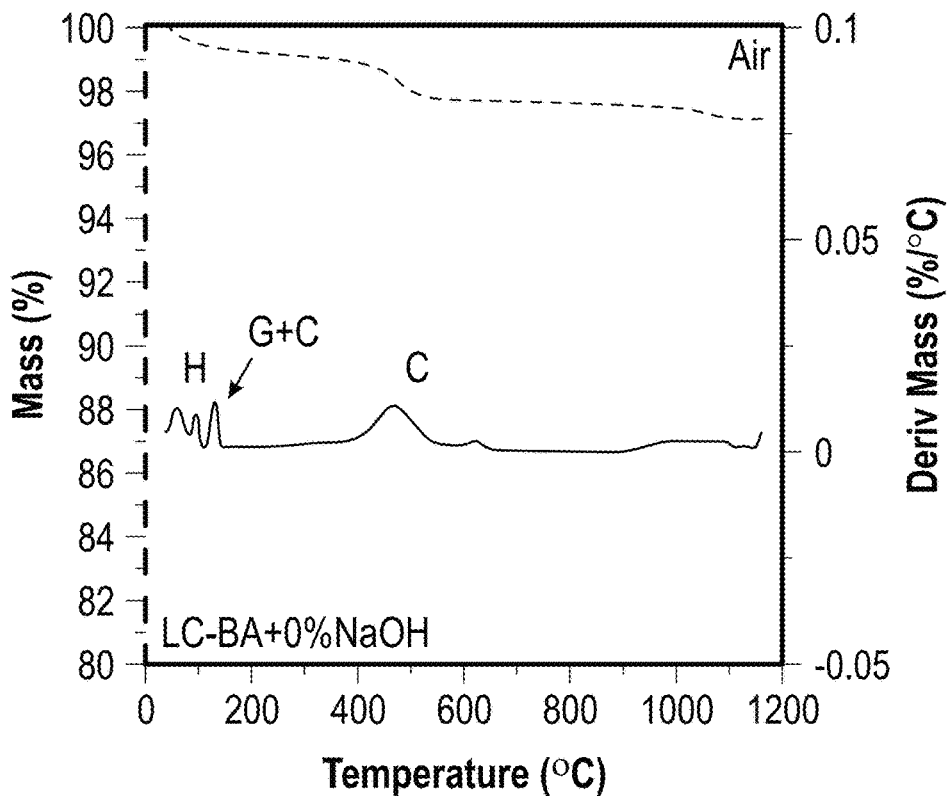
FIG. 20A is a graph showing Thermogravimetric Analysis/Derivative Thermogravimetry (TGA/DTG) curves for LC-BA with 0% NaOH.
Figure 20B:
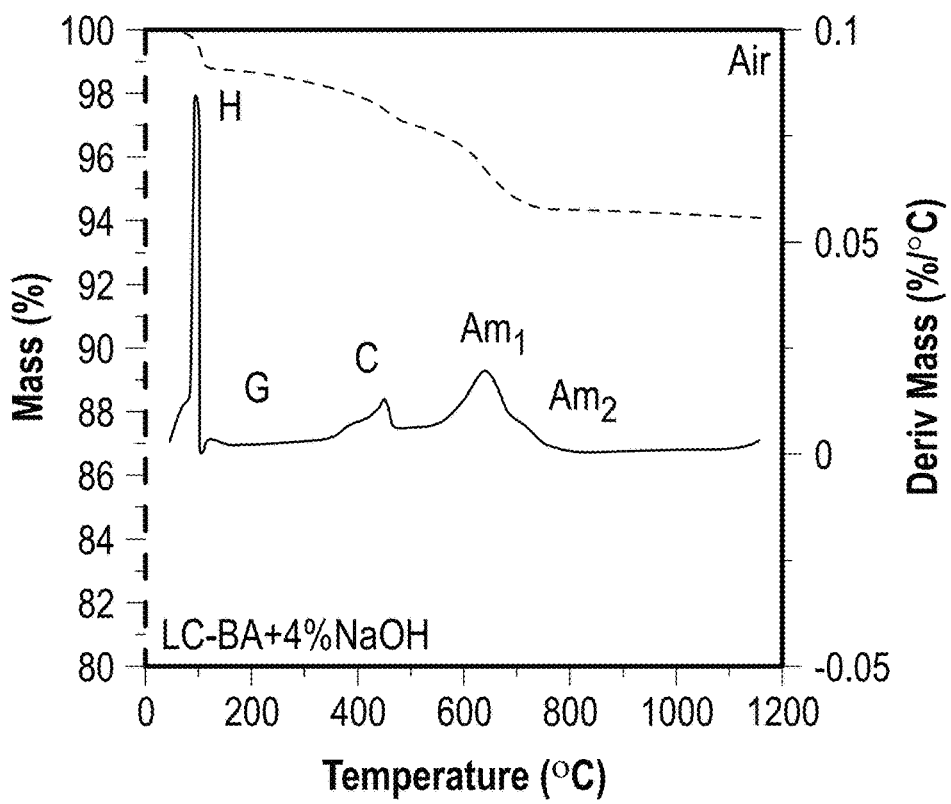
FIG. 20B is a graph showing TGA/DTG curves for LC-BA with 4% NaOH.
Figure 20C:
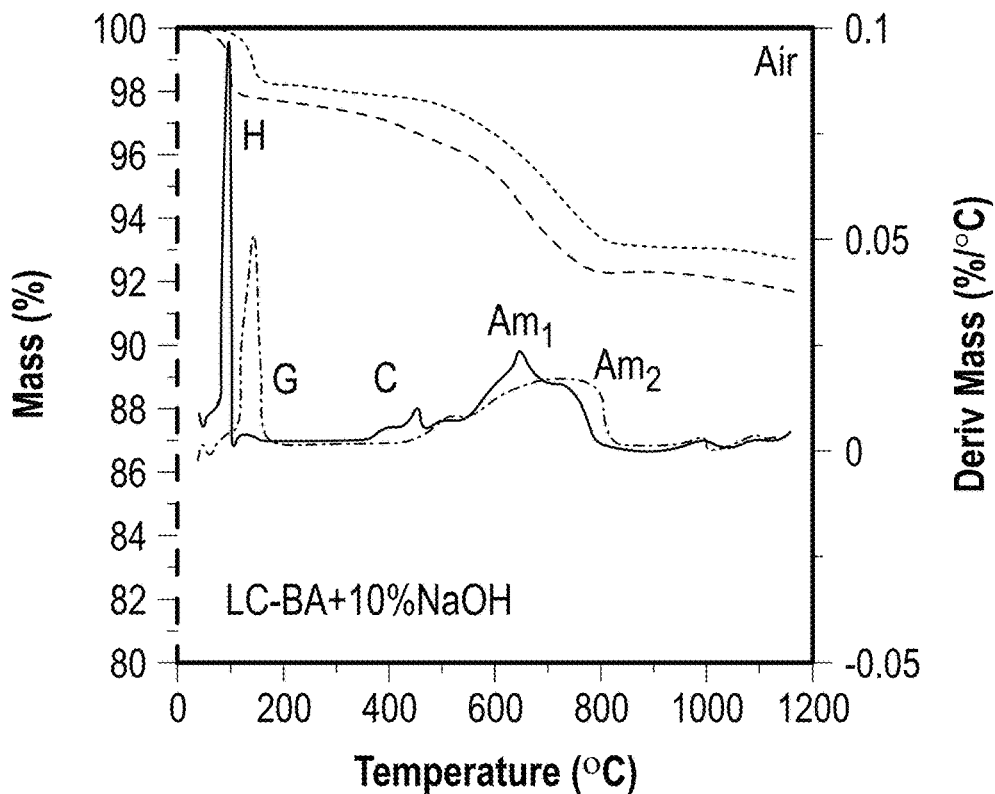
FIG. 20C is a graph showing TGA/DTG curves for LC-BA with 10% NaOH.
Figure 20D:
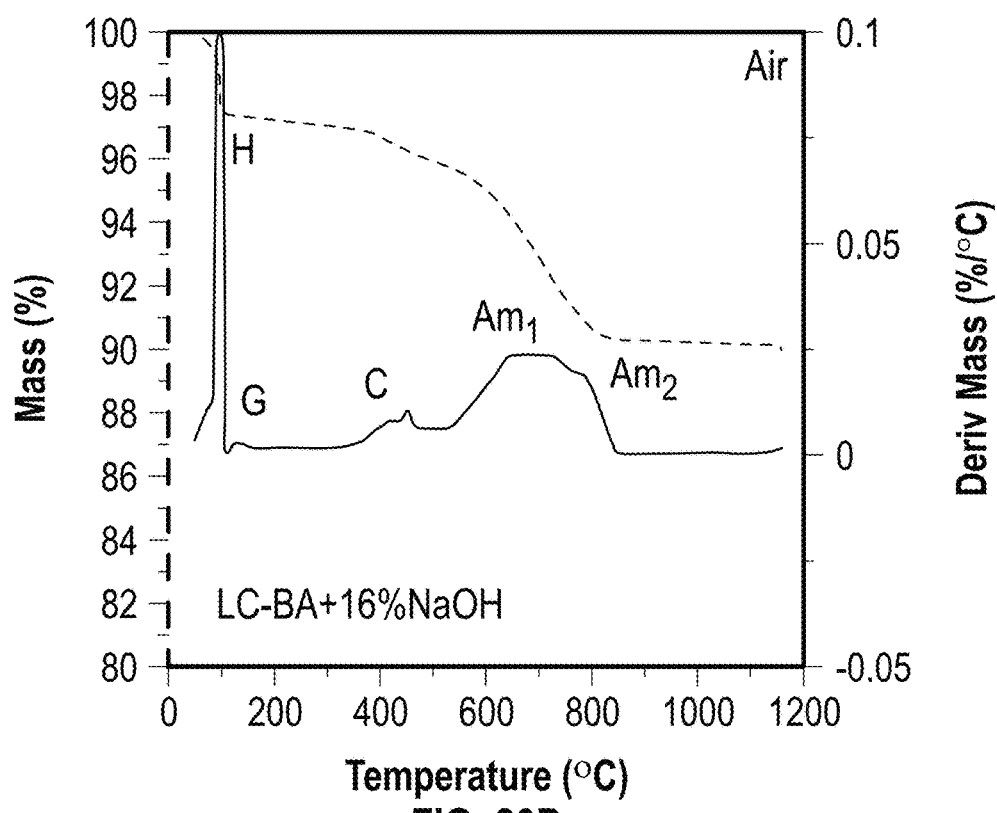
FIG. 20D is a graph showing TGA/DTG curves for LC-BA with 16% NaOH.
Figure 21A:
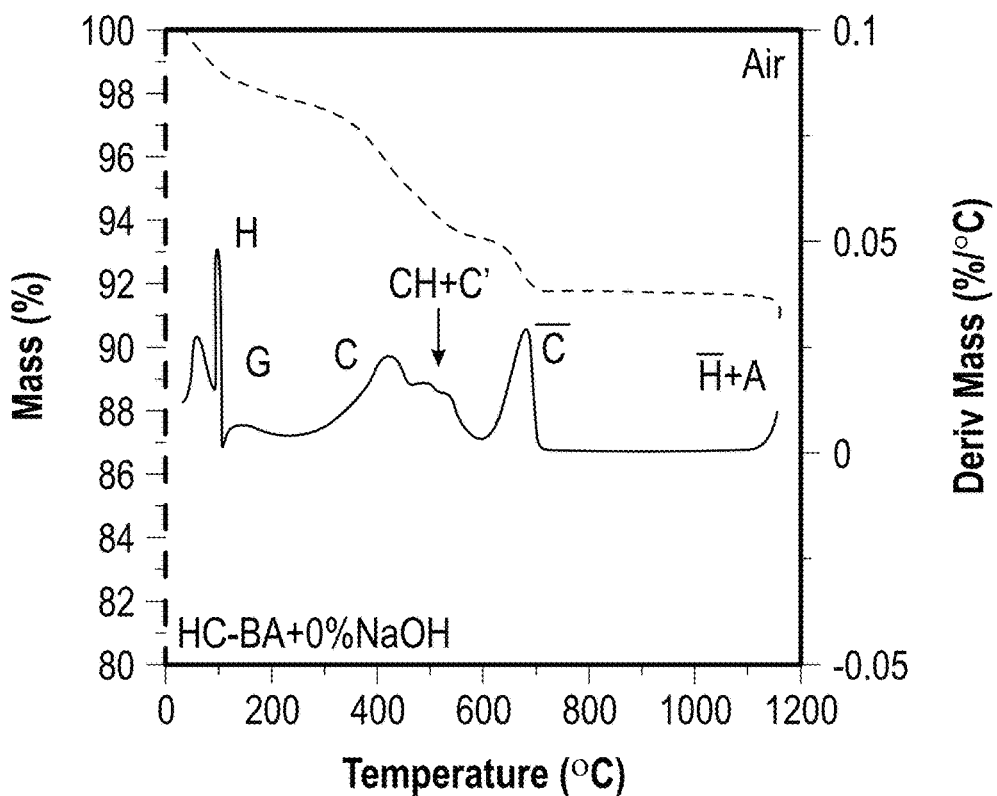
FIG. 21A is a graph showing TGA/DTG curves for HC-BA with 0% NaOH.
Figure 21B:
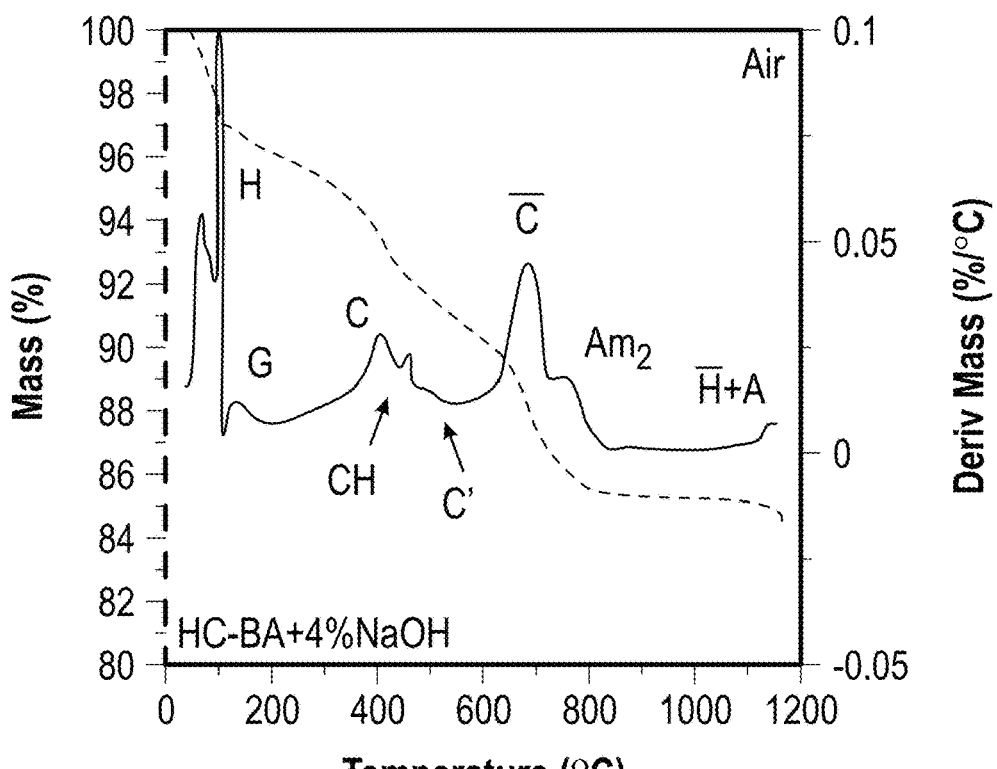
FIG. 21B is a graph showing TGA/DTG curves for HC-BA with 4% NaOH.
Figure 21C:
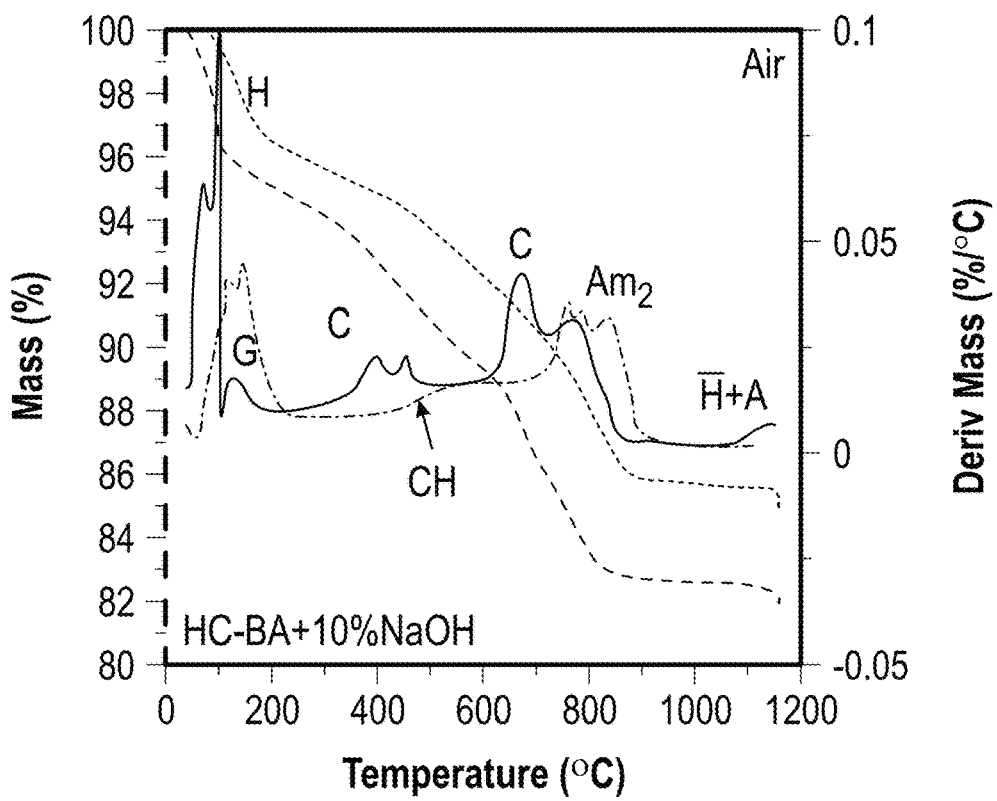
FIG. 21C is a graph showing TGA/DTG curves for HC-BA with 10% NaOH.
Figure 21D:
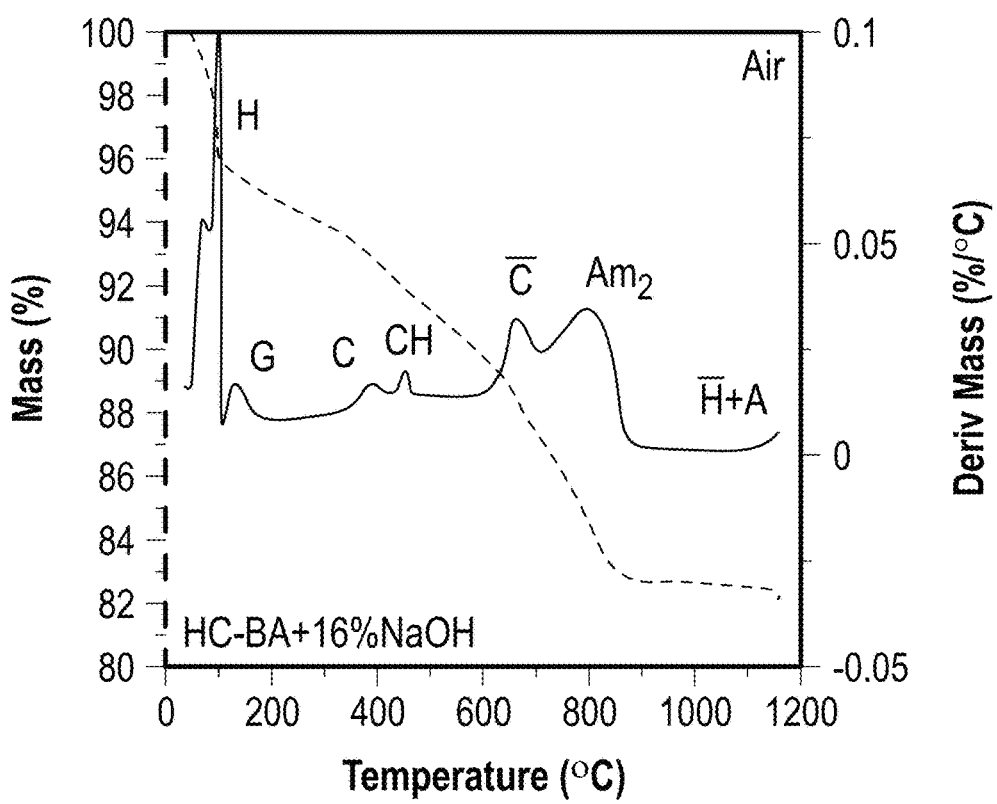
FIG. 21D is a graph showing TGA/DTG curves for HC-BA with 16% NaOH.

FIGS. 18A and 18B show estimated viscosity values for the solid-liquid system as a function of temperature for LC-BA and HC-BA with different concentrations of NaOH. Addition of NaOH as a fluxing agent decreased the viscosity values for both ashes at constant temperature. As presented in Equation 1 to Equation 4, slag viscosity is highly dependent on slag composition. Additionally, the fluxing agent influenced the slag viscosity values by (i) promoting formation of higher liquid phase content, and (ii) changing the composition of slag towards compositions with lower viscosity by increasing the $Na^+$ molar fraction.

Figure 17A:
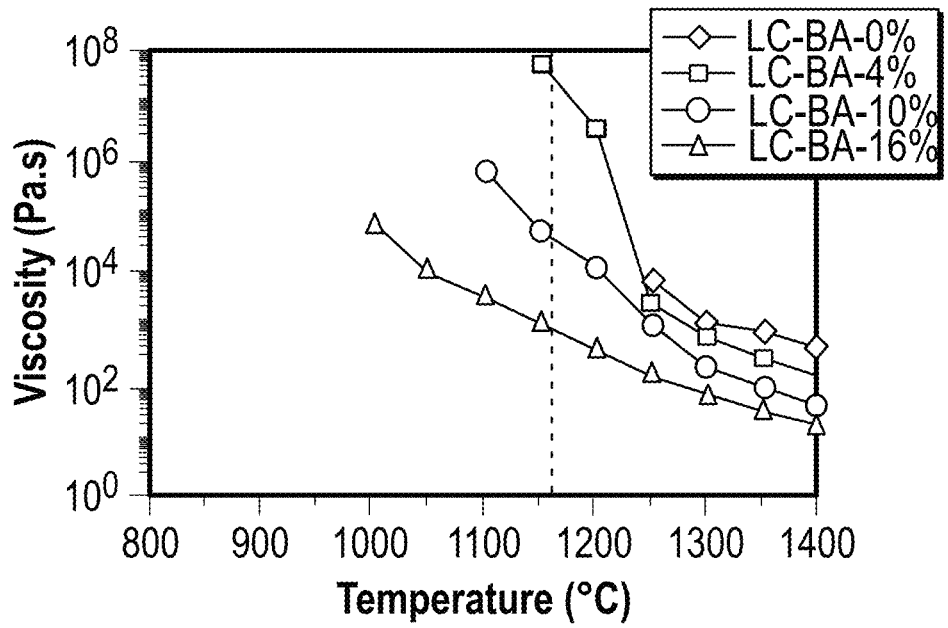
FIG. 17A is a graph of viscosity calculations for a solid-liquid suspension of LWA with various NaOH concentrations for LC-BA.
Figure 17B:
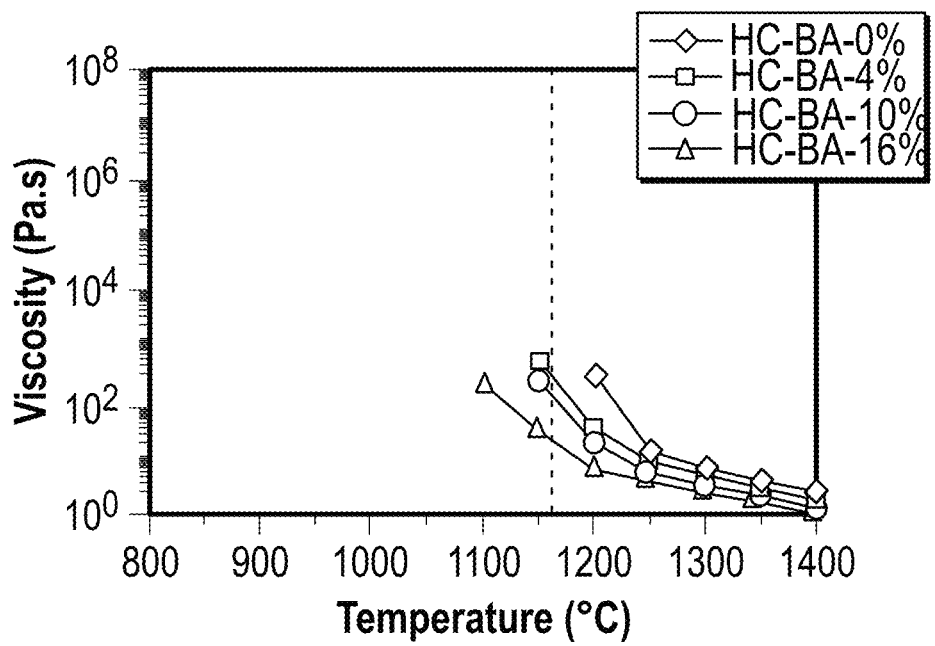
FIG. 17B is a graph of viscosity calculations for a solid-liquid suspension of LWA with various NaOH concentrations for HC-BA.

LC-BA (FIG. 17A) possessed higher viscosity values compared with HC-BA (FIG. 17B). This can be explained using Equation 3 where the slag composition of LC-BA had a higher $Si^{4+}$ molar fraction compared to HC-BA, leading to higher viscosity values. Additionally, the molar fraction of $Ca^{2+}$ was relatively negligible for LC-BA compared with HC-BA so that $Ca^{2+}$, which also has a fluxing role, decreased the HC-BA slag viscosity and consequently the solid-liquid suspension viscosity.

Gas Formation During Sintering

Determination of Free (Unburned) Carbon and Chemical Compounds in Raw Materials

Heating ash in an oxidizing atmosphere (here, air) leads to decomposition reactions overlapping with carbon oxidation, which makes the determination of the unburned carbon content complex. Accordingly, a heating cycle is generally added in an inert atmosphere (nitrogen) before the oxidizing atmosphere to prevent carbon oxidation while promoting decomposition reactions. In this study, a 2A-TGA procedure was followed to measure the unburned carbon content. FIGS. 18A, 18B, 19A, 19B show the 2A-TGA curves for raw LC-BA and HC-BA ashes, respectively. The unburned carbon content mass fractions for LC- and HC-BA were found to be 0.12% and 0.19%, respectively.

Table 4 shows the QXRD results for the raw LC- and HC-BA. A higher content of quartz was observed in the LC-BA compared with the HC-BA, which was consistent with XRF results. A higher calcite content was observed for HC-BA obtained by QXRD (see Table 4), which was reflected in the higher CaO content obtained by XRF. In addition, hematite ($Fe_2O_3$) and anhydrite ($CaSO_4$) as two possible phases that can contribute to gas release at the sintering temperature were found to be higher for HC-BA compared with LC-BA.

TABLE 4

Crystalline phase determination of raw ashes

| Phases name | Phase formula | Raw LC-BA | Raw HC-BA |
|---|---|---|---|
| Quartz | ($SiO_2$) | 18.2 ± *1.7 | 8.1 ± 0.3 |
| Katoit | ($Ca_3Al_2(SiO_4)(3-x)(OH)4x$ ($X$ = 1.5-3)) | 0.1 ± 0.1 | 0.3 ± 0.2 |
| Anhydrite | ($CaSO_4$) | 0.4 ± 0.3 | 1.9 ± 0.2 |
| Merwinite | ($Ca_3Mg(SiO_4)_2$) | 0.0 ± 0 | 1.2 ± 1.3 |
| Mullite | ($3Al_2O_3 \cdot 2SiO_2$) | 10.6 ± 2.4 | 0.9 ± 0.2 |
| Hematite | ($Fe_2O_3$) | 0.4 ± 0.3 | 1.0 ± 0.7 |
| Anorthite | ($CaAl2Si2O8$) | 11.2 ± 0.5 | 8.4 ± 0.8 |

TABLE 4-continued

Crystalline phase determination of raw ashes

| Phases name | Phase formula | Raw LC-BA | Raw HC-BA |
|---|---|---|---|
| Brucite | ($Mg(OH)2$) | 0.1 ± 0.1 | 0.4 ± 0.2 |
| Portlandite | ($Ca(OH)2$) | 0.0 ± 0.1 | 0.2 ± 0 |
| Augite | $((Ca,Na)(Mg,Fe,Al,Ti)(Si,Al)2O6)$ | 0.8 ± 0.1 | 9.4 ± 0.2 |
| Calcite | ($CaCO3$) | 0.9 ± 0.2 | 4.6 ± 0.7 |
| Gypsum | ($CaSO4 \cdot 2H2O$) | 0.4 ± 0.3 | 0.5 ± 0.4 |
| Anatase | ($TiO2$) | 1.2 ± 0.1 | — |
| Dolomite | ($CaMg(CO3)2$) | — | 0.6 ± 0.2 |
| Gehlenite | ($Ca2Al[AlSiO7]$) | — | 9.8 ± 0.6 |
| Amorphous phase | — | 55.6 ± 3 | 52.9 ± 1.2 |

Phase Development Through Geopolymerization

Table 5 shows the crystalline phases of geopolymerized LC-BA pellets after 24 h of curing at 40° C. and 30% RH. The quartz content started to decrease considerably in 16% NaOH addition. The anorthite content decreased and amorphous phase increased with increasing NaOH concentration. Considering the low CaO content (3.51%) of LC-BA, a geopolymerization reaction similar to that of class F fly ash can be considered for LC-BA during curing so that the amorphous phase contains N-A-S—H gel. N-A-S—H gel is formed through breaking Si—O—Si and Si—O—Al (i.e., from aluminosilicate sources) bonds into silica and alumina monomers by reacting with $OH^-$; further interaction of monomers leads to the formation of dimers, trimers and/or polymers.

TABLE 5

Crystalline phase of LC geopolymerized pellets

| Crystalline phases | Chemical formula | Raw LC-BA | LC-BA-4% | LC-BA-10% | LC-BA-16% |
|---|---|---|---|---|---|
| Quartz | ($SiO_2$) | 18.2 ± *1.7 | 17.7 | 17.4 | 13.7 |
| Anhydrite | ($CaSO_4$) | 0.4 ± 0.3 | 0.3 | 0.1 | 0 |
| Merwinite | ($Ca_3Mg(SiO4)_2$) | 0.0 ± 0 | 0.4 | 2 | 3.1 |
| Mullite | ($3Al_2O_3 \cdot 2SiO_2$) | 10.6 ± 2.4 | 12.2 | 8.5 | 8.0 |
| Hematite | ($Fe_2O_3$) | 0.4 ± 0.3 | 0.2 | 0.7 | 0.4 |
| Anorthite | ($CaAl_2Si_2O_8$) | 11.2 ± 0.5 | 8.2 | 5 | 6.5 |
| Brucite | ($Mg(OH)_2$) | 0.1 ± 0.1 | 0.5 | 0.5 | 0.6 |
| Portlandite | ($Ca(OH)_2$) | 0.0 ± 0.1 | 0 | 0.1 | 0.0 |
| Augite | $((Ca,Na)(Mg,Fe,Al,Ti)(Si,Al)_2O_6)$ | 0.8 ± 0.1 | 1.2 | 1.2 | 0.7 |
| Calcite | ($CaCO_3$) | 0.9 ± 0.2 | 0.4 | 0 | 0 |
| Gypsum | ($CaSO_4 \cdot 2H_2O$) | 0.4 ± 0.3 | 0.4 | 0 | 0.43 |
| Anatase | ($TiO_2$) | 1.2 ± 0.1 | 1.2 | 2.0 | 1.7 |
| Amorphous | — | 55.6 ± 3 | 57.2 | 62.5 | 64.8 |

Table 6 shows the crystalline phases and their quantities for HC-BA geopolymerized pellets. With increasing NaOH percentage, the content of the Ca bearing phases (such as anorthite, calcite, and gehlenite) decreased while the amorphous phase content increased. HC-BA had a high content of CaO (22.5%) and accordingly, it can be considered as a class C fly ash for its geopolymerization reaction with NaOH. In this regard, the alkali cation ($Na^+$) acts as a catalyzer via ionic exchange with $Ca^{2+}$ ions. The main product of this reaction is calcium alumina silicate hydrate (C-A-S—H) gel. With reaction progress, small amounts of alkalis can be taken up into the gel structure due to any charge imbalance. It should be noted that increasing environmental pH (via higher NaOH concentration) favors the formation of C-A-S—H gel, which is probably reflected in the higher amorphous content.

TABLE 6

Crystalline phase of HC-BA geopolymerized pellets

| Crystalline phases | Chemical formula | Raw HC-BA | HC-BA-4% | HC-BA-10% | HC-BA-16% |
|---|---|---|---|---|---|
| Quartz | ($SiO_2$) | 8.1 ± 0.3 | 8.8 | 6.1 | 5.8 |
| Katoit | ($Ca_3Al_2(SiO_4)_{(3-x)}(OH)_{4x\ (X=1.5-3)}$) | 0.3 ± 0.2 | 0.1 | 0.3 | 0.3 |
| Anhydrite | ($CaSO_4$) | 1.9 ± 0.2 | 1.4 | 1.5 | 1.4 |
| Merwinite | ($Ca_3Mg(SiO_4)_2$) | 1.2 ± 1.3 | 0.8 | 1.3 | 1.9 |
| Mullite | ($3Al_2O_3 \cdot 2SiO_2$) | 0.9 ± 0.2 | 0.9 | 0.9 | 0.4 |
| Hematite | ($Fe_2O_3$) | 1.0 ± 0.7 | 0.5 | 0.4 | 0.2 |
| Anorthite | ($CaAl_2Si_2O_8$) | 8.4 ± 0.8 | 5.5 | 3.2 | 3.4 |
| Brucite | ($Mg(OH)_2$) | 0.4 ± 0.2 | 0.6 | 0.6 | 0.8 |
| Portlandite | ($Ca(OH)_2$) | 0.2 ± 0 | 0 | 0.1 | 0 |
| Augite | ($(Ca,Na)(Mg,Fe,Al,Ti)(Si,Al)_2O_6$) | 9.4 ± 0.2 | 7.6 | 6.6 | 5.9 |
| Calcite | ($CaCO_3$) | 4.6 ± 0.7 | 5.8 | 3.0 | 1.7 |
| Gypsum | ($CaSO_4 \cdot 2H_2O$) | 0.5 ± 0.4 | 0.5 | 0.8 | 0.4 |
| Dolomite | ($CaMg(CO_3)_2$) | 0.6 ± 0.2 | 0 | 0 | 0.3 |
| Gehlenite | ($Ca_2Al[AlSiO_7]$) | 9.8 ± 0.6 | 8.3 | 7.3 | 5.4 |
| Amorphous | — | 52.9 ± 1.2 | 59.4 | 67.7 | 72.1 |

Evaluation of Sintering Mechanism of Geopolymerized Pellets Using TGA

TGA was performed on the geopolymerized pellets to simulate the sintering process and indirectly identify any possible reactions/decompositions that can lead to the formation of pores in the LWA. FIGS. 20A-20D show the TGA and differential thermogravimetry curves (DTG) for LC-BA prepared with 0%, 4%, 10%, and 16% NaOH concentrations. During the heating ramp, several mass reductions were measured that were associated with DTG peaks. Peak H (40° C. to 100° C.) was attributed to the release of free water. The increasing trend in peak H by increasing NaOH concentration was mainly associated with the deliquescence effect, by which the addition of NaOH salt increased the equilibrium RH in the ash. The second observed peak, i.e., G near 100° C. to 150° C., was mainly attributed to the release of water from the gypsum structure. The decomposition in the range of 400° C. to 550° C. (peak C) could be attributed to the decomposition of the amorphous phase in LC-BA, most likely C—S—H; the intensity of peak C decreased as NaOH concentration increased in the system preferably implying formations of other amorphous phases (i.e., peaks $Am_1$ and $Am_2$) in the system. Peak $Am_1$, which developed in the higher NaOH samples, could be related to the release of water from amorphous N-A-S—H gel developed through geopolymerization, while peak $Am_2$ was most likely related to the release of water from the amorphous structure of C-A-(N)—S—H type gel. The intensity of peak $Am_2$ increased as NaOH increased, which implied that an increasing pH environment favors the formation of C-A-(N)—S—H gel. No significant decomposition (reaction) was observed after 900° C. for the LC-BA samples. The gas release from 1100° C. to 1160° C. could be considered to contribute to pore formation in the LWA. For LC-BA samples, the mass reductions from 1100° C. to 1160° C. for LC-BA-0%, LC-BA-4%, LC-BA-10%, and LC-BA-16% were found to be equal to 0.080%, 0.218%, 0.300%, and 0.115%, respectively.

Figure FIGS. 21A-21D show the TGA curves for HC-BA prepared with 0%, 4%, 10%, and 16% NaOH concentrations. Similar to LC-BA, the peak H in the HC-BA TGA curves is related to the release of free water, where the height of the peak increased as the NaOH concentration increased mainly due to the deliquescence phenomenon. Peak G was attributed to the release of water from the gypsum structure. Peak C (~350° C. to 450° C.) was related to the release of water from amorphous C—S—H gel. The decreasing trend of peak C with increasing NaOH concentration implied the transformation of C—S—H towards formation of C-A-(N)—S—H gel (i.e., peak $Am_2$) for the HC-BA samples.

Additional peaks of C', CH, and C⁻ were observed that were most likely related to, respectively: (1) the presence of another form of C—S—H gel with different Si/Ca ratio than that of peak C leading to a different thermal decomposition range; (2) the decomposition of portlandite in geopolymerized pellets at ~450° C.; and (3) calcite ($CaCO_3$) decomposition and emission of $CO_2$ gas at ~620° C. to 750° C. Peak C' disappeared as the NaOH concentration increased to form C-A-(N)—S—H gel (peak $Am_2$). Peak C⁻ also decreased as the NaOH concentration increased (the trend was also consistent with that of measured by QXRD, where calcite as a Ca-bearing phase was consumed to form C-A-(N)—S—H gel (peak $Am_2$). Therefore, the intensity of the $Am_2$ peak increased as the NaOH concentration increased, which was compatible with the QXRD result (see Table 6) that there was an increase in amorphous phase content as the NaOH concentration increased. In contrast with the LC-BA geopolymerized pellets, a decomposition reaction could be observed in the HC-BA pellets near 1160° C. as demonstrated by peak H⁻+A. Peak H⁻+A is most likely associated with the release of gaseous phases from hematite and anhydrite. The mass reductions recorded between 1100° C. and 1160° C. for HC-BA-0%, HC-BA-4%, HC-BA-10%, and HC-BA-16% were equal to 0.55%, 0.48%, 0.45%, and 0.33%, respectively.

Figure 22C:
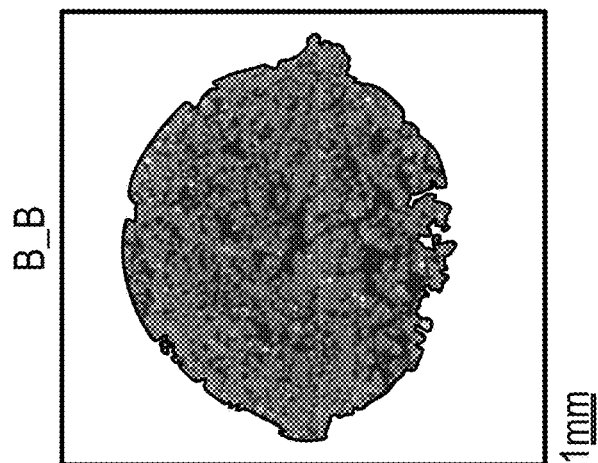
FIG. 22C is a sectional view of the pellet of FIG. 22A taken along plane B_B.
Figure 22B:
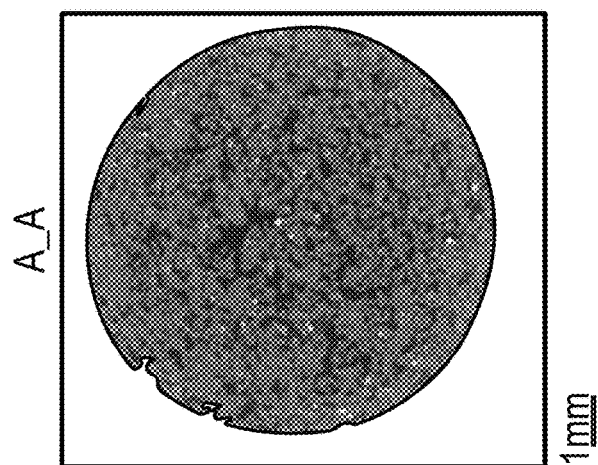
FIG. 22B is a sectional view of the pellet of FIG. 22A taken along plane A_A.
Figure 22A:
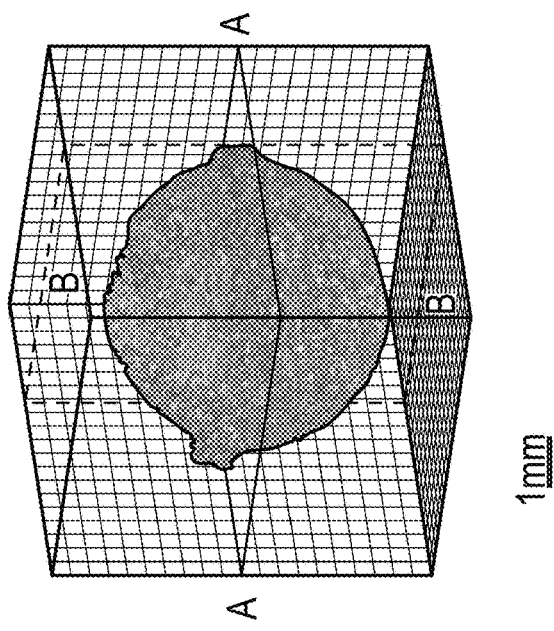
FIG. 22A is a three dimensional reconstruction of a pellet of LC-BA with 10% NaOH after geopolymerization and before sintering.
Figure 23C:
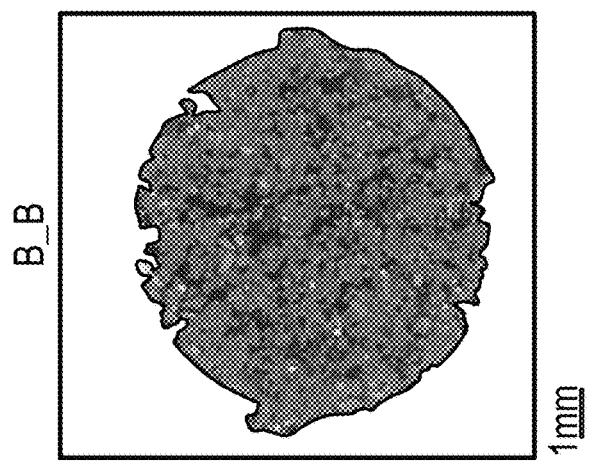
FIG. 23C is a sectional view of the pellet of FIG. 23A taken along plane B_B.
Figure 23B:
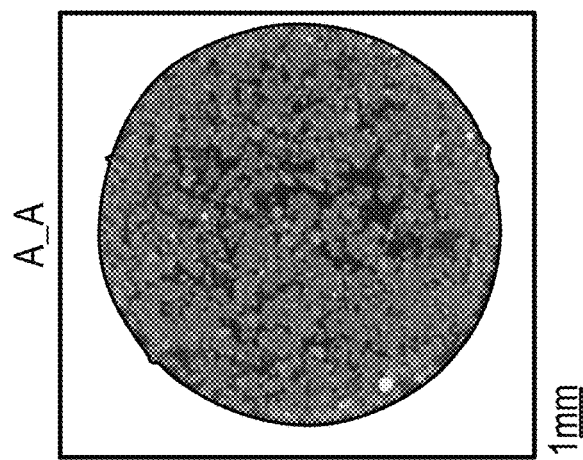
FIG. 23B is a sectional view of the pellet of FIG. 23A taken along plane A_A.
Figure 23A:
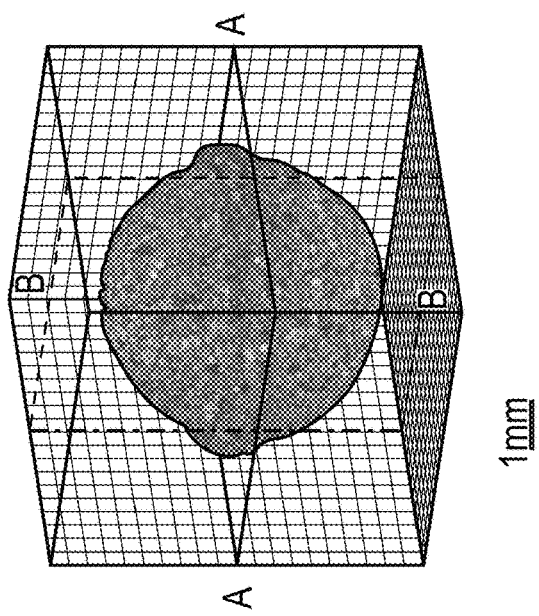
FIG. 23A is a three dimensional reconstruction of a pellet of HC-BA with 10% NaOH after geopolymerization and before sintering.
Figure 24C:
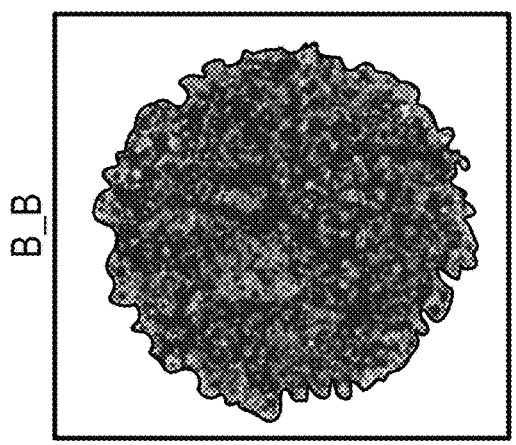
FIG. 24C is a sectional view of the pellet of FIG. 24A taken along plane B_B.
Figure 24F:
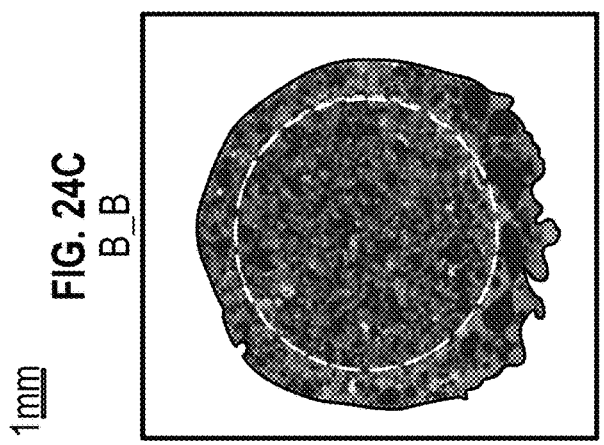
FIG. 24F is a sectional view of the pellet of FIG. 24D taken along plane B_B.
Figure 24B:
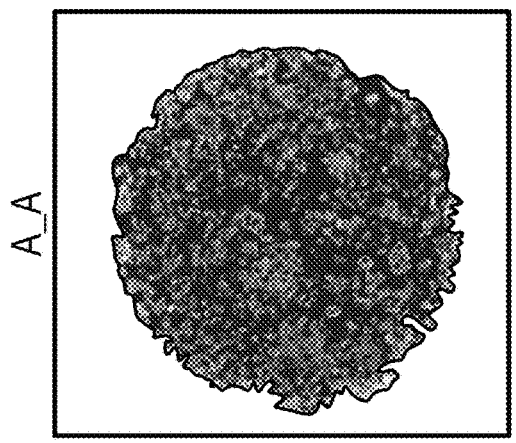
FIG. 24B is a sectional view of the pellet of FIG. 24A taken along plane A_A.
Figure 24E:
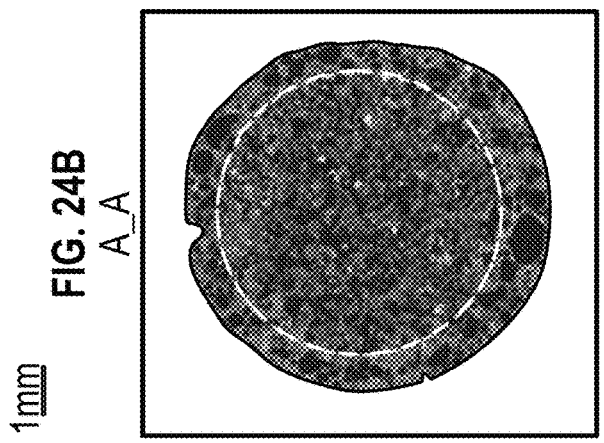
FIG. 24E is a sectional view of the pellet of FIG. 24D taken along plane A_A.
Figure 24A:
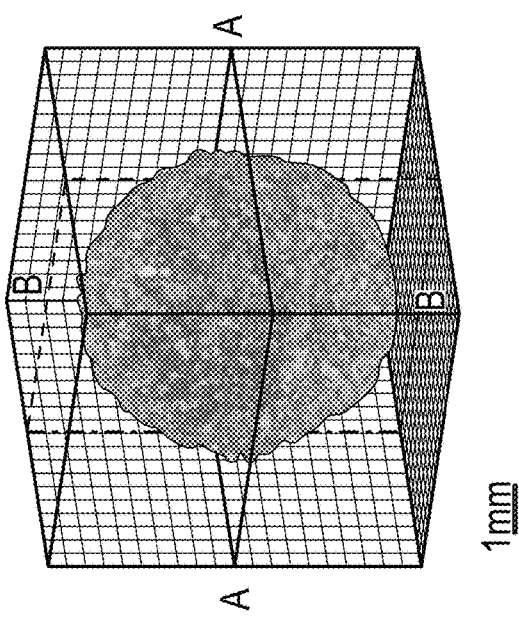
FIG. 24A is a three dimensional reconstruction of a pellet of LC-BA with 4% NaOH after sintering.
Figure 24D:
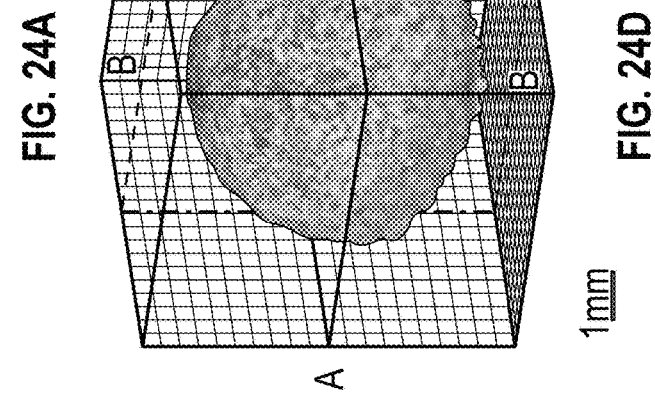
FIG. 24D is a three dimensional reconstruction of a pellet of LC-BA with 10% NaOH after sintering.
Figure 24I:
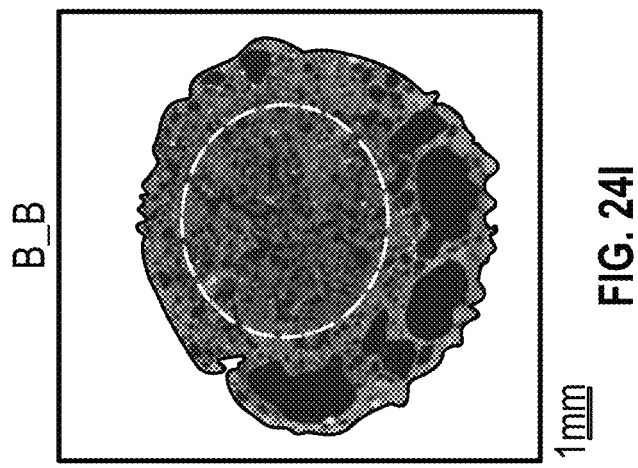
FIG. 24I is a sectional view of the pellet of FIG. 24G taken along plane B_B.
Figure 24H:
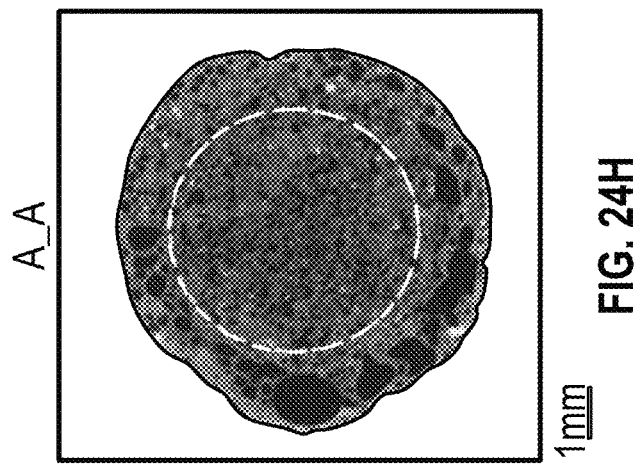
FIG. 24H is a sectional view of the pellet of FIG. 24G taken along plane A_A.
Figure 24G:
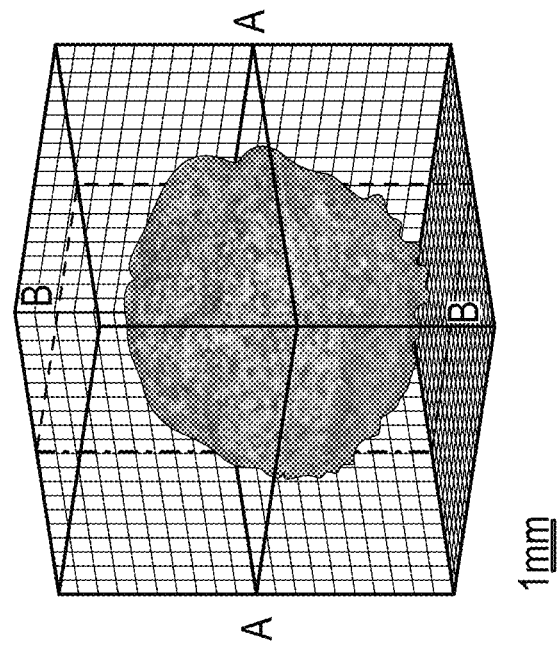
FIG. 24G is a three dimensional reconstruction of a pellet of LC-BA with 16% NaOH after sintering.
Figure 25C:
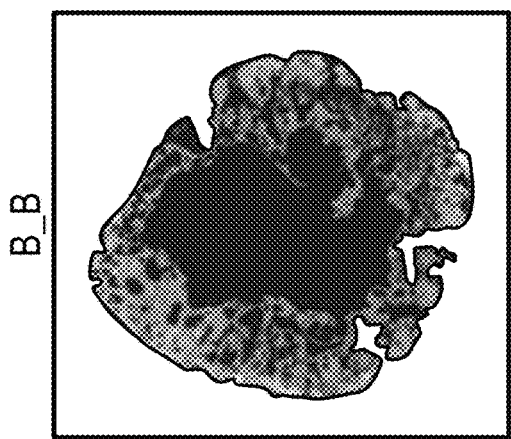
FIG. 25C is a sectional view of the pellet of FIG. 25A taken along plane B_B.
Figure 25F:
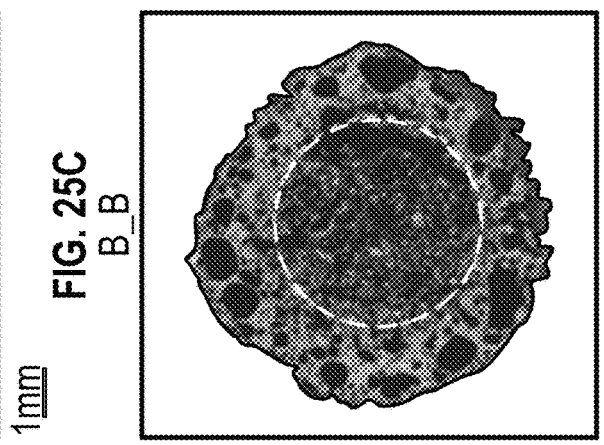
FIG. 25F is a sectional view of the pellet of FIG. 25D taken along plane B_B.
Figure 25B:
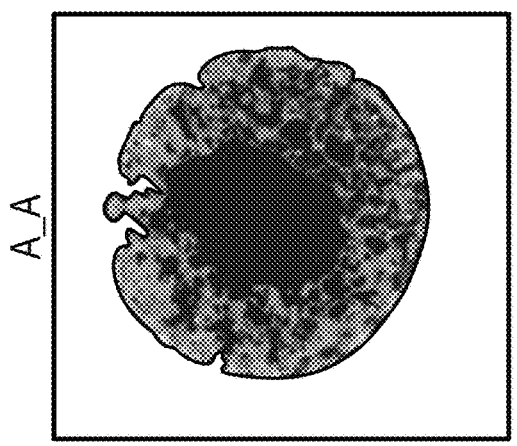
FIG. 25B is a sectional view of the pellet of FIG. 25A taken along plane A_A.
Figure 25E:
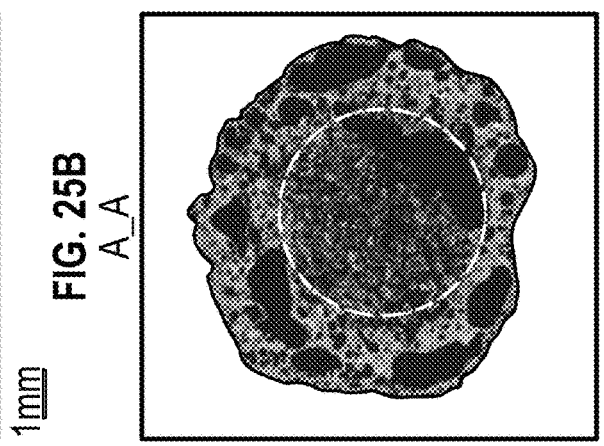
FIG. 25E is a sectional view of the pellet of FIG. 25D taken along plane A_A.
Figure 25A:
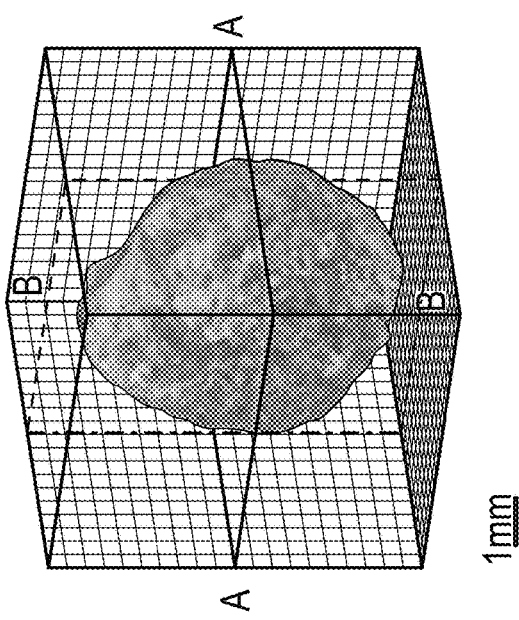
FIG. 25A is a three dimensional reconstruction of a pellet of HC-BA with 4% NaOH after sintering.
Figure 25D:
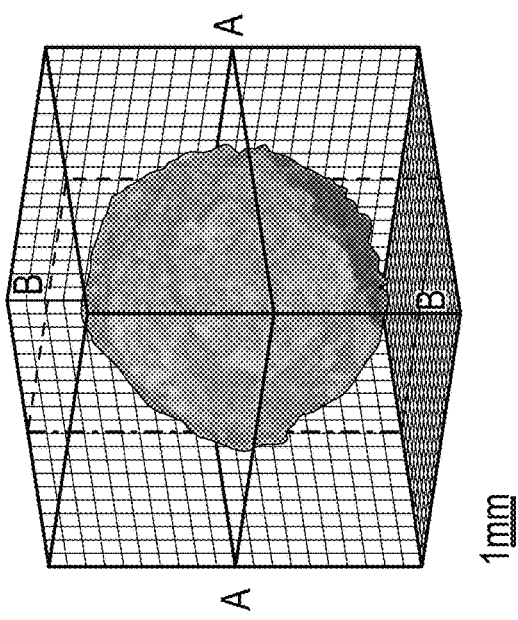
FIG. 25D is a three dimensional reconstruction of a pellet of HC-BA with 10% NaOH after sintering.
Figure 25I:
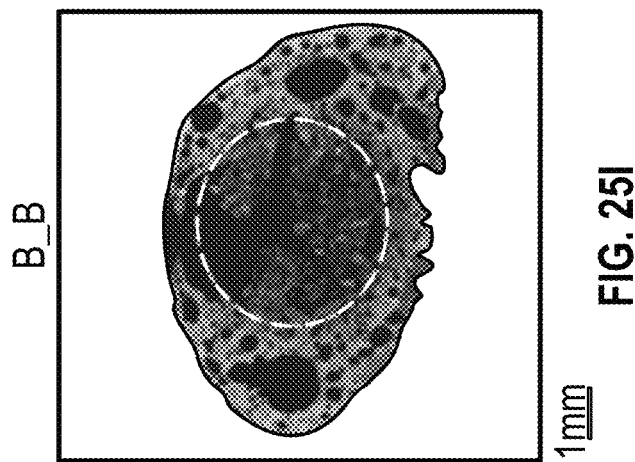
FIG. 25I is a sectional view of the pellet of FIG. 25G taken along plane B_B.
Figure 25H:
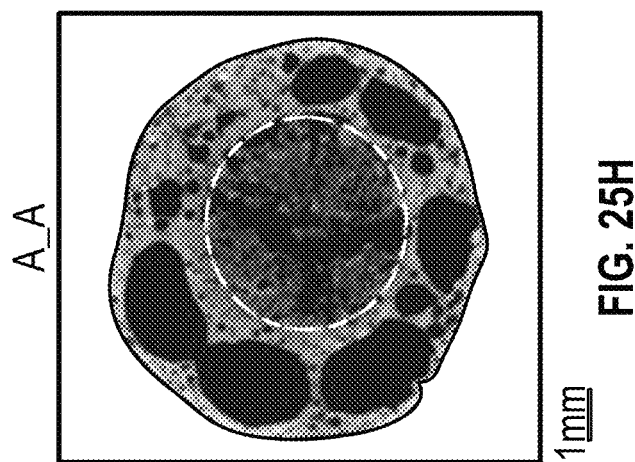
FIG. 25H is a sectional view of the pellet of FIG. 25G taken along plane A_A.
Figure 25G:
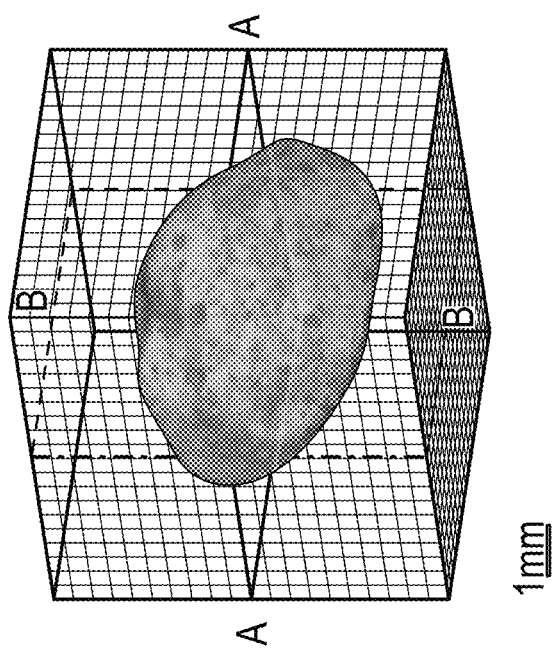
FIG. 25G is a three dimensional reconstruction of a pellet of HC-BA with 16% NaOH after sintering.

It was hypothesized that due to the rapid sintering of LWA for 4 min, dihydroxylation (i.e., the release of water) of amorphous phases available in the geopolymerized LC-BA and HC-BA samples may shift towards higher temperatures and accordingly can contribute to the formation of pores near sintering temperature (~1160° C.). To test this hypothesis, a heating ramp of 100° C./min (equal to the safe maximum capacity of the TGA device) was used to mimic the rapid sintering of LWA in TGA for LC-BA-10% and LC-BA-10%. The results are plotted in FIGS. 21C and 22C with solid and dashed lines for TGA and DTG curves, respectively. A slight temperature shift of peaks could be observed by ~+30° C.; however, no contribution from dehydroxylation (gaseous $H_2O$ release) of amorphous phases could be observed near 1160° C. to contribute to pore formation during sintering.

Evaluation of Pore Structure Using X-CT

To observe the effect of sintering on LWA pore formation, X-CT was carried out, before and after sintering, for the LC-BA-10% and HC-BA-10% samples. The X-CT results for the geopolymerized LC-BA-10% and HC-BA-10% samples (i.e., before sintering) are shown in FIGS. 22A-22C and 23A-23C, respectively. Plane A_A and B_B were selected to represent the middle cross-section of LWA in two perpendicular directions. Light color defines regions with denser structure (i.e., solid phase) while darker color demonstrates regions with lesser density (i.e., pores). 2D slices of samples in both geopolymerized samples (FIGS. 22A-22C and 23A-23C) only contained coarse (i.e., random shape) pores, resulting from the coarse granular structure of bottom ash during the sample preparation. FIGS. 24A-I and 25A-I show the X-CT results of sintered samples for LC-BA and HC-BA LWA, respectively, made with 4%, 10%, and 16% NaOH concentration. Comparing 2D slices before and after sintering for a sample made using 10% NaOH, the porosity of LWA had increased by the end of the sintering process. The porosities of non-sintered LC-BA-10% and HC-BA-10%, which was measured using image analysis of XCT slices as the total volume of pores divided by the total volume of LWA and reported as percentage, were 36.4% and 36.3%, respectively. After sintering, LC-BA-10% and HC-BA-10% had porosities equal to 44% and 41.6%, respectively, as the formation of large pores could increase the porosity of LWA.

Generally, two zones can be identified on the 2D slices (except for LC-BA-4% and HC-BA-4%, most probably due to the lack of a liquid phase) of LWA, separated by white dashed lines (shown in FIGS. 24A-I and 25A-I). The inner part is referred to as "core", while the outer part is referred to as "shell". For both LWA types shown in FIGS. 24A-I and 25A-I, the rounded large pores were mainly formed in the shell region of the LWA. In contrast, the core appears to possess interconnected smaller pores that were not specifically created by gas release but rather by the sintering and grain growth mechanism. A possible explanation for the different morphologies of LWA core and shell could be that the shell acted as an insulating layer, delaying heat transfer to the LWA core and also limiting the diffusion of oxygen to the core. This phenomenon can lead to occurrence of a reducing atmosphere in the core of LWA while having a highly oxidizing atmosphere for the shell. In addition, coalescence of the pores (i.e., pores jointing together) in the shell led to the formation of stable pores with a larger volume.

Figure 26A:
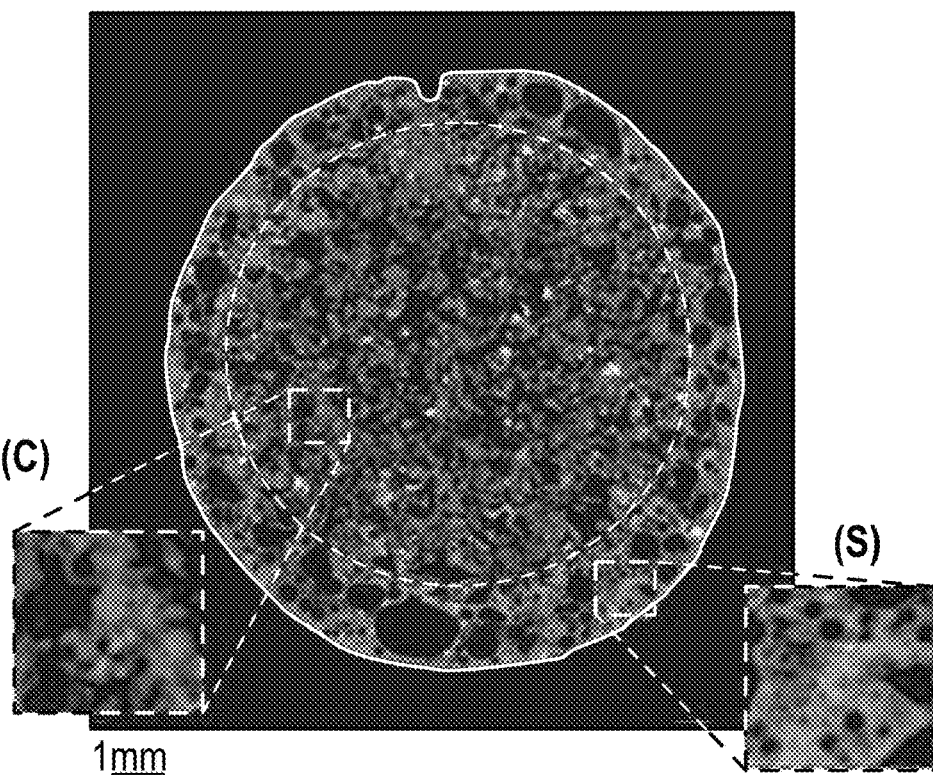
FIG. 26A is an enlarged view of FIG. 24E, showing the core and shell.
Figure 26B:
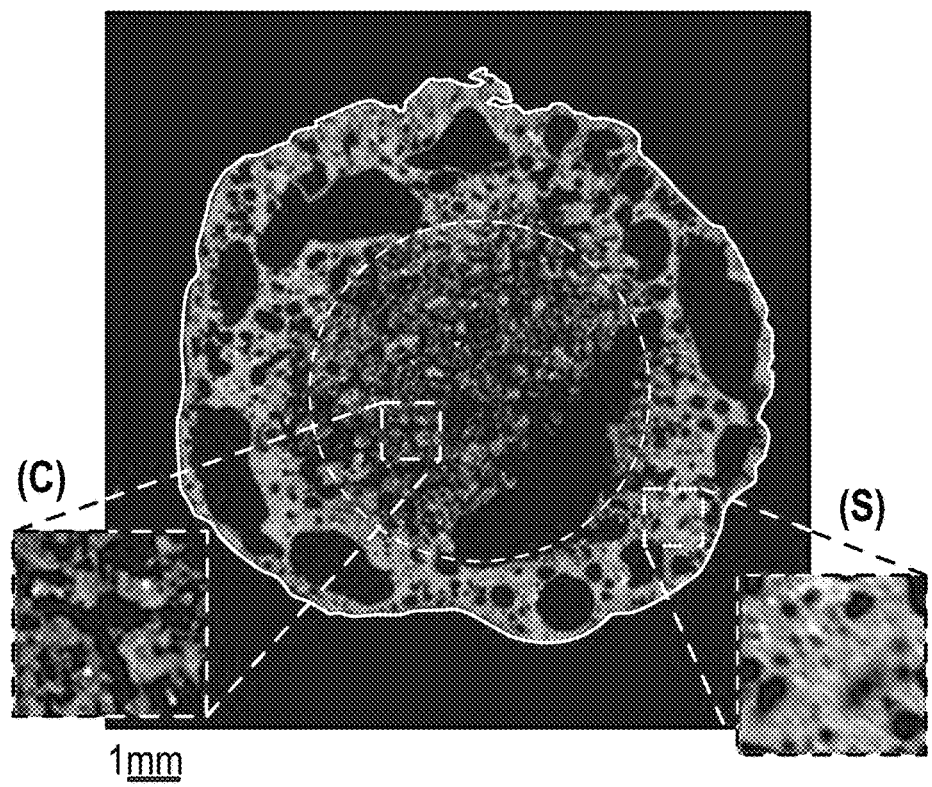
FIG. 26B is an enlarged view of FIG. 25E, showing the core and shell.

A closer images of the A_A 2D slices of LC-BA-10% and HC-BA-10% on the core and shell of LWA are provided in FIGS. 26A and 26B, respectively. The shell material is denser than the core material in both LWA. It is speculated that the shell material not only provides the structural integrity for the LWA, but it may also help to strengthen the LWA.

Formation of a sufficient amount of liquid phase on the LWA surface to entrap the emitted gaseous phases is a critical condition that needs to be achieved during sintering for successful LWA pore formation.

Figure 27:
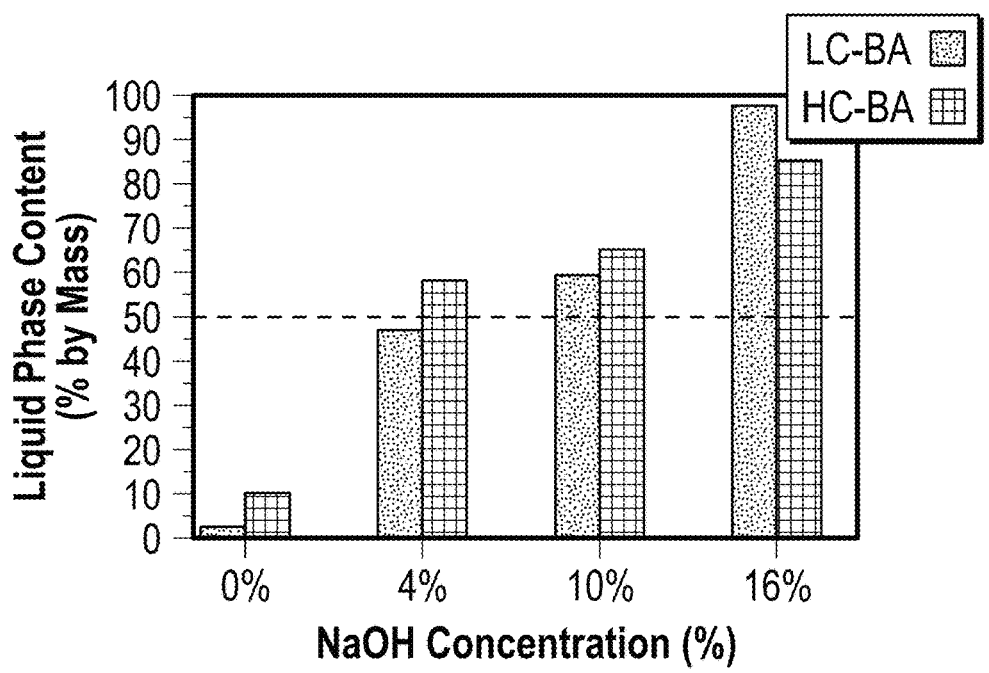
FIG. 27 is a graph showing liquid phase content of LC-BA and HC-BA at 1160° C. as a function of NaOH concentrations.

FIG. 27 shows the amount of the liquid phase at 1160° C. for the LWA. An increase in the NaOH concentration resulted in a higher liquid phase content for both LWA made using LC-BA and HC-BA ashes. NaOH has a lower melting temperature compared with the multi-component ash system; therefore, it provides a medium for easier ion diffusion and grain growth resulting in a lower melting temperature of the ash and NaOH blend.

For LC-BA-0%, as shown in FIG. 27, the liquid phase content was less than 3% while addition of 4% NaOH increased the liquid phase content for LC-BA-4% to 47.2%. Correlating this observation with 3D X-CT reconstruction and A_A and B_B 2D slices of LC-BA-4% provided in FIGS. 24A-I, no large rounded pore was observed for LC-BA-4% LWA. This finding implies that although some gas release has occurred during sintering, the low liquid phase content could not entrap the emitted gaseous phases. On the other hand, when liquid phase raised to 50% in LC-BA-10% and more prominently in LC-BA-16%, even a small amount of gas release can be entrapped by the liquid phase and larger pores can be formed (FIGS. 24 E, 24F, 24H, 24I).

Similar to the case of the LC-BA, the addition of 4% NaOH increased the liquid phase content for HC-BA-4% LWA to 58.3% while for HC-BA-0% this value was 10.3%. As observed in the 2D slices of the HC-BA-4% LWA in FIGS. 25B and 25C, the amount of liquid phase was sufficient to successfully entrap the released gas during sintering near 1160° C. Also similar to the LC-BA LWA, an increase in NaOH concentration increased the quantity of the liquid phase at 1160° C. Correlating the visualized 2D slices of HC-BA LWA in FIGS. 25A-25I with the liquid phase content, it can be inferred that higher content of liquid phase triggered the higher amount of gaseous phase entrapment, and consequently larger pores were formed. However, it should be noted that an excess amount of liquid phase may create deformation in the sintered LWA due to unnecessary reduction in the liquid-solid viscosity (as will be discussed later below) and the desired sphericity may not be achieved during the sintering process as observed in sample HC-BA-16% in FIGS. 25G-25I. It appears that a minimum amount of 50% liquid content (shown by dashed line in FIG. 27) is necessary during sintering bottom ashes to provide sufficient particles binding along with bloating (look at 2D slices in FIGS. 25A-25I and 26A-26I, in which the LWA with more that 50% liquid phase demonstrated formation of round large pores in the shell).

Viscosity of Liquid-Solid Phase During Sintering:

Viscosity plays two simultaneous roles in successful LWA production. First, it prevents excessive deformation of the LWA pellet during sintering so that the final product retains a round shape. Second, the viscosity of the liquid phase affects the LWA pore size distribution. Correlating the 3D reconstructions (FIGS. 24A-I) and viscosity values for LC-BA LWA (FIG. 4 (*a*)), it can be inferred that the viscosity of the LC-BA LWA was high enough to limit the deformation of LWA so as to preserve a spherical shape. Although the HC-BA LWA had lower viscosity values (FIG. 17A) compared with the LC-BA LWA, the same observation was made for HC-BA-4% and HC-BA-10%. The only HC-BA LWA that had excessive deformation under gravitational force was HC-BA-16%, which had a viscosity of 25-7 Pa·s at 1160° C. and a final elliptical shape. It appears a lower limit for liquid-solid viscosity is near that of HC-BA-10%, which was 85 Pa·s, in order to retain the LWA spherical shape during sintering.

The second role of the viscosity in controlling the pore size distribution can be observed in the A_A and B_B 2D projections of the LC-BA and HC-BA LWA in FIGS. 4A-I and 25A-I, respectively, where larger pores were formed in the HC-BA LWA compared to the LC-BA LWA. Since LC-BA LWA had higher viscosity compared with HC-BA LWA, lower viscosity seemingly led to easier expansion of gas inside liquid phase, resulting in the formation of larger pores. This observation can also be related to amount of gaseous release close to the sintering temperature, which will be discussed in the following section.

Formation of Gaseous Phase During Sintering:

As was observed in FIGS. 20A-D and 21A-D, the TGA/DTG results showed a more pronounced peak at 1160° C. for the HC-BA LWA compared with the LC-BA LWA. The mass reduction from 1100° C. to 1160° C. is believed to be associated with hematite and anhydrite compounds, the presence of which was confirmed by QXRD, to release $O_2$ and $SO_2$ gases, respectively. Both anhydrite and hematite were detected in raw ashes as well as in geopolymerized pellets. Moreover, the anhydrite content for the LC-BA geopolymerized pellets was found to be smaller than in the HC-BA pellets. This observation supports the fact that HC-BA LWA have higher potential for gas liberation at 1160° C., which can be another possible explanation for the formation of bigger pores in HC-BA LWA compared with LC-BA LWA. The reactions that can lead to gas liberation from the transition of hematite from $Fe^{3+}$ to $Fe^{2+}$ can happen through Equation 3 and Equation 4, while the reaction for anhydrite decomposition can be expressed as follows:

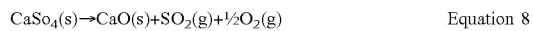

$$CaSO_4(s) \rightarrow CaO(s) + SO_2(g) + \tfrac{1}{2}O_2(g) \qquad \text{Equation 8}$$

As was observed in the DTG curves for HC-BA geopolymerized pellets (FIGS. 20A-D), the peak at 1160° C. seems incomplete, i.e., the temperature was no high enough in order to let the complete decomposition occur. This may be attributed to the fact that a complete decomposition of $CaSO_4$ occurs at temperatures above 1200° C. A possible explanation for the reduction of hematite into wuestite (FeO) that could occur at temperature range of 1100° C. and 1160° C. is the formation of liquid phase on the LWA surface that could hinder oxygen diffusion and create a reducing atmosphere in the LWA core, thus leading to hematite reduction.

In this experiment, the unburned carbon content for LC-BA and HC-BA ashes was small (0.12% and 0.19%, respectively), and complete oxidation of carbon in the form of $CO_2$ and CO release would happen at temperatures below 1000° C. (see FIGS. 18A-B and 19A-B), which had some overlapping with the temperature at which the liquid phase started to form (see FIGS. 15A-D and 16A-D). This indicates that there could have been some contribution form the unburnt carbon to reduce the hematite and result in the release of $O_2$.

Figure 28:
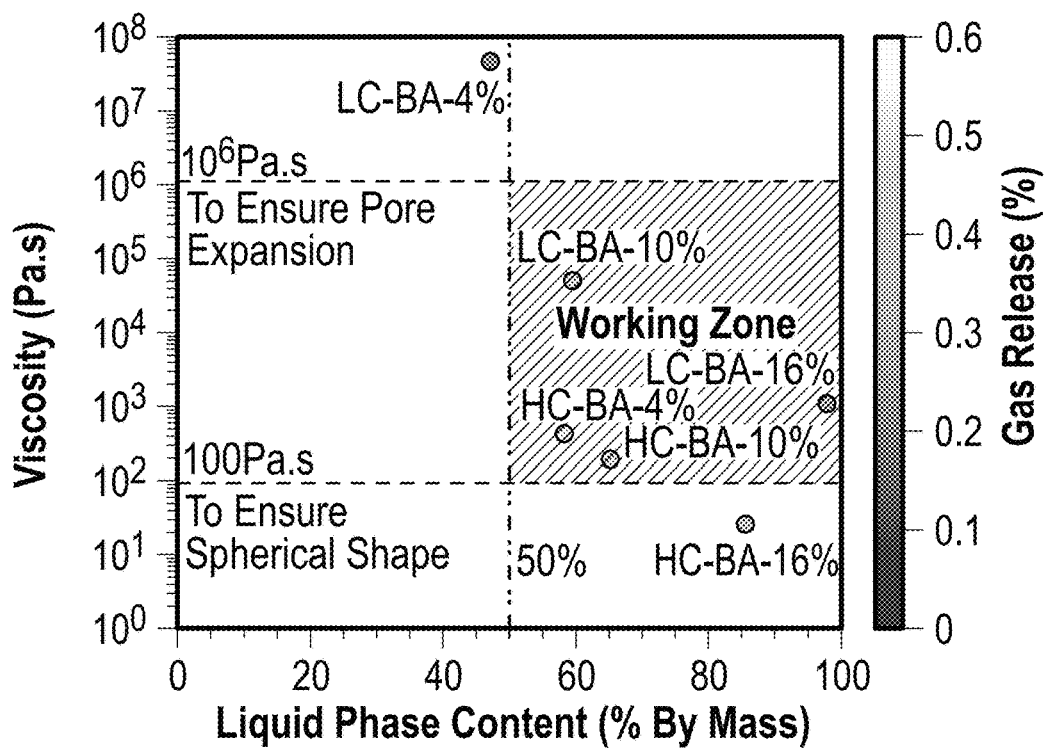
FIG. 28 is a plot showing a working zone satisfying the three necessary conditions for LWA production using bottom ash.

Required Sintering Conditions for Successful Production of Spherical LWA:

FIG. 28 proposes a holistic view of each LWA to provide the required conditions (liquid phase quantity, viscosity value, and emitted gas amount) during sintering for successful production of spherical LWA. It should be noted that LC-BA-0% and HC-BA-0% are shown on the Figure, since due to the lack of liquid phase their viscosity calculable. A minimum value of 50% liquid content (shown by vertical dashed line in FIG. 28) and a minimum viscosity value of 191 Pa·s (shown by bottom horizontal dashed line in FIG. 28) are required for successful LWA production. For LC-BA LWA, LC-BA-0% and LC-BA-4%, which had an inadequate amount of liquid phase (i.e., less than 50%), formation of rounded large pores was not observed in the X-CT images. The same observation was made for HC-BA-0%, which also had an insufficient amount of liquid phase. On the other hand, for LC-BA-10%, LC-BA-16%, HC-BA-4%, and HC-BA-10%, a sufficient amount of liquid phase (50% or more) accompanied with proper viscosity values (more than 191 Pa·s), led to producing LWA with the desired pore structure and sphericity. However, for HC-BA-16%, the viscosity value was about 26 Pa·s, which led to the deformation of the LWA under gravitational force and an undesired elliptical shape (see FIGS. 25G-I). An upper limit value of $10^6$ Pa·s was proposed (shown by top horizontal dashed line in FIG. 28) to ensure a viscosity for the liquid phase to be able to entrap the gaseous phase and let the pellets expand during sintering. $10^6$ Pa·s appeared to be placed between the viscosity values of LC-BA-4% and LC-BA-10%, and implied that a NaOH concentration between 4% and 10%, probably will result in the entrapment of pores in the LWA. FIG. 28 can be used to design a successful LWA with respect to the three required conditions including, sufficient amount of liquid phase, appropriate viscosity for solid-liquid suspension, and sufficient amount of gas release. If a LWA with the three associated characteristics places in the working zone shown in FIG. 28, it can be expected to achieve a desirable LWA.

The three required conditions that need to be achieved during sintering for successful LWA production from waste coal bottom ash are: (i) formation of a sufficient amount of the liquid phase; (ii) achievement of an appropriate viscosity for the combined liquid-solid phase; and (iii) emission of a sufficient amount of gaseous phase. Two types of coal bottom ash (BA), low-calcium (LC) and high-calcium (HC), were used to evaluate these three sintering conditions. The following main conclusions can be drawn from this example regarding the three necessary conditions for successful sintering/LWA production:

The presence of at least 50% (by mass) liquid phase enables successful gas entrapment and LWA pore formation. It was observed that for LC-4%, in which the liquid phase content was less than 50%, no gas-filled rounded pores could be seen achieved in the LWA pore structure. However, all LWA with more than 50% liquid phase during sintering possessed round gas filled pores in their structure (mainly in the outer shell part of the LWA structure).

The viscosity of the liquid-solid suspension was found to influence LWA pore formation and control LWA deformation during sintering. A minimum viscosity of 191 Pa·s was found to be necessary to retain the spherical shape of the LWA pellets during sintering. Above this minimum value, the HC-BA LWA, which had smaller viscosity values compared with the LC-BA LWA, possessed larger gas-filled pores. Lower viscosity values not only allowed easier movement of pores to coalesce, but also easier expansion of entrapped gases in the liquid phase medium. An upper limit of $10^6$ Pa·s was proposed for the liquid-solid phase in order to still be able to entrap emitted gases.

It was found that the emission of gaseous phases near the sintering temperature is necessary to create the desired LWA pore structure, given that the desired liquid phase content and viscosity values listed in (i) and (ii) are also achieved during sintering. All LWA demonstrated gas liberation near the sintering temperature where HC-BA LWA showed a slightly higher amount of gaseous phase formation compared with LC-BA LWA. The emitted gaseous phase was found to be most probably due to the reduction of hematite and the decomposition of anhydrite. Gas emission from other sources was at temperatures not near enough to the sintering temperature to be helpful in forming pores.

A diagram with respect to the three required conditions for successful production of LWA i.e., formation of enough liquid phase, appropriate solid-liquid viscosity, and enough gas emission was developed, and a working zone was defined on that. The working zone was constrained by a liquid phase of more than 50%, and a viscosity upper and lower limits of 191 Pa·s and $10^6$ Pa·s, respectively. The diagram can be used to predict whether the production of a LWA will be successful or not.

From a practical point of view and environmental perspective, a smaller NaOH concentration not only reduces the cost associated with LWA production, but also decreases the greenhouse gas emissions accrued during NaOH production. For successful LWA production from LC- and HC-BA, a NaOH concentration by mass between 4% and 10% was found to be an appropriate concentration range of this fluxing agent to achieve the desired three sintering conditions for LWA production at 1160° C.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method of manufacturing lightweight aggregate comprising the steps of:
    (a) forming at least a 40% by mass molten liquid phase for lightweight aggregate (LWA) made using a waste coal combustion ash;
    (b) reaching a viscosity of between 100 Pa·s and $10^7$ Pa·s for solid-liquid suspension of the LWA; and
    (c) emitting a minimum effective gas amount of 0.24% by weight of the LWA to form pores in the LWA during sintering.

2. The method according to claim 1, wherein step (c) comprises forming pores having a diameter between 1 nm and 3 mm.

3. The method according to claim 1, wherein step (a) comprises using fly ash.

4. The method according to claim 3, wherein the step of providing the LWA comprises providing low calcium fly ash.

5. The method according to claim 4, wherein the step of providing the low-calcium fly ash comprises using waste fly ash.

6. The method according to claim 3, wherein the step of providing the LWA comprises providing high-calcium fly ash.

7. The method according to claim 6, wherein the step of providing the high-calcium fly ash comprises using waste fly ash.

8. The method according to claim 1, wherein step (a) comprises using bottom ash.

9. The method according to claim 8, wherein step (a) comprises forming between 50% and 100% liquid phase for bottom ash LWA.

10. The method according to claim 8, wherein step (b) comprises the viscosity reaching between 100 Pa·s and $10^6$ Pa·s for the solid-liquid suspension.

11. The method according to claim 8, wherein step (a) comprises using low-calcium bottom ash.

12. The method according to claim 8, wherein step (a) comprises using high calcium bottom ash.

* * * * *